(12) United States Patent
Dull et al.

(10) Patent No.: US 10,993,448 B2
(45) Date of Patent: May 4, 2021

(54) METHOD FOR SANITIZING FRESH PRODUCE

(71) Applicant: Dole Fresh Vegetables, Inc., Westlake Village, CA (US)

(72) Inventors: Bob J. Dull, Akron, OH (US); Roger Dale Billingsley, Biddle, MT (US); Abizer Moiz Khairullah, Morgan Hill, CA (US); Amanda Jane Deering, Lafayette, IN (US); Jessica Okane Kawabata, Madison, WI (US); Yuki Mikoshiba, Salinas, CA (US)

(73) Assignee: DOLE FRESH VEGETABLES, INC., Westlake Village, CA (US)

( * ) Notice: Subject to any disclaimer, the term of this patent is extended or adjusted under 35 U.S.C. 154(b) by 0 days.

(21) Appl. No.: 14/807,444

(22) Filed: Jul. 23, 2015

(65) Prior Publication Data
US 2016/0021903 A1    Jan. 28, 2016

Related U.S. Application Data

(60) Provisional application No. 62/029,090, filed on Jul. 25, 2014.

(51) Int. Cl.
A23B 7/155    (2006.01)
A23B 7/157    (2006.01)
(Continued)

(52) U.S. Cl.
CPC .............. *A23B 7/155* (2013.01); *A23B 7/153* (2013.01); *A23B 7/157* (2013.01); *A23B 7/10* (2013.01);
(Continued)

(58) Field of Classification Search
None
See application file for complete search history.

(56) References Cited

U.S. PATENT DOCUMENTS 6,927,237 B2    8/2005    Hei et al.
9,125,427 B2    9/2015    Dull et al.
(Continued)

FOREIGN PATENT DOCUMENTS

WO    2001087358 A1    11/2001
WO    2002035933 A1    5/2002
(Continued)

OTHER PUBLICATIONS

UVE: University of Vermont Extension: Why triple rinse greens?; published May 11, 2012.*
(Continued)

*Primary Examiner* — Patricia A George
(74) *Attorney, Agent, or Firm* — Polsinelli P.C.

(57) ABSTRACT

Provided herein, inter alia, is a method for sanitizing produce, by: treating the produce with a catholyte solution for a period of time sufficient to sanitize the produce; treating the produce with a solution containing chlorine for a period of time sufficient to further sanitize the produce; and treating the produce with a solution containing peroxyacetic acid for a period of time sufficient to further sanitize the produce, where treating with the catholyte solution, the solution containing chlorine, and the solution containing peroxyacetic acid yields at least an additional 1 log unit reduction in microbial load, as compared to produce treated with a single solution selected from the catholyte solution, the solution containing chlorine, and the solution containing peroxyacetic acid.

16 Claims, 18 Drawing Sheets

(51) Int. Cl.
  *A23B 7/153* (2006.01)
  *A23B 7/10* (2006.01)
(52) U.S. Cl.
  CPC ....... *A23V 2002/00* (2013.01); *A23V 2200/10* (2013.01)

(56) References Cited

U.S. PATENT DOCUMENTS

| | | | |
|---|---|---|---|
| 2002/0192340 | A1 | 2/2002 | Swart et al. |
| 2002/0072288 | A1 | 6/2002 | Hei et al. |
| 2002/0086903 | A1 | 7/2002 | Giambrone et al. |
| 2004/0009094 | A1 | 1/2004 | Adiga et al. |
| 2004/0115322 | A1 | 6/2004 | Osborn |
| 2005/0244556 | A1 | 11/2005 | Karren |
| 2006/0008494 | A1 | 1/2006 | Prusiner |
| 2007/0163966 | A1 | 7/2007 | Hilgren et al. |
| 2008/0241269 | A1 | 10/2008 | Velasquez |
| 2009/0196959 | A1 | 8/2009 | Guzman |
| 2010/0303671 | A1 | 12/2010 | Bertrand |
| 2011/0070344 | A1* | 3/2011 | Johnson ............... A23B 7/015 426/238 |
| 2012/0070549 | A1 | 3/2012 | Gutzmann et al. |
| 2013/0323375 | A1 | 12/2013 | Takahashi et al. |
| 2014/0030402 | A1 | 1/2014 | Khairullah et al. |
| 2014/0154373 | A1 | 6/2014 | Gobet et al. |
| 2014/0196751 | A1 | 7/2014 | Dull et al. |

FOREIGN PATENT DOCUMENTS

| | | |
|---|---|---|
| WO | 2004031337 A1 | 4/2004 |
| WO | 2011035184 A1 | 3/2011 |
| WO | 2011038168 A1 | 3/2011 |
| WO | 2014113057 A1 | 7/2014 |

OTHER PUBLICATIONS

FDA: BAM: *Salmonella* published Dec. 2007 by FDA. (Year: 2007).*

Yuk: Effect of Combined Ozone and Organic Acid Treatment for Control of *Escherichia coli* O157:H7 and Listeria monocytogenes on Lettuce; vol. 71, Nr. 3, 2006—Journal of Food Science, Published on Web Mar. 15, 2006 (Year: 2006).*
EPA: Peroxyacetic Acid; Exemption From the Requirement of a Tolerance; Federal Register / vol. 65, No. 232 / Friday, Dec. 1, 2000 / Rules and Regulations. (Year: 2000).*
ISU: Iowa State University: Cleaning and Sanitizing Guide; PM 1974C Revised Mar. 2013. (Year: 2013).*
Johnston: WO2011035184; published Mar. 24, 2011. (Year: 2011).*
International Search Report and Written Opinion received for PCT Application No. PCT/US2013/045275, dated Nov. 15, 2013, 13 pages.
Dai et al., "Efficacy of Different Sanitizing Agents and Their Combinations on Microbe Population and Quality of Fresh-Cut Chinese Olives," Journal of Food Science, vol. 77, No. 7, 2002, pp. M348-M353.
Lin et al., "Inactivation of *Escherichia coli* O157:H7, *Salmonella enterica* Serotype Enteritidis, and Literia monocytogenes on Lettuce by Hydrogen Peroxide and Lactic Acid and by Hydrogen Peroxide with Mild Heat," Journal of Food Protection, vol. 65, No. 8, 2002, pp. 1215-1220.
Vandekinderen et al., "Moderate and High Doses of Sodium Hypochlorite, Neutral Electrolyzed Oxidizing Wler, Peroxyacetic Acid, and Gaseous Chlorine Dioxide Did Not Affect the Nutritional and Sensory Qualities of Fresh-Cut Iceberg Lettuce (*Lactaca sativa* Var. *Capitata* L.) after Washing," Journal of Agricultural and Food Chemistry, vol. 57, No. 10, 2009, pp. 4195-4203.
Toxicological Review of Chlorine Dioxide and Chlorite, EPA Publication EPA/635/R-00/007, Sep. 2000.
International Search Report and Written Opinion Received for PCT Application No. PCT/US2015/041682, dated Oct. 16, 2015, 9 pages.
Nickerson, "Why triple rinse greens", University of Vermont Extension, May 11, 2012.
Bohm, Shirley B.,; "Produce Safety—What's Going on Here?"; FDA/CFSAN/OFS—Retail Food Protection National Environmental Health Association; Jun. 21, 2007; pp. 1-41.

* cited by examiner

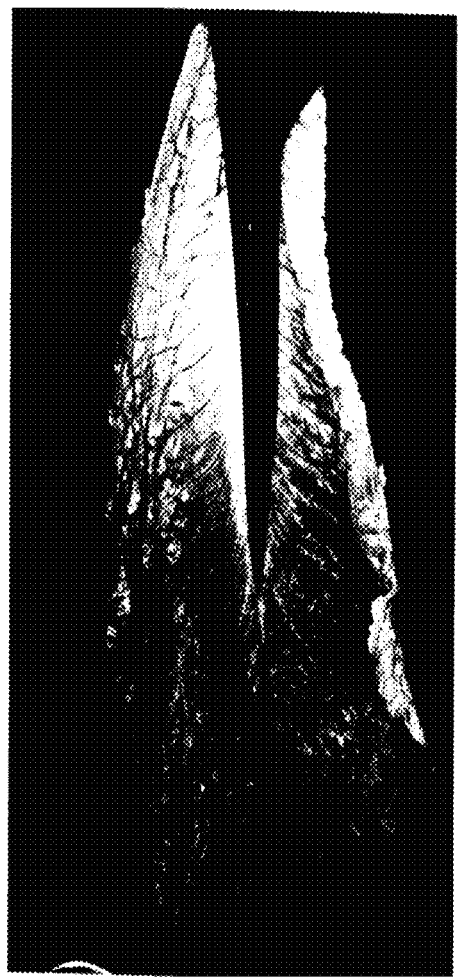
FIG. 9A
FIG. 9B

| Date | Treatment | Lab/Commercial | Wash 1 Temp, C | Wash 1 Chemical = 20 s | Wash 2 Temp, C | Wash 2 Chemical = 90 s | Wash 3 Temp, C | Wash 3 Chemical = 30 s | Initial Micro | Micro Red | Micro Red to Control |
|---|---|---|---|---|---|---|---|---|---|---|---|
| 1/15/2013 | Control | Lab | 39 | Chlorine = 40-60 ppm | 104 | Chlorine = 40-60 ppm | 39 | Chlorine = 40-60 ppm | | | |
| | Treat 1 | Lab | 39 | CO2 = 5 ppm | 104 | Chlorine = 40-60 ppm | 39 | PAA = 60-70 ppm | | | 2.1 |
| | Treat 2 | Lab | 39 | CO2 = 10 ppm | 104 | Chlorine = 40-60 ppm | 39 | PAA = 60-70 ppm | | | 0.77 |
| | Treat 3 | Lab | 39 | CO2 = 20 ppm | 104 | Chlorine = 40-60 ppm | 39 | PAA = 60-70 ppm | | | 1.2 |
| 3/8/2013 | Control | Lab | 39 | Chlorine = 40-60 ppm | 104 | Chlorine = 40-60 ppm | 39 | Chlorine = 40-60 ppm | | | |
| | Treat 1 | Lab | 39 | CO2 = 5 ppm | 104 | Chlorine = 40-60 ppm | 39 | PAA = 60-70 ppm | | | 1.4 |
| 3/8/2013 | Control | Lab | 39 | Chlorine = 40-60 ppm | 104 | Chlorine = 40-60 ppm | 39 | Chlorine = 40-60 ppm | | | |
| | Treat 1 | Lab | 39 | Chlorine = 40-60 ppm | 104 | Chlorine = 40-60 ppm CO2 = 5 ppm | 39 | PAA = 60-70 ppm | | | 0.8 |
| | Treat 2 | Lab | 39 | Chlorine = 40-60 ppm | 104 | Chlorine = 40-60 ppm CO2 = 10 ppm | 39 | PAA = 60-70 ppm | | | 0.8 |
| | Treat 3 | Lab | 39 | Chlorine = 40-60 ppm | 104 | Chlorine = 40-60 ppm CO2 = 20 ppm | 39 | PAA = 60-70 ppm | | | 0.27 |
| 3/8/2013 | Control | Lab | 39 | Chlorine = 40-60 ppm | 104 | Chlorine = 40-60 ppm | 39 | Chlorine = 40-60 ppm | | | |
| | Treat 1 | Lab | 39 | Chlorine = 40-60 ppm | 4 | Chlorine = 40-60 ppm CO2 = 20 ppm | 39 | PAA = 60-70 ppm | | | 0 |

FIG. 12

| Date | Type | Source | | Chlorine = 20-30 ppm | | Chlorine = 30-40 ppm | | Chlorine = 40-60 ppm | | | |
|---|---|---|---|---|---|---|---|---|---|---|---|
| 4/01/2013 | Control | Commercial | 65 | Chlorine = 20-30 ppm | 104 | Chlorine = 30-40 ppm | 39 | Chlorine = 40-60 ppm | 5.01 | 2.15 | |
| | Treat 1 | Commercial | 65 | Chlorine = 20-30 ppm | 104 | CO2 = 3 ppm | 39 | Chlorine = 40-60 ppm | 5.18 | 2.15 | 0 |
| 4/02/2013 | Control | Commercial | 65 | Chlorine = 20-30 ppm | 104 | Chlorine = 30-40 ppm | 39 | Chlorine = 40-60 ppm | 5.08 | 1.82 | |
| | Treat 1 | Commercial | 65 | Chlorine = 20-30 ppm | 104 | Chlorine = 20-30 ppm CO2 = 3-5 ppm | 39 | PAA = 50-70 ppm | 5.19 | 1.89 | 0.27 |
| 4/10/2013 | Control | Commercial | 65 | Chlorine = 20-30 ppm | 104 | Chlorine = 30-40 ppm | 39 | Chlorine = 40-60 ppm | 5.07 | 1.9 | |
| | Treat 1 | Commercial | 65 | Chlorine = 15-25 ppm CO2 = 5-8 ppm | 104 | Chlorine = 30-40 ppm | 39 | PAA = 50-70 ppm | 5.08 | 2.07 | 0.27 |
| 4/24/2013 | Control | Commercial | 65 | Chlorine = 20-30 ppm | 104 | Chlorine = 30-40 ppm | 39 | Chlorine = 40-60 ppm | 5.08 | 2.14 | |
| | Treat 1 | Commercial | 65 | Chlorine = 20-30 ppm | 104 | Chlorine = 20-30 ppm CO2 = 3-5 ppm | 39 | PAA = 50-70 ppm | 4.94 | 1.96 | -0.18 |
| 4/14/2013 | Control | Commercial | 65 | Chlorine = 20-30 ppm | 104 | Chlorine = 30-40 ppm | 39 | Chlorine = 40-60 ppm | 4.87 | 1.78 | |
| | Treat 1 | Commercial | 65 | Chlorine = 20-30 ppm | 69 | Chlorine = 30-40 ppm CO2 = 4-12 ppm | 39 | PAA = 50-70 ppm | 4.83 | 1.87 | -0.09 |
| | Treat 2 | Commercial | 65 | Chlorine = 20-30 ppm CO2 = 4-12 ppm | 69 | Chlorine = 30-40 ppm CO2 = 4-12 ppm | 39 | PAA = 50-70 ppm | 4.78 | 2.07 | 0.29 |
| | Treat 3 | Commercial | 65 | Chlorine = 20-30 ppm CO2 = 4-12 ppm | 104 | Chlorine = 30-40 ppm | 39 | PAA = 50-70 ppm | 4.61 | 1.82 | 0.04 |

FIG. 12 (Cont.)

| Media | Average Log Reduction | Error | NTC Mean | NTC Stdev | Treat Mean | Treat Stdev | Reduction |
|---|---|---|---|---|---|---|---|
| Salmonella Typhimurium | 3.52 | 0.22 | 5.94E+05 | 9.39E+04 | 1.78E+02 | 2.03E+02 | 3.34E+03 |
|  | 1.20 | 0.30 | 5.94E+05 | 9.39E+04 | 3.78E+04 | 5.76E+04 | 1.57E+01 |
|  |  |  |  |  |  |  |  |
| E. coli O157:H7 | 3.56 | 0.18 | 5.10E+05 | 6.63E+04 | 1.40E+02 | 1.32E+02 | 3.64E+03 |
|  | 1.37 | 0.24 | 5.10E+05 | 6.63E+04 | 2.17E+04 | 2.70E+04 | 2.35E+01 |
|  |  |  |  |  |  |  |  |
| Listeria monocytogenes | 3.55 | 0.13 | 4.64E+05 | 1.02E+05 | 1.30E+02 | 8.51E+01 | 3.57E+03 |
|  | 1.47 | 0.25 | 4.64E+05 | 1.02E+05 | 1.59E+04 | 2.02E+04 | 2.91E+01 |

White = Catholyte Wash (Catholyte-Cl$_2$-PAA)
Light gray = Chlorine Wash (Cl$_2$-Cl$_2$-Cl$_2$)
Dark gray = ClO$_2$ Wash (ClO$_2$-Cl$_2$-PAA)

FIG. 14

METHOD FOR SANITIZING FRESH PRODUCE

CROSS-REFERENCE TO RELATED APPLICATIONS

This application claims priority to U.S. Provisional Patent Application Ser. No. 62/029,090, filed Jul. 25, 2014, which is hereby incorporated by reference in its entirety.

FIELD

This application relates in general to sanitizing produce, such as leafy vegetables. More particularly, this application relates to a method for sanitizing produce using a combination of multiple sanitizing solutions, including a catholyte solution, to reduce bacterial contamination, reduce browning, and improve quality, resulting in longer marketable shelf-life.

BACKGROUND

The use of chlorine to sanitize freshly harvested produce (e.g., fruits and vegetables) has been well-described. Generally, chlorine is added to water as a gas to produce hypochlorous acid, which is the active sanitizing agent. A use level of about 10 ppm and 100 ppm has been previously described as being effective for reducing microbial load and being effective against pathogens. However, while chlorine can be an effective sanitizing agent, chlorine alone has not been shown to be a completely effective kill step (i.e., a point in produce processing where potentially deadly pathogens are eradicated from the product, usually by killing the pathogen). Moreover, no single sanitizing agent has been shown to be a highly effective kill step.

The identification of a kill step in the sanitizing of fresh cut produce has remained elusive. Numerous methodologies have been described that claim additional microbial kill when compared to chlorine alone. In general, they either present additional problems or are not as effective as chlorine alone. While many of the contaminant microbes are non-pathogenic to humans and only represent a challenge to shelf-life, the fact that these products are grown in open fields presents a risk of exposure to soil- and air-borne food pathogens from *Salmonella, E. coli*, and *Listeria* species. Their ubiquitous distribution in nature must be addressed and eliminated. Therefore, there is a need to develop a method of utilizing multiple sanitizers with various modes of attack that provide a multiple hurdle approach to sanitizing that provides a more effective reduction in microbial load than chlorine alone, reduces or eliminates human pathogen contamination, and increases produce shelf-life.

The use of multiple, unique sanitizers to reduce bacterial load on produce has been described (see, e.g., U.S. patent application Ser. No. 13/915,594, which is hereby incorporated by reference in its entirety). However, such methods have used chlorine dioxide, which is a volatile chemical and a potential hazard per se. Moreover, chlorine dioxide has been shown to break down into other hazardous compounds including chlorite, chloride, and chlorate ("Toxicological Review of Chlorine Dioxide and Chlorite," EPA Publication EPA/635/R-00/007, September 2000). For example, inhalation of chlorine dioxide has been linked to health hazards, including pharyngeal irritation, dyspnea, tachypnea, and wheezing.

Thus, a need exists for developing methods for de-soiling and disinfecting produce that avoids or mitigates the safety hazards involved with chlorine dioxide, and that provides significant de-soiling properties, possesses sanitation capabilities equal to or greater than chlorine dioxide, produces safe products, and can be disposed of without concern for contamination.

BRIEF SUMMARY

The methods disclosed herein address the disadvantages of the methodologies described above. Herein, methods for treating produce with a sequential combination of catholyte solutions, chlorine, and peroxyacetic acid to reduce the microbial load of the produce are described. Further described herein are methods for treating produce with a sequential combination of anolyte/catholyte solutions, chlorine, and a second chlorine solution to reduce the microbial load of the produce.

Advantageously, the methods described herein utilize the products of water electrolysis for sanitizing produce. The electrochemistry of water was described centuries ago in the work of Sir Humphrey Davey, and in the 1837 publication of Michael Faraday entitled "The Laws of Electrolysis." Recent advances in metal and ceramic sciences has enabled the electrolysis of water to be selectively controlled, and can result in the production of two end-products, each with their own unique properties. The cathode produces a solution known as catholyte. which possesses unique de-soiling properties. The anode produces a product known as anolyte, which has been shown to have strong sanitizing qualities. Thus, the methods described herein utilize a catholyte solution, in combination with chlorine and/or peroxyacetic acid solutions, to reduce the microbial load of the produce.

The methods disclosed herein show that the use of multiple, unique sanitizers applied to the wash waters of freshly harvested produce eliminates bacterial contaminants on the produce. Moreover, a particular embodiment of the present disclosure is based, at least in part, on the surprising discovery that the use of a catholyte solution as part of a sequential treatment in combination with chlorine ($Cl_2$) and peroxyacetic acid (PAA) results in at least an equivalent reduction of nascent bacterial load of raw, unwashed produce, as compared to a similar treatment using chlorine dioxide in combination with chlorine and PAA; as well as an at least an equivalent reduction in bacterial load of each of three different bacterial pathogens on produce, as compared to a similar treatment using chlorine dioxide in combination with chlorine and PAA. Furthermore, sequential treatment with a catholyte solution, $Cl_2$, and PAA is compatible with any commercial processing method known in the art, including without limitation, those disclosed in U.S. Patent Publication No. 20140030402. Additionally, sequential treatment with a catholyte solution, chlorine ($Cl_2$), and peroxyacetic acid (PAA) can also be utilized to treat certified organic produce, as each sanitizer is approved for use with organics, when rinsed with potable water as a final step.

Accordingly, certain aspects of the present disclosure relate to a method for sanitizing produce, by: treating the produce with a catholyte solution for a period of time sufficient to de-soil the produce; treating the produce with a solution containing free available chlorine for a period of time sufficient to sanitize the produce; and treating the produce with a solution containing peroxyacetic acid for a period of time sufficient to further sanitize the produce, where treating with the catholyte solution, the solution containing free available chlorine, and the solution containing peroxyacetic acid yields at least an additional 1 log unit reduction in microbial load, as compared to produce treated with a single solution selected from the catholyte solution, the solution containing free available chlorine, and the solution containing peroxyacetic acid. In certain embodiments, treating with the catholyte solution sanitizes the produce. In certain embodiments, treating with the catholyte solution occurs prior to treating with the solution containing free available chlorine. In certain embodiments, treating with the solution containing free available chlorine occurs prior to treating with the solution containing peroxyacetic acid. In certain embodiments, treating with the catholyte solution occurs prior to treating with the solution containing peroxyacetic acid. In certain embodiments, treating with the solution containing peroxyacetic acid occurs prior to treating with the solution containing free available chlorine. In certain embodiments, treating with the solution containing free available chlorine occurs prior to treating with the solution containing peroxyacetic acid. In certain embodiments, treating with the solution containing peroxyacetic acid occurs prior to treating with the catholyte solution. In certain embodiments, treating with the solution containing peroxyacetic acid occurs prior to treating with the catholyte solution. In certain embodiments, treating with the catholyte solution occurs prior to treating with the solution containing free available chlorine. In certain embodiments, treating with the solution containing peroxyacetic acid occurs prior to treating with the solution containing free available chlorine.

Other aspects of the present disclosure relate to a method for sanitizing produce, by: treating the produce with a catholyte solution to yield a catholyte treated produce; treating the catholyte treated produce with a solution containing free available chlorine to yield a chlorine treated produce; and treating the chlorine treated produce with a solution containing peroxyacetic acid to yield sanitized produce, where treating with the catholyte solution, the solution containing free available chlorine, and the solution containing peroxyacetic acid yields at least an additional 1 log unit reduction in microbial load, as compared to produce treated with a single solution selected from the catholyte solution, the solution containing free available chlorine, and the solution containing peroxyacetic acid. In certain embodiments that may be combined with any of the preceding embodiments, the solution containing free available chlorine is an anolyte solution. In certain embodiments that may be combined with any of the preceding embodiments, the solution containing peroxyacetic acid has a peroxyacetic acid concentration that ranges from 40 ppm to 80 ppm. In certain embodiments that may be combined with any of the preceding embodiments, treating with solution containing peroxyacetic acid occurs at a pH that ranges from 5-7. In certain embodiments that may be combined with any of the preceding embodiments, treating with the solution containing peroxyacetic acid occurs at a temperature that ranges from 32° F. to 150° F. In certain embodiments that may be combined with any of the preceding embodiments, treating with the solution containing peroxyacetic acid occurs for a period of time that ranges from 10 seconds to 180 seconds. In certain embodiments that may be combined with any of the preceding embodiments, treating with the solution containing peroxyacetic acid includes immersing the produce in a wash tank containing the catholyte solution. In certain embodiments that may be combined with any of the preceding embodiments, the produce may be further treated with a second solution containing free available chlorine. In certain embodiments that may be combined with any of the preceding embodiments, treating with the catholyte solution, the solution containing free available chlorine, and the solution containing peroxyacetic acid yields an additional log unit reduction in microbial load that ranges from 1.5 to 6, as compared to produce treated with a single solution selected from the catholyte solution, the solution containing free available chlorine, and the solution containing peroxyacetic acid. In certain embodiments that may be combined with any of the preceding embodiments, treating with the catholyte solution, the solution containing free available chlorine, and the solution containing peroxyacetic acid yields an increase in shelf-life of the produce, as compared to produce treated with a single solution selected from the catholyte solution, the solution containing free available chlorine, and the solution containing peroxyacetic acid.

Still other aspects of the present disclosure relate to a method for sanitizing produce, by: treating the produce with a catholyte solution to yield a catholyte treated produce; treating the catholyte treated produce with a solution containing free available chlorine to yield a chlorine treated produce; and treating the chlorine treated produce with a second solution containing free available chlorine to yield sanitized produce, where treating with the catholyte solution, the solution containing free available chlorine, and the second solution containing free available chlorine yields at least an additional 1 log unit reduction in microbial load, as compared to produce treated with a single solution selected from the catholyte solution, the solution containing free available chlorine and the second solution containing free available chlorine. In certain embodiments, the solution containing free available chlorine is an anolyte solution. In certain embodiments, the second solution containing free available chlorine is an anolyte solution. In certain embodiments that may be combined with any of the preceding embodiments, the solution containing free available chlorine and the second solution containing free available chlorine have the same concentration of free available chlorine. In certain embodiments that may be combined with any of the preceding embodiments, treating with the catholyte solution, the solution containing free available chlorine, and the second solution containing free available chlorine yields an additional log unit reduction in microbial load that ranges from 1.5 to 6, as compared to produce treated with a single solution selected from the catholyte solution, the solution containing free available chlorine, and the second solution containing free available chlorine. In certain embodiments that may be combined with any of the preceding embodiments, treating with the catholyte solution, the solution containing free available chlorine, and the second solution containing free available chlorine yields an increase in shelf-life of the produce, as compared to produce treated with a single solution selected from the catholyte solution, the solution containing free available chlorine, and the second solution containing free available chlorine.

In certain embodiments that may be combined with any of the preceding embodiments, the catholyte solution is a diluted catholyte solution that is used as a 10% dilution. In certain embodiments that may be combined with any of the preceding embodiments, the catholyte solution has a pH that ranges from approximately 11.0 to approximately 13.0. In certain embodiments that may be combined with any of the preceding embodiments, the catholyte solution has a pH that ranges from approximately 9.0 to approximately 11.0. In certain embodiments that may be combined with any of the preceding embodiments, treating with the catholyte solution dissolves biofilm on the surface of the produce. In certain embodiments that may be combined with any of the preceding embodiments, treating with the catholyte solution occurs at a temperature that ranges from 32° F. to 150° F. In certain embodiments that may be combined with any of the preceding embodiments, treating with the catholyte solution occurs for a period of time that ranges from 10 seconds to 180 seconds. In certain embodiments that may be combined with any of the preceding embodiments, treating with the catholyte solution includes immersing the produce in a wash tank containing the catholyte solution. In certain embodiments that may be combined with any of the preceding embodiments, the solution containing free available chlorine and/or the second solution containing free available chlorine has a free available chlorine concentration that ranges from 10 ppm to 80 ppm. In certain embodiments that may be combined with any of the preceding embodiments, treating with the solution containing free available chlorine and/or the second solution containing free available chlorine occurs at a pH that ranges from 5 to 7.5. In certain embodiments that may be combined with any of the preceding embodiments, treating with the solution containing free available chlorine and/or the second solution containing free available chlorine occurs at a temperature that ranges from 32° F. to 150° F. In certain embodiments that may be combined with any of the preceding embodiments, treating with the solution containing free available chlorine and/or the second solution containing free available chlorine occurs for a period of time that ranges from 10 seconds to 180 seconds. In certain embodiments that may be combined with any of the preceding embodiments, treating with the solution containing free available chlorine and/or the second solution containing free available chlorine includes immersing the produce in a wash tank containing the catholyte solution. In certain embodiments that may be combined with any of the preceding embodiments, the produce may be sonicated before, concurrently, or after treating with the catholyte solution, the solution containing free available chlorine, the solution containing peroxyacetic acid, and/or the second solution containing free available chlorine. In certain embodiments, the sonicating occurs at multiple frequencies. In certain embodiments, the sonicating occurs for an amount of time that ranges from 10 seconds to 120 seconds. In certain embodiments that may be combined with any of the preceding embodiments, the produce may be treated with a pulsed electric field before, concurrently, or after treating with the catholyte solution, the solution containing free available chlorine, the solution containing peroxyacetic acid, and/or the second solution containing free available chlorine. In certain embodiments that may be combined with any of the preceding embodiments, the produce may be treated with an anolyte solution before, concurrently, or after treating with the catholyte solution, the solution containing free available chlorine, the solution containing peroxyacetic acid, and/or the second solution containing free available chlorine. In certain embodiments that may be combined with any of the preceding embodiments, the catholyte solution further comprises anolyte. In certain embodiments, the anolyte provides an additional reduction in microbial load. In certain embodiments that may be combined with any of the preceding embodiments, the catholyte solution further comprising anolyte is reused for a subsequent produce treatment. In certain embodiments that may be combined with any of the preceding embodiments, the catholyte solution further comprising anolyte comprises free available chlorine at a concentration of 10 ppm to 50 ppm. In certain embodiments, the catholyte solution further comprising anolyte comprises free available chlorine at a concentration of 10 ppm to 20 ppm. In certain embodiments that may be combined with any of the preceding embodiments, the produce may be treated with ozone before, concurrently, or after treating with the catholyte solution, the solution containing free available chlorine, the solution containing peroxyacetic acid, and/or the second solution containing free available chlorine. In certain embodiments that may be combined with any of the preceding embodiments, the catholyte solution further comprises ozone. In certain embodiments, the ozone provides an additional reduction in microbial load. In certain embodiments that may be combined with any of the preceding embodiments, the catholyte solution further comprising ozone is reused for a subsequent produce treatment. In certain embodiments that may be combined with any of the preceding embodiments, the catholyte solution further comprises ozone at a concentration of between about 0.15 ppm and about 3 ppm. In certain embodiments that may be combined with any of the preceding embodiments, the catholyte solution further comprises a sanitizer selected from peroxyacetic acid, free available chlorine, chlorine dioxide, an alcohol, peroxide, and an ammonia-based sanitizer. In certain embodiments, the catholyte solution further comprising the sanitizer is reused for a subsequent produce treatment. In certain embodiments that may be combined with any of the preceding embodiments, the produce may be treated with potable water after treating with the catholyte solution, the solution containing free available chlorine, and the solution containing peroxyacetic acid; or after treating with the catholyte solution, the solution containing free available chlorine and the second solution containing free available chlorine. In certain embodiments, the produce is sprayed with potable water. In certain embodiments, the produce is dried after spraying with potable water. In certain embodiments that may be combined with any of the preceding embodiments, the microbial load includes pathogenic bacteria. In certain embodiments that may be combined with any of the preceding embodiments, the microbial load includes nascent bacteria. In certain embodiments that may be combined with any of the preceding embodiments, the produce may include a vegetable, a leafy vegetable, lettuce, spinach, a ground plant, sprouts, a squash, a melon, a gourd, a fruit, a berry, a nut, a drupe, an achene, and any combination thereof.

Still other aspects of the present disclosure relate to a method for sanitizing produce, by: treating the produce with a sodium hydroxide solution for a period of time sufficient to de-soil the produce; treating the produce with a solution containing free available chlorine for a period of time sufficient to sanitize the produce; and treating the produce with a second solution containing free available chlorine for a period of time sufficient to further sanitize the produce, where treating with the sodium hydroxide solution, the solution containing free available chlorine, and the second solution containing free available chlorine yields at least an additional 1 log unit reduction in microbial load, as compared to produce treated with a single solution selected from the sodium hydroxide solution, the solution containing free available chlorine, and the solution containing peroxyacetic acid. In certain embodiments, treating with the sodium hydroxide solution sanitizes the produce. In certain embodiments, treating with the sodium hydroxide solution occurs prior to treating with the solution containing free available chlorine. In certain embodiments, the sodium hydroxide solution has a pH that ranges from approximately 8.0 to approximately 12.0. In certain embodiments, the first solution containing free available chlorine has a free available chlorine concentration that ranges from 40 ppm to 80 ppm. In certain embodiments, the second solution containing free available chlorine has a free available chlorine concentration that ranges from 40 ppm to 80 ppm. In certain embodiments, the sodium hydroxide solution further comprises free available chlorine. In certain embodiments, the sodium hydroxide solution further comprises free available chlorine at a concentration of about 10 ppm to about 50 ppm.

Still other aspects of the present disclosure relate to a sanitized produce prepared by the method of any of the preceding embodiments. In certain embodiments, the produce may include a vegetable, a leafy vegetable, lettuce, spinach, a ground plant, sprouts, a squash, a melon, a gourd, a fruit, a berry, a nut, a drupe, an achene, and any combination thereof.

BRIEF DESCRIPTION OF THE DRAWINGS

FIG. 9A depicts an example of commodity Romaine lettuce from a grocery store. FIG. 9B depicts a Romaine lettuce leaf after removal of the mid-rib.

FIG. 12 is a table depicting results of utilizing triple wash systems to reduce bacterial loads on chopped lettuce under laboratory or commercial conditions. "Treat" refers to the triple wash treatment utilized; "Initial Micro" refers to initial microbial load in log units; "Micro Red" refers to microbial log unit reduction after treatment; and "Micro Red to Control" refers microbial log unit reduction after treatment as compared to control. The condition is indicated as either "Lab," referring to laboratory conditions; or "Commercial," which refers to commercial processing plant conditions. As indicated in FIG. 12, Wash 1 is performed for 20 seconds, Wash 2 is performed for 90 seconds, and Wash 3 is performed for 30 seconds.

FIG. 14 is a table depicting results of utilizing triple wash systems to reduce bacterial loads on commodity Romaine lettuce contaminated with *E. coli* O157:H7, sv. *Typhimurium*, or *Listeria monocytogenes*. Each treatment ("Treat") was compared to a no treatment control ("NTC"). The mean and standard deviation ("Stdev") of the bacterial count for each sample is given, as well as the average log reduction of each treatment compared to the corresponding NTC. The initial pathogen load for all conditions was $10^5$. For each pathogen, three treatments were compared to a corresponding NTC: Catholyte Wash (in order, 10% Catholyte solution for 20 s, 60 ppm $Cl_2$ for 90 s, then 80 ppm PAA for 30 s; white rows), Chlorine Wash (in order, 60 ppm $Cl_2$ for 20 s, 60 ppm $Cl_2$ for 90 s, then 60 ppm $Cl_2$ for 30 s; light gray rows), and ClO$_2$ Wash (in order, 20 ppm ClO$_2$ for 20 s, 60 ppm Cl$_2$ for 90 s, then 80 ppm PAA for 30 s; dark gray rows).

DETAILED DESCRIPTION

Figure 1A:
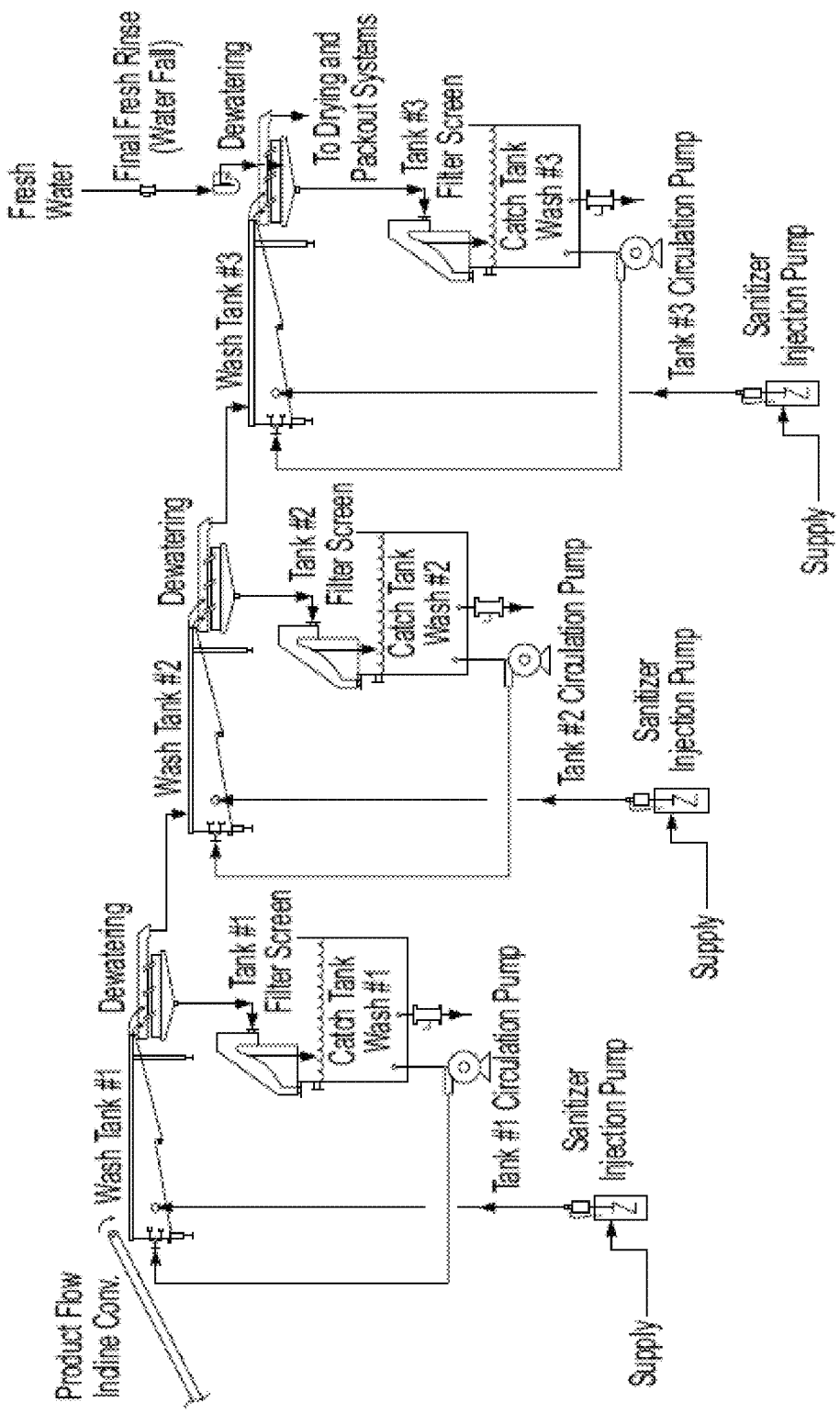
FIG. 1A is a diagram of an exemplary wash system for sanitizing produce that includes three open flumes.

The following description sets forth exemplary configurations, parameters, and the like. It should be recognized, however, that such description is not intended as a limitation on the scope of the present invention, but is instead provided as a description of exemplary embodiments.

Overview

The following embodiments describe methods for sanitizing produce by treating the produce with a catholyte solution, treating with a solution containing free available chlorine (FAC), and a solution containing peroxyacetic acid (PAA) and/or a second solution containing FAC. While treatment with the catholyte solution, the FAC solution, and the PAA solution and/or second solution containing FAC may be performed in any order, in certain preferred embodiments, the produce is first treated with the catholyte solution, then the FAC solution, and finally with the PAA solution and/or second solution containing FAC.

In a certain embodiment of the present disclosure, it was surprisingly found that sequential treatment of produce with catholyte, FAC, and PAA solutions provides equivalent, or even more effective, elimination of microbial (e.g., bacterial) contamination, as compared to sequential treatment of produce with ClO$_2$, FAC, and PAA solutions. In particular, sequential treatment of produce with catholyte, FAC, and PAA solutions results in approximate 0.3 log unit reduction in microbial load of each of three different pathogenic bacteria, as compared to produce treated with a sequential treatment of ClO$_2$, FAC, and PAA solutions. In addition, sequential treatment of produce with catholyte, FAC, and PAA solutions was found to be as effective as sequential treatment of produce with ClO$_2$, FAC, and PAA solutions in reducing bacterial load of unwashed produce. This result is surprising given the well-known use of ClO$_2$ as a sanitizing agent for produce, and moreover the equivalent or greater efficacy of catholyte is advantageous given the health hazards associated with ClO$_2$.

Advantageously, the methods for sanitizing produce of the present disclosure that utilize catholyte, FAC, and PAA solutions are compatible with any produce processing method known in the art. Moreover, the methods for sanitizing produce of the present disclosure are also compatible with any produce processing plant or system known in the art including, without limitation, systems that utilize open flumes (i.e., wash tanks) (e.g., FIG. 1A) and systems that utilize piping with open and closed loop flumes. Accordingly, the methods for sanitizing produce of the present may be utilized with any commercial produce processing method and in any commercial produce processing plant or system.

As used herein, "sanitize" refers to reducing the microbial load on produce by treating with a sanitizer solution, such as a catholyte solution, a FAC solution, and/or a PAA solution, as compared to produce that has not been treated with the sanitizer solution. The reduction in microbial load may be determined by any method known in the art, for example by measuring total aerobic plate counts in colony forming units per gram (CFU/g) or by measuring total log unit reduction in microbial load.

As used herein, "de-soiling" refers to the removal of organic and inorganic materials from produce surfaces. Certain aspects of the present disclosure relate to using a de-soiling treatment, e.g., treatment with a catholyte solution, in combination with a sanitizer solution, e.g., a FAC solution, and/or a PAA solution, to disinfect produce.

Accordingly, certain aspects of the present disclosure provide methods for sanitizing produce, by treating the produce with a catholyte solution for a period of time sufficient to de-soil the produce; treating the produce with a solution containing free available chlorine (FAC) for a period of time sufficient to further sanitize the produce; and treating the produce with a solution containing peroxyacetic acid for a period of time sufficient to further sanitize the produce, where treating with the catholyte solution, the solution containing chlorine, and the solution containing peroxyacetic acid yields at least an additional 1 log unit reduction in microbial load, as compared to produce treated with a single solution selected from the catholyte solution, the solution containing FAC, and the solution containing peroxyacetic acid.

Other aspects of the present disclosure provide methods for sanitizing produce, by treating the produce with a mixture of a catholyte solution and a solution containing FAC for a period of time sufficient to sanitize the produce; and treating the produce with a solution containing peroxyacetic acid for a period of time sufficient to further sanitize the produce, where treating with the catholyte solution, the solution containing FAC, and the solution containing peroxyacetic acid yields at least an additional 1 log unit reduction in microbial load, as compared to produce treated with a single solution selected from the catholyte solution, the solution containing FAC, and the solution containing peroxyacetic acid.

Further aspects of the present disclosure provide a method for sanitizing produce, by treating the produce with a catholyte solution to yield a catholyte treated produce; treating the catholyte treated produce with a solution containing free available chlorine (FAC) to yield a chlorine treated produce; and treating the chlorine treated produce with a solution containing peroxyacetic acid to yield sanitized produce, where treating with the catholyte solution, the solution containing FAC, and the solution containing peroxyacetic acid yields at least an additional 1 log unit reduction in microbial load, as compared to produce treated with a single solution selected from the catholyte solution, the solution containing FAC, and the solution containing peroxyacetic acid. Yet further aspects of the present disclosure provide a method for sanitizing produce, by treating the produce with a catholyte solution to yield a catholyte treated produce; treating the catholyte treated produce with a solution containing FAC to yield a chlorine treated produce; and treating the chlorine treated produce with a second solution containing FAC to yield a sanitized produce, where treating with the catholyte solution, the solution containing FAC, and the second solution containing FAC yields at least an additional 1 log unit reduction in microbial load, as compared to produce treated with a single solution selected from the catholyte solution, the solution containing FAC, and the second solution containing FAC. In certain preferred embodiments, the solution containing FAC and/or the second solution containing FAC is an anolyte solution.

Still other aspects of the present disclosure provide a method for sanitizing produce, by treating with the catholyte solution having a dilution that ranges from 1% to 20% to yield a catholyte treated produce, where treating with the catholyte solution occurs for an amount of time that ranges from 10 seconds to 180 seconds at a pH that ranges from approximately 8.0 to approximately 14.0 (e.g., approximately 9.0 to approximately 11.0) and a temperature that ranges from 32° F. to 150° F.; treating the catholyte treated produce with a solution containing chlorine having a free available chlorine concentration that ranges from 10 ppm to 80 ppm to yield a chlorine treated produce, where treating with the solution containing chlorine occurs for an amount of time that ranges from 10 seconds to 180 seconds at a pH that ranges from 5 to 7.5 and a temperature that ranges from 32° F. to 150° F.; and treating the chlorine treated produce with a solution containing peroxyacetic acid having a peroxyacetic acid concentration that ranges from 40 ppm to 80 ppm to yield sanitized produce, where treating with the solution containing peroxyacetic acid occurs for an amount of time that ranges from 10 seconds to 180 seconds at a pH that ranges from 2.5 to 7 and a temperature that ranges from 32° F. to 150° F., and where treating with the catholyte solution, the solution containing chlorine, and the solution containing peroxyacetic acid yields at least an additional 1 log unit reduction in microbial load, as compared to produce treated with a single solution selected from the catholyte solution, the solution containing chlorine, and the solution containing peroxyacetic acid.

Still other aspects of the present disclosure provide a method for sanitizing produce, by treating with the catholyte solution having a dilution that ranges from 1% to 20% to yield a catholyte treated produce, where treating with the catholyte solution occurs for an amount of time that ranges from 10 seconds to 180 seconds at a pH that ranges from approximately 8.0 to approximately 14.0 (e.g., approximately 9.0 to approximately 11.0) and a temperature that ranges from 32° F. to 150° F.; treating the catholyte treated produce with a solution containing free available chlorine (FAC) having a FAC concentration that ranges from 10 ppm to 80 ppm to yield a chlorine treated produce, where treating with the solution containing FAC occurs for an amount of time that ranges from 10 seconds to 180 seconds at a pH that ranges from 5 to 9 (e.g., 5 to 7.5) and a temperature that ranges from 32° F. to 150° F.; and treating the chlorine treated produce with a second solution containing FAC having a free available chlorine concentration that ranges from 10 ppm to 80 ppm to yield sanitized produce, where treating with the second solution containing FAC occurs for an amount of time that ranges from 10 seconds to 180 seconds at a pH that ranges from 5 to 9 (e.g., 5 to 7.5) and a temperature that ranges from 32° F. to 150° F., and where treating with the catholyte solution, the solution containing FAC, and the second solution containing FAC yields at least an additional 1 log unit reduction in microbial load, as compared to produce treated with a single solution selected from the catholyte solution, the solution containing FAC, and the second solution containing FAC.

As used herein, "produce" refers to fruits, including but not limited to fresh fruit, nuts, and vegetables. Accordingly, in certain embodiments, produce that may be treated with any of the methods for sanitizing of the present disclosure include, without limitation, a vegetable, a leafy vegetable, lettuce, spinach, a ground plant (e.g., a root vegetable), sprouts, a squash, a melon, a gourd, a fruit, a berry, a nut, a drupe, an achene, and any combination thereof.

In some embodiments, the microbial load on produce, which may be reduced by the methods described herein, includes pathogenic bacteria. Examples of pathogenic bacteria may include any species or combination of species that causes disease in mammals, such as, e.g., *E. coli*, sv. *Typhimurium* (*Salmonella enterica* sv. *Typhimurium*; the term "*Salmonella*" may be used interchangeably herein), and *Listeria monocytogenes*. In some embodiments, the microbial load on produce, which may be reduced by the methods described herein, includes nascent bacteria. In some embodiments, nascent bacteria may include natural microflora present on produce, e.g., lettuce, spinach, or any other form of produce of the present disclosure. In some embodiments, nascent bacteria are present on produce before treatment at an amount between $10^3$ and $10^6$. In some embodiments, nascent bacteria may include non-pathogenic bacteria.

Catholyte Solutions

Certain aspects of the present disclosure relate to treating produce with a catholyte solution. Catholyte solutions are known in the art. In some embodiments, a catholyte solution of the present disclosure may be a catholyte solution as described in U.S. Pat. No. 8,282,974, which is hereby incorporated by reference in its entirety.

As used herein, "catholyte" refers to the electrolyte generated by the cathode of an electrolytic cell.

As used herein, "anolyte" refers to the electrolyte generated by the anode of an electrolytic cell.

As used herein, "ionic solution" refers to aqueous based solutions of dissolved ions, such as sodium chloride or sodium bicarbonate ions, which are activated and separated by the electro-chemical reaction of the electrolysis process. Ionic solutions are referred to as electro-chemically activated ("ECA") solutions.

A percent dilution of a solution (e.g., a "10% dilution") refers to a solution where X parts of the solution are diluted in 100-X parts of a solvent. In a non-limiting example, a 10% catholyte solution would be composed of 10 parts catholyte diluted in 90 (i.e., 100-10) parts water.

In certain embodiments, a catholyte solution of the present disclosure is used as a 20%, 19%, 18%, 17%, 16%, 15%, 14%, 13%, 12%, 11%, 10%, 9%, 8%, 7%, 6%, 5%, 4%, 3%, 2%, or 1% dilution. In a preferred embodiment, the catholyte solution is used as a 10% dilution. In some embodiments, the dilution of the catholyte solution may be adjusted to maintain a target process pH range in the mixed wash solution.

As used herein, "laminar flow" refers to smooth fluid flow or fluid flowing in parallel layers, with substantially no disruption between the layers. Laminar flow is characterized by high momentum diffusion, low momentum convection, and by a pressure and velocity substantially independent from time. Laminar flow is the opposite of turbulent or rough flow.

Methods of making catholyte solutions are known in the art. To use a non-limiting embodiment of the present disclosure as an example for making a catholyte solution, a first step a brine (i.e., NaCl) solution is electrolyzed using an electrolytic cell that produces laminar flow to generate a catholyte solution having an approximate pH of 13 and an anolyte solution having an approximate pH of 7. The electrolysis may be performed less than six hours prior to treating produce; however, anolyte solutions may be stored for several weeks if necessary. Following the electrolysis step, the catholyte solution is diluted to a 10% dilution and the anolyte solution is diluted to a concentration of 60 ppm FAC. The produce is then immersed in a wash tank containing the diluted catholyte solution for a period of time sufficient to sanitize the produce. In some embodiments, the produce is further treated with a solution containing chlorine for a period of time sufficient to sanitize the produce; and treating the produce with a solution containing peroxyacetic acid for a period of time sufficient to further sanitize the produce.

Catholyte Production and Treatment of Produce with a Catholyte Solution

The process of electrolysis begins with an aqueous ionic solution that has a given conductivity due to the salts dissolved in the water. When the ionic solution is contacted with an electric current passing between two electrodes, one with negative polarity and the other with positive polarity, the solution becomes activated. When the water volume is separated by a dielectric barrier, or membrane that prevents molecular passage, but accommodates ionic transfer or passage, the activated ionic solution is split into two streams: a catholyte stream and an anolyte stream. Both the catholyte and the anolyte streams have significant electro-chemical energy, one with negatively charged ions, and the other with positively charged ions and free radicals. The electro-chemical energy of the catholyte and anolyte relaxes with the passage of time, and without some further treatment, there is a total relaxation of molecules after a period of months, wherein the solutions revert to their original ingredients and state (i.e. water and dissolved ions). Thus, it is important that the catholyte and anolyte solutions be monitored for their efficacy and used before becoming ineffective. In some embodiments, the catholyte and anolyte are produced shortly before their use. In some embodiments, the catholyte and anolyte are produced within 9 months before their use.

Another relevant aspect of the electrolysis process is the type of electrolytic cell used. For example, using an electrolytic cell that produces laminar flow in the divided water volume generates different chemistries compared to an electrolytic cell that produces turbulent flow. Laminar flow cells enable uniform contact of the anode and cathode surfaces to individual molecules within the ionic solution column, whereas turbulent flow cell energy exchange surfaces have reduced uniformity of contact with each micro volume or cluster of solution. Laminar flow cells also keep the two electrolyte streams separate through the process, whereas turbulent flow cells mix the streams internally yielding a single stream of solution with a pH that is roughly controlled between 7.8 and 8.8. Furthermore, laminar flow cells enable optimal salt conversion rates. This is indicative of the optimization of energy exchange, given the solutions, conductivity, and flow rate. The net result is that there are no residues when the solutions evaporate, which is a significant advantage for many specific food and remediation applications. Using a laminar flow cell produces distinct catholyte and anolyte stoichiometries that can provide better de-soiling and disinfecting properties.

Therefore, the methods disclosed herein may include electrolysis (the term "electrolyzing" may be used interchangeably herein) of an ionic solution to generate the catholyte solution. Preferably the catholyte solution is generated by an electrolytic cell that produces laminar flow. In preferred embodiments, the electrolytic cell may comprise ceramic dielectric membranes. In a particularly preferred embodiment, the electrolytic cell is an IET, Inc. ECAFLOW C101 electrolytic cell.

In certain embodiments, the electrolysis occurs prior to treating the produce with the catholyte solution. In preferred embodiments, the electrolysis occurs less than 72 hours, 60 hours, 48 hours, 36 hours, 24 hours, 20 hours, 15 hours, 12 hours, 10 hours, 8 hours, 6 hours, 5 hours, 4 hours, 3 hours, 2 hours, or 1 hour prior to treating the produce with the catholyte solution. In a particularly preferred embodiment, the electrolysis occurs less than 6 hours prior to treating the produce with the catholyte solution.

Any aqueous ionic solution known in the art may be used for electrolysis. Preferably, the electrolysis utilizes a brine or bicarbonate solution to produce two sets of compounds: catholytes and anolytes. The compounds formed at the positive pole of the electrolytic cell are known as catholytes. Catholytes are not caustic, but do possess a high pH. The catholyte solutions do not possess hydroxide ions but rather lack hydrogen ions, which accounts for the high pH, since $-\log [H^+]=pH$. In addition, the catholyte solutions possess the ability to reduce surface tension to a level similar to that produced by diluted, non-ionic chemical surfactants, which are unusable with the methods disclosed herein. The compounds formed at the negative pole of the electrolytic cell are known as anolytes. Typically, the anolytes produced by the methods described herein are complex mixtures containing a high level of free chlorine, mostly existing as hypochlorous acid. However, the anolytes also contain many other reactive species of oxygen in the form of free radicals, which are well known to have significant anti-microbial characteristics.

Preferably the catholyte solution is dosed into a wash tank, or "flume," that may be used for treating the produce. Alternatively, a portion of the catholyte solution may be stored in a spraying container. In certain embodiments, treating the produce with the catholyte solution includes immersing the produce in a wash tank containing the catholyte solution. The methods disclosed herein may further include spraying the produce with the catholyte solution prior to immersing the produce in the wash tank containing the catholyte solution.

The catholyte solution may be used in an undiluted state, or it may be used as a dilution. In certain embodiments, the catholyte solution is used as a 95%, 90%, 85%, 80%, 75%, 65%, 55%, 50%, 40%, 30%, 25%, 20%, 19%, 18%, 17%, 16%, 15%, 14%, 13%, 12%, 11%, 10%, 9%, 8%, 7%, 6%, 5%, 4%, 3%, 2%, 1%, or less than a 1% dilution. Without wishing to be bound to theory, it is thought that a 3% dilution of the catholyte solution results in the best produce de-soiling with the least amount of damage to the produce structure and surface lipids. Thus in particularly preferred embodiments, the catholyte solution is used as at least a 3% dilution. In some embodiments, the catholyte solution may be used at a concentration sufficient to provide a pH of interest, e.g., a pH of between about 9 and about 11. In some embodiments, a "neat" or less diluted catholyte solution having a particular concentration (e.g., sufficient to provide a pH from approximately 11.0 to approximately 13.0) may be added to produce, thus diluting the catholyte solution contacting the produce to a dilution of interest (e.g., sufficient to provide a pH from approximately 9.0 to approximately 11.0).

The catholyte solution generated by the electrolytic cell preferably has a high pH. For example, the catholyte solution may have a pH that is approximately 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, or 14.0. In a certain embodiment, the catholyte solution has a pH that ranges from approximately 9.5 to approximately 13.5. In a certain embodiment, the catholyte solution has a pH that ranges from approximately 11.0 to approximately 13.0. In a certain embodiment, the catholyte solution has an approximate pH of 13.0. In a certain embodiment, the catholyte solution has a pH that ranges from approximately 9.0 to approximately 11.0. As described herein, in some embodiments, a "neat" or undiluted catholyte solution having a particular pH (e.g., from approximately 11.0 to approximately 13.0) may be added to produce, thus diluting the catholyte solution contacting the produce to a pH of interest, e.g., approximately 9.0 to approximately 11.0. In a certain embodiment, the catholyte solution has an approximate pH of 10.0. As used herein "approximate pH" and "pH that ranges from approximately" refer to a pH that varies by +1-0.2 (e.g., pH 12.8 to 13.2).

Moreover, produce is treated with a catholyte solution of the present disclosure for a period of time that is sufficient to sanitize the produce. For example, produce may be treated with a catholyte solution of the present disclosure for a period of time that ranges from 10 seconds to 180 seconds, from 15 seconds to 180 seconds, from 20 seconds to 180 seconds, from 25 seconds to 180 seconds, from 30 seconds to 180 seconds, from 35 seconds to 180 seconds, from 40 seconds to 180 seconds, from 45 seconds to 180 seconds, from 50 seconds to 180 seconds, from 55 seconds to 180 seconds, from 60 seconds to 180 seconds, from 65 seconds to 180 seconds, from 70 seconds to 180 seconds, from 75 seconds to 180 seconds, from 80 seconds to 180 seconds, from 81 seconds to 180 seconds, from 82 seconds to 180 seconds, from 83 seconds to 180 seconds, from 84 seconds to 180 seconds, from 85 seconds to 180 seconds, from 86 seconds to 180 seconds, from 87 seconds to 180 seconds, from 88 seconds to 180 seconds, from 89 seconds to 180 seconds, from 90 seconds to 180 seconds, from 91 seconds to 180 seconds, from 92 seconds to 180 seconds, from 93 seconds to 180 seconds, from 94 seconds to 180 seconds, from 95 seconds to 180 seconds, from 96 seconds to 180 seconds, from 97 seconds to 180 seconds, from 98 seconds to 180 seconds, from 99 seconds to 180 seconds, from 100 seconds to 180 seconds, from 105 seconds to 180 seconds, from 110 seconds to 180 seconds, from 115 seconds to 180 seconds, from 120 seconds to 180 seconds, from 130 seconds to 180 seconds, from 140 seconds to 180 seconds, from 150 seconds to 180 seconds, from 160 seconds to 180 seconds, or from 170 seconds to 180 seconds. Alternatively, produce may be treated with a solution of the present disclosure containing free available chlorine for a period of time that ranges from 10 seconds to 180 seconds, from 10 seconds to 170 seconds, from 10 seconds to 160 seconds, from 10 seconds to 150 seconds, from 10 seconds to 140 seconds, from 10 seconds to 130 seconds, from 10 seconds to 120 seconds, from 10 seconds to 115 seconds, from 10 seconds to 110 seconds, from 10 seconds to 105 seconds, from 10 seconds to 100 seconds, from 10 seconds to 99 seconds, from 10 seconds to 98 seconds, from 10 seconds to 97 seconds, from 1° seconds to 96 seconds, from 10 seconds to 95 seconds, from 10 seconds to 94 seconds, from 10 seconds to 93 seconds, from 10 seconds to 92 seconds, from 10 seconds to 91 seconds, from 10 seconds to 90 seconds, from 10 seconds to 89 seconds, from 10 seconds to 88 seconds, from 10 seconds to 87 seconds, from 10 seconds to 86 seconds, from 10 seconds to 85 seconds, from 10 seconds to 84 seconds, from 10 seconds to 83 seconds, from 10 seconds to 82 seconds, from 10 seconds to 81 seconds, from 10 seconds to 80 seconds, from 10 seconds to 75 seconds, from 10 seconds to 70 seconds, from 10 seconds to 65 seconds, from 10 seconds to 60 seconds, from 10 seconds to 55 seconds, from 10 seconds to 50 seconds, from 10 seconds to 45 seconds, from 10 seconds to 40 seconds, from 10 seconds to 35 seconds, from 10 seconds to 30 seconds, from 10 seconds to 25 seconds from 10 seconds to 20 seconds, or from 10 seconds to 15 seconds.

In other embodiments, produce may be treated with a catholyte solution of the present disclosure for approximately 10 seconds, approximately 15 seconds, approximately 20 seconds, approximately 25 seconds, approximately 30 seconds, approximately 35 seconds, approximately 40 seconds, approximately 45 seconds, approximately 50 seconds, approximately 55 seconds, approximately 60 seconds, approximately 62 seconds, approximately 64 seconds, approximately 65 seconds, approximately 66 seconds, approximately 68 seconds, approximately 70 seconds, approximately 72 seconds, approximately 74 seconds, approximately 75 seconds, approximately 76 seconds, approximately 78 seconds, approximately 80 seconds, approximately 81 seconds, approximately 82 seconds, approximately 83 seconds, approximately 84 seconds, approximately 85 seconds, approximately 86 seconds, approximately 87 seconds, approximately 88 seconds, approximately 89 seconds, approximately 90 seconds, approximately 91 seconds, approximately 92 seconds, approximately 93 seconds, approximately 94 seconds, approximately 95 seconds, approximately 96 seconds, approximately 97 seconds, approximately 98 seconds, approximately 99 seconds, approximately 100 seconds, approximately 112 seconds, approximately 114 seconds, approximately 115 seconds, approximately 116 seconds, approximately 118 seconds, approximately 120 seconds, approximately 130 seconds, approximately 140 seconds, approximately 150 seconds, approximately 160 seconds, approximately 170 seconds, or approximately 180 seconds. Preferably the methods disclosed herein are adapted to current processing plants that use piping with open and closed loop flumes that expose produce to solutions for approximately 10 seconds to 30 seconds. Thus, in a preferred embodiment, produce is treated with a catholyte solution of the present disclosure for approximately 20 seconds. In another embodiment, produce is treated with a catholyte solution of the present disclosure for approximately 10 seconds. As used herein an approximate time of treatment refers to a period of time that varies by +/−2 seconds (i.e., 20 seconds to 22 seconds).

Catholyte solutions of the present disclosure are further used at a temperature that is suitable to sanitize produce treated with such solutions. For example, catholyte solutions of the present disclosure may be used at a temperature that ranges from 32° F. to 150° F., from 32° F. to 145° F., from 32° F. to 140° F., from 32° F. to 135° F., from 32° F. to 130° F., from 32° F. to 125° F., from 32° F. to 120° F., from 32° F. to 115° F., from 32° F. to 110° F., from 32° F. to 105° F., from 32° F. to 100° F., from 32° F. to 95° F., from 32° F. to 90° F., from 32° F. to 85° F., from 32° F. to 80° F., from 32° F. to 75° F., from 32° F. to 70° F., from 32° F. to 69° F., from 32° F. to 68° F., from 32° F. to 67° F., from 32° F. to 66° F., from 32° F. to 65° F., from 32° F. to 60° F., from 32° F. to 55° F., from 32° F. to 50° F., from 32° F. to 45° F., from 32° F. to 40° F., from 32° F. to 39° F., from 32° F. to 38° F., from 32° F. to 37° F., from 32° F. to 36° F., from 32° F. to 35° F., from 32° F. to 34° F., or from 32° F. to 33° F. Alternatively, catholyte solutions of the present disclosure may be used at a temperature that ranges from 32° F. to 150° F., from 33° F. to 150° F., from 34° F. to 150° F., from 35° F. to 150° F., from 36° F. to 150° F., from 37° F. to 150° F., from 38° F. to 150° F., from 39° F. to 150° F., from 40° F. to 150° F., from 45° F. to 150° F., from 50° F. to 150° F., from 55° F. to 150° F., from 60° F. to 150° F., from 65° F. to 150° F., from 70° F. to 150° F., from 75° F. to 150° F., from 80° F. to 150° F., from 85° F. to 150° F., from 90° F. to 150° F., from 95° F. to 150° F., from 100° F. to 150° F., from 105° F. to 150° F., from 110° F. to 150° F., from 115° F. to 150° F., from 120° F. to 150° F., from 125° F. to 150° F., from 130° F. to 150° F., from 135° F. to 150° F., from 140° F. to 150° F., or from 145° F. to 150° F.

In other embodiments, catholyte solutions of the present disclosure are used at a temperature of approximately 32° F., approximately 33° F., approximately 34° F., approximately 35° F., approximately 36° F., approximately 37° F., approximately 38° F., approximately 39° F., approximately 40° F., approximately 41° F., approximately 42° F., approximately 43° F., approximately 44° F., approximately 45° F., approximately 46° F., approximately 47° F., approximately 48° F., approximately 49° F., approximately 50° F., approximately 51° F., approximately 52° F., approximately 53° F., approximately 54° F., approximately 55° F., approximately 56° F., approximately 57° F., approximately 58° F., approximately 59° F., approximately 60° F., approximately 61° F., approximately 62° F., approximately 63° F., approximately 64° F., approximately 65° F., approximately 66° F., approximately 67° F., approximately 68° F., approximately 69° F., approximately 70° F., approximately 75° F., approximately 80° F., approximately 85° F., approximately 90° F., approximately 95° F., approximately 100° F., approximately 105° F., approximately 110° F., approximately 115° F., approximately 120° F., approximately 125° F., approximately 130° F., approximately 135° F., approximately 140° F., approximately 145° F., or approximately 150° F.

Treating with a catholyte solution of the present disclosure de-soils the produce. In one embodiment, treating with the catholyte solution of the present disclosure de-soils the produce more effectively than detergents such as liquid dishwashing detergents. The de-soiling can be quantified, for example, by determining the neophalic turbidity unit (NTU) using a photo-electric device to determine the clarity of a water column. The lower the turbidity, the less interference there is to light passing through the water column. In preferred embodiments, treating with the catholyte solution of the present disclosure occurs for a period of time sufficient to yield at least a 95%, 85%, 75%, 65%, 50%, 45%, 40%, 35%, 30%, 25%, 24%, 23%, 22%, 21%, 20%, 19%, 18%, 17%, 16%, 15%, 14%, 13%, 12%, 11%, 10%, 9%, 8%, 7%, 6%, or 5% increase in de-soiling compared to treating with a detergent, under similar treatment conditions. In a particularly preferred embodiment, treating with the catholyte solution of the present disclosure occurs for a period of time sufficient to yield at least a 19% increase in de-soiling compared to treating with a detergent.

In some embodiments, treating with a catholyte solution of the present disclosure dissolves biofilm on the surface of the produce. It is well known that microbes, such as bacteria present on produce, form biofilms on the produce, which provide the microbes protection against sanitizer solutions. Removing such biofilms make the microbes more susceptible to elimination by sanitizer solutions. Accordingly, in certain embodiments, treating produce with a catholyte solution of the present disclosure dissolves microbial biofilms on the surface of the produce.

In some embodiments, treating with a catholyte solution of the present disclosure sanitizes the produce. As described above, catholyte solutions are known to de-soil produce. In addition, it is a surprising result of the present disclosure that treatment with a catholyte solution also sanitizes produce, as measured by the log reduction of bacterial load, as compared to treatment with water. Accordingly, in certain embodiments in addition to de-soiling produce a catholyte solution of the present disclosure may be used to also sanitize produce.

Optionally, treatment with a catholyte solution of the present disclosure may be combined with the application of kinetic energy, such as by sonication or ultrasonication, to improve removal of foreign organic compounds compared to conventional de-soiling and/or sanitizing treatments. As one non-limiting embodiment, a brine (i.e., NaCl) solution is electrolyzed using an electrolytic cell that produces laminar flow to generate a catholyte solution having an approximate pH of 13 and an anolyte solution having an approximate pH of 7. The electrolysis is performed less than six hours prior to treating produce. Following the electrolysis step, the catholyte solution is diluted to a 10% dilution. The produce is then immersed in a wash tank containing the diluted catholyte solution for 15 seconds to yield an immersed produce. Then, the immersed produce is ultrasonicated at a frequency of 58 kHz for 20 seconds. The ultrasonicated produce is then removed from the wash tank containing the catholyte solution, followed by treatment with one or more sanitizing solutions. For example, the ultrasonicated produce may be treated with a solution containing chlorine for a period of time sufficient to further sanitize the produce; and treating the produce with a solution containing peroxyacetic acid for a period of time sufficient to further sanitize the produce.

In some embodiments, produce may be treated with a sodium hydroxide solution. In some embodiments, the sodium hydroxide solution may be diluted to achieve a desired pH when contacting the produce. In some embodiments, the sodium hydroxide solution may have a pH that is approximately 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, or 12.0. In some embodiments, the sodium hydroxide solution may comprise a solution containing free available chlorine of the present disclosure (e.g., sodium hypochlorite) at any concentration described herein with respect to solutions containing free available chlorine (e.g., about 15 ppm). In some embodiments, the sodium hydroxide solution may be used at a concentration sufficient to provide a pH of interest, e.g., a pH of about 10. In some embodiments, a "neat" or less diluted sodium hydroxide solution having a particular concentration may be added to produce, thus diluting the sodium hydroxide solution contacting the produce to a dilution of interest (e.g., sufficient to provide a pH of about 10).

Solutions Containing Free Available Chlorine

Other aspects of the present disclosure relate to treating produce with a solution containing free available chlorine. Chlorine is the most widely used sanitizer in the food industry. Chlorine is used for the treatment of, for example, produce, and drinking, processing, and wash water. The ability of chlorine to destroy microorganisms depends on the amount of free available chlorine (FAC) in the solvent, such as water. Typically, the free available chlorine is the chlorine remaining after it reacts with organic matter.

As disclosed herein, free available chlorine solutions generally contain molecules of hypochlorous acid (HOCl), as well as the HOCl ions $H^+$ and $^-OCl$ in equilibrium. Typically, the non-dissociated form of HOCl is the form that exerts the lethal effect on microbes. Moreover, the equilibrium of these molecules is affected by pH. Moreover, chlorine sanitizers themselves change the pH. As the pH of the solution is lowered, equilibrium favors the antimicrobial form of HOCl. As such, pH is an important factor in the sanitizing effect of chlorine solutions.

Solutions containing free available chlorine may be produced by any suitable method known in the art. For example, the solution may be produced from chlorine gas, hypochlorite, or from the electrolysis of an aqueous ionic solution, such as brine solutions or bicarbonate solutions. In particular, the compounds formed at the negative pole of the electrolytic cell during electrolysis (i.e., anolytes) are complex mixtures containing a high level of free chlorine, mostly existing as hypochlorous acid (e.g., U.S. Pat. No. 8,282,974). Additionally, anolytes also contain many other reactive species of oxygen in the form of free radicals, which are well known to have significant anti-microbial characteristics.

Additionally, any free available chlorine-containing solution known in the art may also be used as a solution of the present disclosure containing free available chlorine. For example, the free available chlorine-containing solution may be sodium hypochlorite (e.g., bleach), calcium hypochlorite, or potassium hypochlorite.

Solutions of the present disclosure containing free available chlorine are used at a free available chlorine (FAC) concentration that is suitable to sanitize produce treated with such solutions. For example, solutions of the present disclosure containing free available chlorine may be used at a FAC concentration that ranges from 10 ppm to 80 ppm, from 10 ppm to 75 ppm, from 10 ppm to 70 ppm, from 10 ppm to 65 ppm, from 10 ppm to 60 ppm, from 10 ppm to 55 ppm, from 10 ppm to 50 ppm, from 10 ppm to 49 ppm, from 10 ppm to 48 ppm, from 10 ppm to 47 ppm, from 10 ppm to 46 ppm, from 10 ppm to 45 ppm, from 10 ppm to 44 ppm, from 10 ppm to 43 ppm, from 10 ppm to 42 ppm, from 10 ppm to 41 ppm, from 10 ppm to 40 ppm, from 10 ppm to 39 ppm, from 10 ppm to 38 ppm, from 10 ppm to 37 ppm, from 10 ppm to 36 ppm, from 10 ppm to 35 ppm, from 10 ppm to 34 ppm, from 10 ppm to 33 ppm, from 10 ppm to 32 ppm, from 10 ppm to 31 ppm, from 10 ppm to 30 ppm, from 10 ppm to 29 ppm, from 10 ppm to 28 ppm, from 10 ppm to 27 ppm, from 10 ppm to 26 ppm, from 10 ppm to 25 ppm, from 10 ppm to 24 ppm, from 10 ppm to 23 ppm, from 10 ppm to 22 ppm, from 10 ppm to 21 ppm, from 10 ppm to 20 ppm, from 10 ppm to 19 ppm, from 10 ppm to 18 ppm, from 10 ppm to 17 ppm, from 10 ppm to 16 ppm, or from 10 ppm to 15 ppm. Alternatively, solutions of the present disclosure containing free available chlorine may be used at a FAC concentration that ranges from 10 ppm to 80 ppm, 11 ppm to 80 ppm, 12 ppm to 80 ppm, 13 ppm to 80 ppm, 14 ppm to 80 ppm, 15 ppm to 80 ppm, 16 ppm to 80 ppm, 17 ppm to 80 ppm, 18 ppm to 80 ppm, 19 ppm to 80 ppm, 20 ppm to 80 ppm, 21 ppm to 80 ppm, 22 ppm to 80 ppm, 23 ppm to 80 ppm, 24 ppm to 80 ppm, 25 ppm to 80 ppm, 26 ppm to 80 ppm, 27 ppm to 80 ppm, 28 ppm to 80 ppm, 29 ppm to 80 ppm, 30 ppm to 80 ppm, 31 ppm to 80 ppm, from 32 ppm to 80 ppm, from 33 ppm to 80 ppm, from 34 ppm to 80 ppm, from 35 ppm to 80 ppm, from 36 ppm to 80 ppm, from 37 ppm to 80 ppm, from 38 ppm to 80 ppm, from 39 ppm to 80 ppm, from 40 ppm to 80 ppm, from 41 ppm to 80 ppm, from 42 ppm to 80 ppm, from 43 ppm to 80 ppm, from 44 ppm to 80 ppm, from 45 ppm to 80 ppm, from 46 ppm to 80 ppm, from 47 ppm to 80 ppm, from 48 ppm to 80 ppm, from 49 ppm to 80 ppm, from 50 ppm to 80 ppm, from 51 ppm to 80 ppm, from 52 ppm to 80 ppm, from 53 ppm to 80 ppm, from 54 ppm to 80 ppm, from 55 ppm to 80 ppm, from 56 ppm to 80 ppm, from 57 ppm to 80 ppm, from 58 ppm to 80 ppm, from 59 ppm to 80 ppm, from 60 ppm to 80 ppm, from 61 ppm to 80 ppm, from 62 ppm to 80 ppm, from 63 ppm to 80 ppm, from 64 ppm to 80 ppm, from 65 ppm to 80 ppm, from 66 ppm to 80 ppm, from 67 ppm to 80 ppm, from 68 ppm to 80 ppm, from 69 ppm to 80 ppm, from 70 ppm to 80 ppm, from 71 ppm to 80 ppm, from 72 ppm to 80 ppm, from 73 ppm to 80 ppm, from 74 ppm to 80 ppm, or from 55 ppm to 60 ppm. In certain embodiments, solutions of the present disclosure containing free available chlorine are used at a FAC concentration that ranges from 10 ppm to 80 ppm. Preferably, solutions of the present disclosure containing free available chlorine are used at a FAC concentration that ranges from 30 ppm to 60 ppm.

In other embodiments, solutions of the present disclosure containing free available chlorine are used at a FAC concentration of approximately 10 ppm, approximately 11 ppm, approximately 12 ppm, approximately 13 ppm, approximately 14 ppm, approximately 15 ppm, approximately 16 ppm, approximately 17 ppm, approximately 18 ppm, approximately 19 ppm, approximately 20 ppm, approximately 21 ppm, approximately 22 ppm, approximately 23 ppm, approximately 24 ppm, approximately 25 ppm, approximately 26 ppm, approximately 27 ppm, approximately 28 ppm, approximately 29 ppm, approximately 30 ppm, approximately 31 ppm, approximately 32 ppm, approximately 33 ppm, approximately 34 ppm, approximately 35 ppm, approximately 36 ppm, approximately 37 ppm, approximately 38 ppm, approximately 39 ppm, approximately 40 ppm, approximately 41 ppm, approximately 42 ppm, approximately 43 ppm, approximately 44 ppm, approximately 45 ppm, approximately 46 ppm, approximately 47 ppm, approximately 48 ppm, approximately 49 ppm, approximately 50 ppm, approximately 51 ppm, approximately 52 ppm, approximately 53 ppm, approximately 54 ppm, approximately 55 ppm, approximately 56 ppm, approximately 57 ppm, approximately 58 ppm, approximately 59 ppm, approximately 60 ppm, approximately 61 ppm, approximately 62 ppm, approximately 63 ppm, approximately 64 ppm, approximately 65 ppm, approximately 66 ppm, approximately 67 ppm, approximately 68 ppm, approximately 69 ppm, approximately 70 ppm, approximately 71 ppm, approximately 72 ppm, approximately 73 ppm, approximately 74 ppm, approximately 75 ppm, approximately 76 ppm, approximately 77 ppm, approximately 78 ppm, approximately 79 ppm, or approximately 80 ppm. Preferably, solutions of the present disclosure containing free available chlorine are used at a FAC concentration of approximately 60 ppm.

Solutions of the present disclosure containing free available chlorine are also used at a pH that is suitable to sanitize produce treated with such solutions. For example, solutions of the present disclosure containing free available chlorine may be used at a pH that ranges from 5 to 7.5, from 5 to 7.4, from 5 to 7.3, from 5 to 7.2, from 5 to 7.1, from 5 to 7, from 5 to 6.8, from 5 to 6.6, from 5 to 6.5, from 5 to 6.4, from 5 to 6.2, from 5 to 6, from 5 to 5.8, from 5 to 5.6, from 5 to 5.5, or from 5 to 5.4. Alternatively, solutions of the present disclosure containing free available chlorine may be used at a pH that ranges from 5 to 7.5, from 5.2 to 7.5, from 5.4 to 7.5, from 5.5 to 7.5, from 5.6 to 7.5, from 5.8 to 7.5, from 6 to 7.5, from 6.2 to 7.5, from 6.4 to 7.5, from 6.5 to 7.5, from 6.6 to 7.5, from 6.8 to 7.5, from 7 to 7.5, or from 7.2 to 7.5.

In other embodiments, solutions of the present disclosure containing free available chlorine are used at a pH of approximately 5, approximately 5.2, approximately 5.4, approximately 5.5, approximately 5.6, approximately 5.8, approximately 6, approximately 6.2, approximately 6.4, approximately 6.5, approximately 6.6, approximately 6.8, approximately 7, approximately 7.1, approximately 7.2, approximately 7.3, approximately 7.4, or approximately 7.5. Preferably, solutions of the present disclosure containing free available chlorine are used at a pH of approximately 6.5.

Solutions of the present disclosure containing free available chlorine are further used at a temperature that is suitable to sanitize produce treated with such solutions. For example, solutions of the present disclosure containing free available chlorine may be used at a temperature that ranges from 32° F. to 150° F., from 32° F. to 145° F., from 32° F. to 140° F., from 32° F. to 135° F., from 32° F. to 130° F., from 32° F. to 125° F., from 32° F. to 120° F., from 32° F. to 115° F., from 32° F. to 110° F., from 32° F. to 105° F., from 32° F. to 100° F., from 32° F. to 95° F., from 32° F. to 90° F., from 32° F. to 85° F., from 32° F. to 80° F., from 32° F. to 75° F., from 32° F. to 70° F., from 32° F. to 69° F., from 32° F. to 68° F., from 32° F. to 67° F., from 32° F. to 66° F., from 32° F. to 65° F., from 32° F. to 60° F., from 32° F. to 55° F., from 32° F. to 50° F., from 32° F. to 45° F., from 32° F. to 40° F., from 32° F. to 39° F., from 32° F. to 38° F., from 32° F. to 37° F., from 32° F. to 36° F., from 32° F. to 35° F., from 32° F. to 34° F., or from 32° F. to 33° F. Alternatively, solutions of the present disclosure containing free available chlorine may be used at a temperature that ranges from 32° F. to 150° F., from 33° F. to 150° F., from 34° F. to 150° F., from 35° F. to 150° F., from 36° F. to 150° F., from 37° F. to 150° F., from 38° F. to 150° F., from 39° F. to 150° F., from 40° F. to 150° F., from 45° F. to 150° F., from 50° F. to 150° F., from 55° F. to 150° F., from 60° F. to 150° F., from 65° F. to 150° F., from 70° F. to 150° F., from 75° F. to 150° F., from 80° F. to 150° F., from 85° F. to 150° F., from 90° F. to 150° F., from 95° F. to 150° F., from 100° F. to 150° F., from 105° F. to 150° F., from 110° F. to 150° F., from 115° F. to 150° F., from 120° F. to 150° F., from 125° F. to 150° F., from 130° F. to 150° F., from 135° F. to 150° F., from 140° F. to 150° F., or from 145° F. to 150° F.

In other embodiments, solutions of the present disclosure containing free available chlorine are used at a temperature of approximately 32° F., approximately 33° F., approximately 34° F., approximately 35° F., approximately 36° F., approximately 37° F., approximately 38° F., approximately 39° F., approximately 40° F., approximately 41° F., approximately 42° F., approximately 43° F., approximately 44° F., approximately 45° F., approximately 46° F., approximately 47° F., approximately 48° F., approximately 49° F., approximately 50° F., approximately 51° F., approximately 52° F., approximately 53° F., approximately 54° F., approximately 55° F., approximately 56° F., approximately 57° F., approximately 58° F., approximately 59° F., approximately 60° F., approximately 61° F., approximately 62° F., approximately 63° F., approximately 64° F., approximately 65° F., approximately 66° F., approximately 67° F., approximately 68° F., approximately 69° F., approximately 70° F., approximately 75° F., approximately 80° F., approximately 85° F., approximately 90° F., approximately 95° F., approximately 100° F., approximately 105° F., approximately 110° F., approximately 115° F., approximately 120° F., approximately 125° F., approximately 130° F., approximately 135° F., approximately 140° F., approximately 145° F., or approximately 150° F.

Moreover, produce is treated with a solution of the present disclosure containing free available chlorine for a period of time that is sufficient to sanitize the produce. For example, produce may be treated with a solution of the present disclosure containing free available chlorine for a period of time that ranges from 10 seconds to 180 seconds, from 15 seconds to 180 seconds, from 20 seconds to 180 seconds, from 25 seconds to 180 seconds, from 30 seconds to 180 seconds, from 35 seconds to 180 seconds, from 40 seconds to 180 seconds, from 45 seconds to 180 seconds, from 50 seconds to 180 seconds, from 55 seconds to 180 seconds, from 60 seconds to 180 seconds, from 65 seconds to 180 seconds, from 70 seconds to 180 seconds, from 75 seconds to 180 seconds, from 80 seconds to 180 seconds, from 81 seconds to 180 seconds, from 82 seconds to 180 seconds, from 83 seconds to 180 seconds, from 84 seconds to 180 seconds, from 85 seconds to 180 seconds, from 86 seconds to 180 seconds, from 87 seconds to 180 seconds, from 88 seconds to 180 seconds, from 89 seconds to 180 seconds, from 90 seconds to 180 seconds, from 91 seconds to 180 seconds, from 92 seconds to 180 seconds, from 93 seconds to 180 seconds, from 94 seconds to 180 seconds, from 95 seconds to 180 seconds, from 96 seconds to 180 seconds, from 97 seconds to 180 seconds, from 98 seconds to 180 seconds, from 99 seconds to 180 seconds, from 100 seconds to 180 seconds, from 105 seconds to 180 seconds, from 110 seconds to 180 seconds, from 115 seconds to 180 seconds, from 120 seconds to 180 seconds, from 130 seconds to 180 seconds, from 140 seconds to 180 seconds, from 150 seconds to 180 seconds, from 160 seconds to 180 seconds, or from 170 seconds to 180 seconds. Alternatively, produce may be treated with a solution of the present disclosure containing free available chlorine for a period of time that ranges from 10 seconds to 180 seconds, from 10 seconds to 170 seconds, from 10 seconds to 160 seconds, from 10 seconds to 150 seconds, from 10 seconds to 140 seconds, from 10 seconds to 130 seconds, from 10 seconds to 120 seconds, from 10 seconds to 115 seconds, from 10 seconds to 110 seconds, from 10 seconds to 105 seconds, from 10 seconds to 100 seconds, from 10 seconds to 99 seconds, from 10 seconds to 98 seconds, from 10 seconds to 97 seconds, from 10 seconds to 96 seconds, from 10 seconds to 95 seconds, from 10 seconds to 94 seconds, from 10 seconds to 93 seconds, from 10 seconds to 92 seconds, from 10 seconds to 91 seconds, from 10 seconds to 90 seconds, from 10 seconds to 89 seconds, from 10 seconds to 88 seconds, from 10 seconds to 87 seconds, from 10 seconds to 86 seconds, from 10 seconds to 85 seconds, from 10 seconds to 84 seconds, from 10 seconds to 83 seconds, from 10 seconds to 82 seconds, from 10 seconds to 81 seconds, from 10 seconds to 80 seconds, from 10 seconds to 75 seconds, from 10 seconds to 70 seconds, from 10 seconds to 65 seconds, from 10 seconds to 60 seconds, from 10 seconds to 55 seconds, from 10 seconds to 50 seconds, from 10 seconds to 45 seconds, from 10 seconds to 40 seconds, from 10 seconds to 35 seconds, from 10 seconds to 30 seconds, from 10 seconds to 25 seconds from 10 seconds to 20 seconds, or from 10 seconds to 15 seconds.

In other embodiments, produce may be treated with a solution of the present disclosure containing free available chlorine for approximately 10 seconds, approximately 15 seconds, approximately 20 seconds, approximately 25 seconds, approximately 30 seconds, approximately 35 seconds, approximately 40 seconds, approximately 45 seconds, approximately 50 seconds, approximately 55 seconds, approximately 60 seconds, approximately 62 seconds, approximately 64 seconds, approximately 65 seconds, approximately 66 seconds, approximately 68 seconds, approximately 70 seconds, approximately 72 seconds, approximately 74 seconds, approximately 75 seconds, approximately 76 seconds, approximately 78 seconds, approximately 80 seconds, approximately 81 seconds, approximately 82 seconds, approximately 83 seconds, approximately 84 seconds, approximately 85 seconds, approximately 86 seconds, approximately 87 seconds, approximately 88 seconds, approximately 89 seconds, approximately 90 seconds, approximately 91 seconds, approximately 92 seconds, approximately 93 seconds, approximately 94 seconds, approximately 95 seconds, approximately 96 seconds, approximately 97 seconds, approximately 98 seconds, approximately 99 seconds, approximately 100 seconds, approximately 112 seconds, approximately 114 seconds, approximately 115 seconds, approximately 116 seconds, approximately 118 seconds, approximately 120 seconds, approximately 130 seconds, approximately 140 seconds, approximately 150 seconds, approximately 160 seconds, approximately 170 seconds, or approximately 180 seconds. Preferably the methods disclosed herein are adapted to current processing plants that use piping with open and closed loop flumes that expose produce to solutions for approximately 90 seconds. Thus, in a preferred embodiment, produce is treated with a solution of the present disclosure containing free available chlorine for approximately 90 seconds.

In other embodiments, solutions of the present disclosure containing free available chlorine are dosed into a wash tank, or "flume," that may be used for treating the produce. Alternatively, solutions of the present disclosure containing free available chlorine may be stored in a spraying container. Thus, in certain embodiments, treating produce with a solution of the present disclosure containing free available chlorine includes immersing the produce in a wash tank containing the solution containing chlorine. The methods disclosed herein may further include spraying the produce with the solution containing chlorine.

Anolyte Solutions

In certain embodiments, a solution of the present disclosure containing free available chlorine (FAC) is an anolyte solution. As disclosed herein, it has surprisingly been discovered that treatment with a catholyte solution, a solution containing FAC, such as an anolyte solution, and a second solution containing FAC, such as a second anolyte solution, results in effective sanitization of produce.

Preferably an anolyte solution of the present disclosure is generated in its own wash tank that may be used for treating the produce. Alternatively the anolyte solution may be stored in a spraying container. In certain embodiments, treating the produce with the anolyte solution comprises immersing the produce in a wash tank containing the anolyte solution or spraying the produce with the anolyte solution.

The anolyte solution used in certain embodiments of the disclosed methods can contain a high level of free available chlorine (FAC), mostly existing as hypochlorous acid. As used herein, the concentration of anolyte solutions of the present disclosure is given as parts-per-million (ppm) FAC. Accordingly, in certain embodiments, anolyte solutions of the present disclosure are used at a concentration that ranges from 10 ppm to 80 ppm, from 10 ppm to 75 ppm, from 10 ppm to 70 ppm, from 10 ppm to 65 ppm, from 10 ppm to 60 ppm, from 10 ppm to 55 ppm, from 10 ppm to 50 ppm, from 10 ppm to 49 ppm, from 10 ppm to 48 ppm, from 10 ppm to 47 ppm, from 10 ppm to 46 ppm, from 10 ppm to 45 ppm, from 10 ppm to 44 ppm, from 10 ppm to 43 ppm, from 10 ppm to 42 ppm, from 10 ppm to 41 ppm, from 10 ppm to 40 ppm, from 10 ppm to 39 ppm, from 10 ppm to 38 ppm, from 10 ppm to 37 ppm, from 10 ppm to 36 ppm, from 10 ppm to 35 ppm, from 10 ppm to 34 ppm, from 10 ppm to 33 ppm, from 10 ppm to 32 ppm, from 10 ppm to 31 ppm, from 10 ppm to 30 ppm, from 10 ppm to 29 ppm, from 10 ppm to 28 ppm, from 10 ppm to 27 ppm, from 10 ppm to 26 ppm, from 10 ppm to 25 ppm, from 10 ppm to 24 ppm, from 10 ppm to 23 ppm, from 10 ppm to 22 ppm, from 10 ppm to 21 ppm, from 10 ppm to 20 ppm, from 10 ppm to 19 ppm, from 10 ppm to 18 ppm, from 10 ppm to 17 ppm, from 10 ppm to 16 ppm, or from 10 ppm to 15 ppm FAC. Alternatively, anolyte solutions of the present disclosure are used at a concentration that a concentration that ranges from 10 ppm to 80 ppm, 11 ppm to 80 ppm, 12 ppm to 80 ppm, 13 ppm to 80 ppm, 14 ppm to 80 ppm, 15 ppm to 80 ppm, 16 ppm to 80 ppm, 17 ppm to 80 ppm, 18 ppm to 80 ppm, 19 ppm to 80 ppm, 20 ppm to 80 ppm, 21 ppm to 80 ppm, 22 ppm to 80 ppm, 23 ppm to 80 ppm, 24 ppm to 80 ppm, 25 ppm to 80 ppm, 26 ppm to 80 ppm, 27 ppm to 80 ppm, 28 ppm to 80 ppm, 29 ppm to 80 ppm, 30 ppm to 80 ppm, from 31 ppm to 80 ppm, from 32 ppm to 80 ppm, from 33 ppm to 80 ppm, from 34 ppm to 80 ppm, from 35 ppm to 80 ppm, from 36 ppm to 80 ppm, from 37 ppm to 80 ppm, from 38 ppm to 80 ppm, from 39 ppm to 80 ppm, from 40 ppm to 80 ppm, from 41 ppm to 80 ppm, from 42 ppm to 80 ppm, from 43 ppm to 80 ppm, from 44 ppm to 80 ppm, from 45 ppm to 80 ppm, from 46 ppm to 80 ppm, from 47 ppm to 80 ppm, from 48 ppm to 80 ppm, from 49 ppm to 80 ppm, from 50 ppm to 80 ppm, from 51 ppm to 80 ppm, from 52 ppm to 80 ppm, from 53 ppm to 80 ppm, from 54 ppm to 80 ppm, from 55 ppm to 80 ppm, from 56 ppm to 80 ppm, from 57 ppm to 80 ppm, from 58 ppm to 80 ppm, from 59 ppm to 80 ppm, from 60 ppm to 80 ppm, from 61 ppm to 80 ppm, from 62 ppm to 80 ppm, from 63 ppm to 80 ppm, from 64 ppm to 80 ppm, from 65 ppm to 80 ppm, from 66 ppm to 80 ppm, from 67 ppm to 80 ppm, from 68 ppm to 80 ppm, from 69 ppm to 80 ppm, from 70 ppm to 80 ppm, from 71 ppm to 80 ppm, from 72 ppm to 80 ppm, from 73 ppm to 80 ppm, from 74 ppm to 80 ppm, or from 55 ppm to 60 ppm. In certain embodiments, anolyte solutions of the present disclosure are used at a concentration that ranges from 10 ppm to 80 ppm FAC. Preferably, anolyte solutions of the present disclosure are used at a concentration that ranges from 30 ppm to 60 ppm FAC.

In other embodiments, anolyte solutions of the present disclosure are used at a concentration of approximately 10 ppm, approximately 11 ppm, approximately 12 ppm, approximately 13 ppm, approximately 14 ppm, approximately 15 ppm, approximately 16 ppm, approximately 17 ppm, approximately 18 ppm, approximately 19 ppm, approximately 20 ppm, approximately 21 ppm, approximately 22 ppm, approximately 23 ppm, approximately 24 ppm, approximately 25 ppm, approximately 26 ppm, approximately 27 ppm, approximately 28 ppm, approximately 29 ppm, approximately 30 ppm, approximately 31 ppm, approximately 32 ppm, approximately 33 ppm, approximately 34 ppm, approximately 35 ppm, approximately 36 ppm, approximately 37 ppm, approximately 38 ppm, approximately 39 ppm, approximately 40 ppm, approximately 41 ppm, approximately 42 ppm, approximately 43 ppm, approximately 44 ppm, approximately 45 ppm, approximately 46 ppm, approximately 47 ppm, approximately 48 ppm, approximately 49 ppm, approximately 50 ppm, approximately 51 ppm, approximately 52 ppm, approximately 53 ppm, approximately 54 ppm, approximately 55 ppm, approximately 56 ppm, approximately 57 ppm, approximately 58 ppm, approximately 59 ppm, approximately 60 ppm, approximately 61 ppm, approximately 62 ppm, approximately 63 ppm, approximately 64 ppm, approximately 65 ppm, approximately 66 ppm, approximately 67 ppm, approximately 68 ppm, approximately 69 ppm, approximately 70 ppm, approximately 71 ppm, approximately 72 ppm, approximately 73 ppm, approximately 74 ppm, approximately 75 ppm, approximately 76 ppm, approximately 77 ppm, approximately 78 ppm, approximately 79 ppm, or approximately 80 ppm FAC. Preferably, anolyte solutions of the present disclosure are used at a concentration of approximately 60 ppm FAC.

Anolyte solutions of the present disclosure are also used at a pH that is suitable to sanitize produce treated with such solutions. For example, anolyte solutions of the present disclosure may be used at a pH that ranges from 5 to 7.5, from 5 to 7.4, from 5 to 7.3, from 5 to 7.2, from 5 to 7.1, from 5 to 7, from 5 to 6.8, from 5 to 6.6, from 5 to 6.5, from 5 to 6.4, from 5 to 6.2, from 5 to 6, from 5 to 5.8, from 5 to 5.6, from 5 to 5.5, or from 5 to 5.4. Alternatively, anolyte solutions of the present disclosure may be used at a pH that ranges from 5 to 7.5, from 5.2 to 7.5, from 5.4 to 7.5, from 5.5 to 7.5, from 5.6 to 7.5, from 5.8 to 7.5, from 6 to 7.5, from 6.2 to 7.5, from 6.4 to 7.5, from 6.5 to 7.5, from 6.6 to 7.5, from 6.8 to 7.5, from 7 to 7.5, or from 7.2 to 7.5.

In other embodiments, anolyte solutions of the present disclosure are used at a pH of approximately 5, approximately 5.2, approximately 5.4, approximately 5.5, approximately 5.6, approximately 5.8, approximately 6, approximately 6.2, approximately 6.4, approximately 6.5, approximately 6.6, approximately 6.8, approximately 7, approximately 7.1, approximately 7.2, approximately 7.3, approximately 7.4, or approximately 7.5. Preferably, anolyte solutions of the present disclosure are used at a pH of approximately 7.

Treating with anolyte solutions disinfects the produce. Preferably the produce is treated with an anolyte solution for a time sufficient to disinfect the produce without damaging the quality of the produce. Accordingly, in certain embodiments treating produce with an anolyte solution of the present disclosure occurs for a period of time that ranges from 10 seconds to 180 seconds, from 15 seconds to 180 seconds, from 20 seconds to 180 seconds, from 25 seconds to 180 seconds, from 30 seconds to 180 seconds, from 35 seconds to 180 seconds, from 40 seconds to 180 seconds, from 45 seconds to 180 seconds, from 50 seconds to 180 seconds, from 55 seconds to 180 seconds, from 60 seconds to 180 seconds, from 65 seconds to 180 seconds, from 70 seconds to 180 seconds, from 75 seconds to 180 seconds, from 80 seconds to 180 seconds, from 81 seconds to 180 seconds, from 82 seconds to 180 seconds, from 83 seconds to 180 seconds, from 84 seconds to 180 seconds, from 85 seconds to 180 seconds, from 86 seconds to 180 seconds, from 87 seconds to 180 seconds, from 88 seconds to 180 seconds, from 89 seconds to 180 seconds, from 90 seconds to 180 seconds, from 91 seconds to 180 seconds, from 92 seconds to 180 seconds, from 93 seconds to 180 seconds, from 94 seconds to 180 seconds, from 95 seconds to 180 seconds, from 96 seconds to 180 seconds, from 97 seconds to 180 seconds, from 98 seconds to 180 seconds, from 99 seconds to 180 seconds, from 100 seconds to 180 seconds, from 105 seconds to 180 seconds, from 110 seconds to 180 seconds, from 115 seconds to 180 seconds, from 120 seconds to 180 seconds, from 130 seconds to 180 seconds, from 140 seconds to 180 seconds, from 150 seconds to 180 seconds, from 160 seconds to 180 seconds, or from 170 seconds to 180 seconds. Alternatively, treating produce with an anolyte solution of the present disclosure occurs for a period of time that ranges from 10 seconds to 180 seconds, from 10 seconds to 170 seconds, from 10 seconds to 160 seconds, from 10 seconds to 150 seconds, from 10 seconds to 140 seconds, from 10 seconds to 130 seconds, from 10 seconds to 120 seconds, from 10 seconds to 115 seconds, from 10 seconds to 110 seconds, from 10 seconds to 105 seconds, from 10 seconds to 100 seconds, from 10 seconds to 99 seconds, from 10 seconds to 98 seconds, from 10 seconds to 97 seconds, from 10 seconds to 96 seconds, from 10 seconds to 95 seconds, from 10 seconds to 94 seconds, from 10 seconds to 93 seconds, from 10 seconds to 92 seconds, from 10 seconds to 91 seconds, from 10 seconds to 90 seconds, from 10 seconds to 89 seconds, from 10 seconds to 88 seconds, from 10 seconds to 87 seconds, from 10 seconds to 86 seconds, from 10 seconds to 85 seconds, from 10 seconds to 84 seconds, from 10 seconds to 83 seconds, from 10 seconds to 82 seconds, from 10 seconds to 81 seconds, from 10 seconds to 80 seconds, from 10 seconds to 75 seconds, from 10 seconds to 70 seconds, from 10 seconds to 65 seconds, from 10 seconds to 60 seconds, from 10 seconds to 55 seconds, from 10 seconds to 50 seconds, from 10 seconds to 45 seconds, from 10 seconds to 40 seconds, from 10 seconds to 35 seconds, from 10 seconds to 30 seconds, from 10 seconds to 25 seconds from 10 seconds to 20 seconds, or from 10 seconds to 15 seconds.

In other embodiments, produce may be treated with an anolyte solution of the present disclosure for approximately 10 seconds, approximately 15 seconds, approximately 20 seconds, approximately 25 seconds, approximately 30 seconds, approximately 35 seconds, approximately 40 seconds, approximately 45 seconds, approximately 50 seconds, approximately 55 seconds, approximately 60 seconds, approximately 62 seconds, approximately 64 seconds, approximately 65 seconds, approximately 66 seconds, approximately 68 seconds, approximately 70 seconds, approximately 72 seconds, approximately 74 seconds, approximately 75 seconds, approximately 76 seconds, approximately 78 seconds, approximately 80 seconds, approximately 81 seconds, approximately 82 seconds, approximately 83 seconds, approximately 84 seconds, approximately 85 seconds, approximately 86 seconds, approximately 87 seconds, approximately 88 seconds, approximately 89 seconds, approximately 90 seconds, approximately 91 seconds, approximately 92 seconds, approximately 93 seconds, approximately 94 seconds, approximately 95 seconds, approximately 96 seconds, approximately 97 seconds, approximately 98 seconds, approximately 99 seconds, approximately 100 seconds, approximately 112 seconds, approximately 114 seconds, approximately 115 seconds, approximately 116 seconds, approximately 118 seconds, approximately 120 seconds, approximately 130 seconds, approximately 140 seconds, approximately 150 seconds, approximately 160 seconds, approximately 170 seconds, or approximately 180 seconds. Preferably the methods disclosed herein are adapted to current processing plants that use piping with open and closed loop flumes that expose produce to solutions for approximately 90 seconds. Thus, in a preferred embodiment, produce is treated with an anolyte solution of the present disclosure for approximately 90 seconds.

Solutions Containing Peroxyacetic Acid

Other aspects of the present disclosure relate to treating produce with a solution containing peroxyacetic acid (PAA). As used herein, "peroxyacetic acid," "PAA," and "peracetic acid" are used interchangeably and refer to an organic peroxide having the formula: $CH_3CO_3H$. Peroxyacetic acid is generally formed by reacting acetic acid with hydrogen peroxide.

Peroxyacetic acid is a sanitizer that is known to be effective in reducing microbial counts in produce wash water and on fruit surfaces. Moreover, peroxyacetic acid can significantly reduce *Salmonella* and *E. coli* O157:H7 populations on fresh fruit (e.g., Park and Beuchat, 1999. *Dairy Food Environ sanit* 19:842). Advantageously, is a safe and non-toxic sanitizer that breaks-down to oxygen and acetic acid after use. Accordingly, peroxyacetic acid is approved in the U.S. for use either in wash water or for direct application to whole or cut fruits and vegetables.

Solutions containing peroxyacetic may be produced by any suitable method known in the art. For example, peroxyacetic acid may be produce by autoxidizing acetaldehyde, by reacting acetic acid with hydrogen peroxide, or by reacting acetyl chloride and acetic anhydride.

Moreover, peroxyacetic acid may be obtained from any commercial source known in the art, including without limitation, packets of SaniDate® 5.0, SaniDate® 5.0 liquid concentrate, Tsunami® 100, and PERACLEAN® formulations. It will be understood that solutions containing peroxyacetic acid may include additional compounds. For example, commercial solutions containing peroxyacetic acid may contain approximately 5.25% of peroxyacetic acid by volume, 14% of acetic acid by volume, and 23% of hydrogen peroxide by volume. Moreover, it will be understood that commercial solutions containing peroxyacetic acid typically contain approximately 5% to 15% of peroxyacetic acid with varying amounts of hydrogen peroxide.

Solutions of the present disclosure containing peroxyacetic acid are used at a peroxyacetic acid concentration that is suitable to sanitize produce treated with such solutions. For example, solutions of the present disclosure containing peroxyacetic acid may be used at a peroxyacetic acid concentration that ranges from 40 ppm to 100 ppm, from 40 ppm to 95 ppm, from 40 ppm to 90 ppm, from 40 ppm to 89 ppm, from 40 ppm to 88 ppm, from 40 ppm to 87 ppm, from 40 ppm to 86 ppm, from 40 ppm to 85 ppm, from 40 ppm to 84 ppm, from 40 ppm to 83 ppm, from 40 ppm to 82 ppm, from 40 ppm to 81 ppm, from 40 ppm to 80 ppm, from 40 ppm to 79 ppm, from 40 ppm to 78 ppm, from 40 ppm to 77 ppm, from 40 ppm to 76 ppm, from 40 ppm to 75 ppm, from 40 ppm to 74 ppm, from 40 ppm to 73 ppm, from 40 ppm to 72 ppm, from 40 ppm to 71 ppm, from 40 ppm to 70 ppm, from 40 ppm to 69 ppm, from 40 ppm to 68 ppm, from 40 ppm to 67 ppm, from 40 ppm to 66 ppm, from 40 ppm to 65 ppm, from 40 ppm to 64 ppm, from 40 ppm to 63 ppm, from 40 ppm to 62 ppm, from 40 ppm to 61 ppm, from 40 ppm to 60 ppm, from 40 ppm to 59 ppm, from 40 ppm to 58 ppm, from 40 ppm to 57 ppm, from 40 ppm to 56 ppm, from 40 ppm to 55 ppm, from 40 ppm to 54 ppm, from 40 ppm to 53 ppm, from 40 ppm to 52 ppm, from 40 ppm to 51 ppm, from 40 ppm to 50 ppm, from 40 ppm to 49 ppm, from 40 ppm to 48 ppm, from 40 ppm to 47 ppm, from 40 ppm to 46 ppm, or from 40 ppm to 45 ppm. Alternatively, solutions of the present disclosure containing peroxyacetic acid may be used at a peroxyacetic acid concentration that ranges from 40 ppm to 100 ppm, from 45 ppm to 100 ppm, from 50 ppm to 100 ppm, from 51 ppm to 100 ppm, from 52 ppm to 100 ppm, from 53 ppm to 100 ppm, from 54 ppm to 100 ppm, from 55 ppm to 100 ppm, from 56 ppm to 100 ppm, from 57 ppm to 100 ppm, from 58 ppm to 100 ppm, from 59 ppm to 100 ppm, from 60 ppm to 100 ppm, from 65 ppm to 100 ppm, from 70 ppm to 100 ppm, from 71 ppm to 60 ppm, from 72 ppm to 100 ppm, from 73 ppm to 100 ppm, from 74 ppm to 100 ppm, from 75 ppm to 100 ppm, from 76 ppm to 100 ppm, from 77 ppm to 100 ppm, from 78 ppm to 100 ppm, from 79 ppm to 100 ppm, from 80 ppm to 100 ppm, from 81 ppm to 100 ppm, from 82 ppm to 100 ppm, from 83 ppm to 100 ppm, from 84 ppm to 100 ppm, from 85 ppm to 100 ppm, from 86 ppm to 100 ppm, from 87 ppm to 100 ppm, from 88 ppm to 100 ppm, from 89 ppm to 100 ppm, from 90 ppm to 100 ppm, or from 95 ppm to 100 ppm. In certain embodiments, solutions of the present disclosure containing peroxyacetic acid are used at a peroxyacetic acid concentration that ranges from 40 ppm to 100 ppm. Preferably, solutions of the present disclosure containing peroxyacetic acid are used at a peroxyacetic acid concentration that ranges from 75 ppm to 90 ppm.

In other embodiments, solutions of the present disclosure containing peroxyacetic acid are used at a peroxyacetic acid concentration of approximately 40 ppm, approximately 41 ppm, approximately 42 ppm, approximately 43 ppm, approximately 44 ppm, approximately 45 ppm, approximately 46 ppm, approximately 47 ppm, approximately 48 ppm, approximately 49 ppm, approximately 50 ppm, approximately 51 ppm, approximately 52 ppm, approximately 53 ppm, approximately 54 ppm, approximately 55 ppm, approximately 56 ppm, approximately 57 ppm, approximately 58 ppm, approximately 59 ppm, approximately 60 ppm, approximately 61 ppm, approximately 62 ppm, approximately 63 ppm, approximately 64 ppm, approximately 65 ppm, approximately 66 ppm, approximately 67 ppm, approximately 68 ppm, approximately 69 ppm, approximately 70 ppm, approximately 71 ppm, approximately 72 ppm, approximately 73 ppm, approximately 74 ppm, approximately 75 ppm, approximately 76 ppm, approximately 77 ppm, approximately 78 ppm, approximately 79 ppm, approximately 80 ppm, approximately 81 ppm, approximately 82 ppm, approximately 83 ppm, approximately 84 ppm, approximately 85 ppm, approximately 86 ppm, approximately 87 ppm, approximately 88 ppm, approximately 89 ppm, approximately 90 ppm, approximately 91 ppm, approximately 92 ppm, approximately 93 ppm, approximately 94 ppm, approximately 95 ppm, approximately 96 ppm, approximately 97 ppm, approximately 98 ppm, approximately 99 ppm, or approximately 100 ppm. Preferably, solutions of the present disclosure containing peroxyacetic acid are used at a peroxyacetic acid concentration of approximately 80 ppm.

Solutions of the present disclosure containing peroxyacetic acid are also used at a pH that is suitable to sanitize produce treated with such solutions. For example, solutions of the present disclosure containing peroxyacetic acid may be used at a pH that ranges from 2.5 to 7, from 2.5 to 6.5, from 2.5 to 6, from 2.5 to 5.5, from 2.5 to 5.5, from 2.5 to 5, from 2.5 to 4.5, from 2.5 to 4, from 2.5 to 3.5, and from 2.5 to 3. Alternatively, solutions of the present disclosure containing peroxyacetic acid may be used at a pH that ranges from 2.5 to 7, from 3 to 7, from 3.5 to 7, from 4 to 7, from 4.5 to 7, from 5 to 7, from 5.5 to 7, from 6 to 7, and from 6.5 to 7. In some embodiments, solutions of the present disclosure containing peroxyacetic acid may be used at a pH that ranges from 2.5 to 4.5, from 2.5 to 4.3, from 2.5 to 4.3, from 2.5 to 4.1, from 2.5 to 3, from 2.5 to 2.9, or from 2.5 to 2.7. In other embodiments, solutions of the present disclosure containing peroxyacetic acid may be used at a pH that ranges from 2.5 to 4.5, from 2.7 to 4.5, from 2.9 to 4.5, from 3 to 4.5, from 3.3 to 4.5, from 3.5 to 4.5, from 3.7 to 4.5, from 3.9 to 4.5, from 4 to 4.5, from 4.1 to 4.5, or from 4.3 to 4.5. In further embodiments, solutions of the present disclosure containing peroxyacetic acid may be used at a pH that ranges from 5 to 7, from 5 to 6.8, from 5 to 6.6, from 5 to 6.5, from 5 to 6.4, from 5 to 6.2, from 5 to 6, from 5 to 5.8, from 5 to 5.6, from 5 to 5.5, or from 5 to 5.4. In other embodiments, solutions of the present disclosure containing free available chlorine may be used at a pH that ranges from 5 to 7, from 5.2 to 7, from 5.4 to 7, from 5.5 to 7, from 5.6 to 7, from 5.8 to 7, from 6 to 7, from 6.2 to 7, from 6.4 to 7, from 6.5 to 7, or from 6.6 to 7.

In other embodiments, solutions of the present disclosure containing peroxyacetic acid are used at a pH of approximately 2.5, approximately 2.6, approximately 2.7, approximately 2.8, approximately 2.9, approximately 3, approximately 3.1, approximately 3.2, approximately 3.3, approximately 3.4, approximately 3.5, approximately 3.6, approximately 3.7, approximately 3.8, approximately 3.9, approximately 4, approximately 4.1, approximately 4.2, approximately 4.3, approximately 4.4, approximately 4.5, approximately 4.6, approximately 4.7, approximately 4.8, approximately 4.9, approximately 5, approximately 5.2, approximately 5.4, approximately 5.5, approximately 5.6, approximately 5.8, approximately 6, approximately 6.2, approximately 6.4, approximately 6.5, approximately 6.6, approximately 6.8, or approximately 7.

Solutions of the present disclosure containing peroxyacetic acid are further used at a temperature that is suitable to sanitize produce treated with such solutions. For example, solutions of the present disclosure containing peroxyacetic acid may be used at a temperature that ranges from 32° F. to 150° F., from 32° F. to 145° F., from 32° F. to 140° F., from 32° F. to 135° F., from 32° F. to 130° F., from 32° F. to 125° F., from 32° F. to 120° F., from 32° F. to 115° F., from 32° F. to 110° F., from 32° F. to 105° F., from 32° F. to 100° F., from 32° F. to 95° F., from 32° F. to 90° F., from 32° F. to 85° F., from 32° F. to 80° F., from 32° F. to 75° F., from 32° F. to 70° F., from 32° F. to 69° F., from 32° F. to 68° F., from 32° F. to 67° F., from 32° F. to 66° F., from 32° F. to 65° F., from 32° F. to 60° F., from 32° F. to 55° F., from 32° F. to 50° F., from 32° F. to 45° F., from 32° F. to 40° F., from 32° F. to 39° F., from 32° F. to 38° F., from 32° F. to 37° F., from 32° F. to 36° F., from 32° F. to 35° F., from 32° F. to 34° F., or from 32° F. to 33° F. Alternatively, solutions of the present disclosure containing peroxyacetic acid may be used at a temperature that ranges from 32° F. to 150° F., from 33° F. to 150° F., from 34° F. to 150° F., from 35° F. to 150° F., from 36° F. to 150° F., from 37° F. to 150° F., from 38° F. to 150° F., from 39° F. to 150° F., from 40° F. to 150° F., from 45° F. to 150° F., from 50° F. to 150° F., from 55° F. to 150° F., from 60° F. to 150° F., from 65° F. to 150° F., from 70° F. to 150° F., from 75° F. to 150° F., from 80° F. to 150° F., from 85° F. to 150° F., from 90° F. to 150° F., from 95° F. to 150° F., from 100° F. to 150° F., from 105° F. to 150° F., from 110° F. to 150° F., from 115° F. to 150° F., from 120° F. to 150° F., from 125° F. to 150° F., from 130° F. to 150° F., from 135° F. to 150° F., from 140° F. to 150° F., or from 145° F. to 150° F.

In other embodiments, solutions of the present disclosure containing peroxyacetic acid are used at a temperature of approximately 32° F., approximately 33° F., approximately 34° F., approximately 35° F., approximately 36° F., approximately 37° F., approximately 38° F., approximately 39° F., approximately 40° F., approximately 41° F., approximately 42° F., approximately 43° F., approximately 44° F., approximately 45° F., approximately 46° F., approximately 47° F., approximately 48° F., approximately 49° F., approximately 50° F., approximately 51° F., approximately 52° F., approximately 53° F., approximately 54° F., approximately 55° F., approximately 56° F., approximately 57° F., approximately 58° F., approximately 59° F., approximately 60° F., approximately 61° F., approximately 62° F., approximately 63° F., approximately 64° F., approximately 65° F., approximately 66° F., approximately 67° F., approximately 68° F., approximately 69° F., approximately 70° F., approximately 75° F., approximately 80° F., approximately 85° F., approximately 90° F., approximately 95° F., approximately 100° F., approximately 105° F., approximately 110° F., approximately 115° F., approximately 120° F., approximately 125° F., approximately 130° F., approximately 135° F., approximately 140° F., approximately 145° F., or approximately 150° F.

Moreover, produce is treated with a solution of the present disclosure containing peroxyacetic acid for a period of time that is sufficient to sanitize the produce. For example, produce may be treated with a solution of the present disclosure containing peroxyacetic acid for a period of time that ranges from 20 seconds to 180 seconds, from 21 seconds to 180 seconds, from 22 seconds to 180 seconds, from 23 seconds to 180 seconds, from 24 seconds to 180 seconds, from 25 seconds to 180 seconds, from 26 seconds to 180 seconds, from 27 seconds to 180 seconds, from 28 seconds to 180 seconds, from 29 seconds to 180 seconds, from 30 seconds to 180 seconds, from 31 seconds to 180 seconds, from 32 seconds to 180 seconds, from 33 seconds to 180 seconds, from 34 seconds to 180 seconds, from 35 seconds to 180 seconds, from 36 seconds to 180 seconds, from 37 seconds to 180 seconds, from 38 seconds to 180 seconds, from 39 seconds to 180 seconds, from 40 seconds to 180 seconds, from 41 seconds to 180 seconds, from 42 seconds to 180 seconds, from 43 seconds to 180 seconds, from 44 seconds to 180 seconds, from 45 seconds to 180 seconds, from 46 seconds to 180 seconds, from 47 seconds to 180 seconds, from 48 seconds to 180 seconds, from 49 seconds to 180 seconds, from 50 seconds to 180 seconds, from 55 seconds to 180 seconds, from 60 seconds to 180 seconds, from 70 seconds to 180 seconds, from 80 seconds to 180 seconds, from 90 seconds to 180 seconds, from 100 seconds to 180 seconds, from 110 seconds to 180 seconds, from 120 seconds to 180 seconds, from 130 seconds to 180 seconds, from 140 seconds to 180 seconds, from 150 seconds to 180 seconds, from 160 seconds to 180 seconds, or from 170 seconds to 180 seconds. Alternatively, produce may be treated with a solution of the present disclosure containing peroxyacetic acid for a period of time that ranges from 20 seconds to 180 seconds, from 20 seconds to 170 seconds, from 20 seconds to 160 seconds, from 20 seconds to 150 seconds, from 20 seconds to 140 seconds, from 20 seconds to 130 seconds, from 20 seconds to 120 seconds, from 20 seconds to 110 seconds, from 20 seconds to 100 seconds, from 20 seconds to 90 seconds, from 20 seconds to 80 seconds, from 20 seconds to 70 seconds, from 20 seconds to 60 seconds, from 20 seconds to 55 seconds, from 20 seconds to 50 seconds, from 20 seconds to 45 seconds, from 20 seconds to 44 seconds, from 20 seconds to 43 seconds, from 20 seconds to 42 seconds, from 20 seconds to 41 seconds, from 20 seconds to 40 seconds, from 20 seconds to 39 seconds, from 20 seconds to 38 seconds, from 20 seconds to 37 seconds, from 20 seconds to 36 seconds, from 20 seconds to 35 seconds, from 20 seconds to 34 seconds, from 20 seconds to 33 seconds, from 20 seconds to 32 seconds, from 20 seconds to 31 seconds, from 20 seconds to 30 seconds, from 20 seconds to 29 seconds, from 20 seconds to 28 seconds, from 20 seconds to 27 seconds, from 20 seconds to 26 seconds, or from 20 seconds to 25 seconds.

In other embodiments, produce may be treated with a solution of the present disclosure containing peroxyacetic acid for approximately 20 seconds, approximately 21 seconds, approximately 22 seconds, approximately 23 seconds, approximately 24 seconds, approximately 25 seconds, approximately 26 seconds, approximately 27 seconds, approximately 28 seconds, approximately 29 seconds, approximately 30 seconds, approximately 31 seconds, approximately 32 seconds, approximately 33 seconds, approximately 34 seconds, approximately 35 seconds, approximately 36 seconds, approximately 37 seconds, approximately 38 seconds, approximately 39 seconds, approximately 40 seconds, approximately 41 seconds, approximately 42 seconds, approximately 43 seconds, approximately 44 seconds, approximately 45 seconds, approximately 50 seconds, approximately 55 seconds, approximately 60 seconds, approximately 70 seconds, approximately 80 seconds, approximately 90 seconds, approximately 100 seconds, approximately 110 seconds, approximately 120 seconds, approximately 130 seconds, approximately 140 seconds, approximately 150 seconds, approximately 160 seconds, approximately 170 seconds, or approximately 180 seconds. Preferably the methods disclosed herein are adapted to current processing plants that use piping with open and closed loop flumes that expose produce to solutions for 30 seconds. Thus, in a preferred embodiment, produce is treated with a solution of the present disclosure containing peroxyacetic acid for approximately 30 seconds.

In other embodiments, solutions of the present disclosure containing peroxyacetic acid are dosed into a wash tank, or "flume," that may be used for treating the produce. Alternatively, solutions of the present disclosure containing peroxyacetic acid may be stored in a spraying container. Thus, in certain embodiments, treating produce with a solution of the present disclosure containing peroxyacetic acid includes immersing the produce in a wash tank containing the solution containing peroxyacetic acid. The methods disclosed herein may further include spraying the produce with the solution containing peroxyacetic acid.

Additional Treatments

A further aspect of the present disclosure relates to sonicating the produce before, concurrently, or after treating with the catholyte solution, the solution comprising free available chlorine, the solution comprising peroxyacetic acid, the anolyte solution, and/or the second anolyte solution.

The kinetics of sonication, which are attributable to adiabatic affects, may further sanitize the produce. By selecting a specific sonication frequency at a given intensity within the "ultra" range and time, an additional, incremental sanitizing affect may be obtained. In a preferred embodiment, the sonication is ultrasonication, and is performed using a Crest Instruments Ceramic Ultrasonic Generator, from Crest Instruments, rated at 500 watts and operating at a frequency of 58 kHz. While ultrasonication is preferred, it is envisioned that other forms of kinetic energy may also enhance the de-soiling and disinfecting effects of the solutions of the present disclosure.

The ultrasonication may occur at a frequency of approximately 15 kHz, 16 kHz, 17 kHz, 18 kHz, 19 kHz, 20 kHz, 20.3 kHz, 20.5 kHz, 20.7 kHz, 20.9 kHz, 21 kHz, 21.3 kHz, 21.5 kHz, 21.7 kHz, 21.9 kHz, 22 kHz, 22.1 kHz, 22.2 kHz, 22.3 kHz, 22.4 kHz, 22.5 kHz, 22.6 kHz, 22.7 kHz, 22.8 kHz, 22.9 kHz, 23 kHz, 23.3 kHz, 23.5 kHz, 23.7 kHz, 23.9 kHz, 24 kHz, 24.5 kHz, 25 kHz, 26 kHz, 27 kHz, 28 kHz, 29 kHz, 30 kHz, 31 kHz, 32 kHz, 33 kHz, 34 kHz, 35 kHz, 36 kHz, 37 kHz, 38 kHz, 39 kHz, 40 kHz, 41 kHz, 42 kHz, 43 kHz, 44 kHz, 45 kHz, 46 kHz, 47 kHz, 48 kHz, 49 kHz, 50 kHz, 51 kHz, 52 kHz, 53 kHz, 54 kHz, 55 kHz, 55.3 kHz, 55.7 kHz, 55.9 kHz, 56 kHz, 56.3 kHz, 56.5 kHz, 56.7 kHz, 56.9 kHz, 57 kHz, 57.1 kHz, 57.2 kHz, 57.3 kHz, 57.4 kHz, 57.5 kHz, 57.6 kHz, 57.7 kHz, 57.8 kHz, 57.9 kHz, 58 kHz, 58.1 kHz, 58.2 kHz, 58.3 kHz, 58.4 kHz, 58.5 kHz, 58.6 kHz, 58.7 kHz, 58.8 kHz, 58.9 kHz, 59 kHz, 59.3 kHz, 59.5 kHz, 59.7 kHz, 59.9 kHz, 60 kHz, 61 kHz, 62 kHz, 63 kHz, 64 kHz, 65 kHz, 66 kHz, 67 kHz, 68 kHz, 69 kHz, or 70 kHz. In certain embodiments, the ultrasonication occurs at a frequency that ranges from approximately 20 kHz to approximately 60 kHz. Preferably the ultrasonication occurs at a frequency of approximately 58 kHz, or approximately 22.3 kHz. Alternatively multiple ultrasonication frequencies may be used instead of a single ultrasonication frequency. As used herein "a frequency of approximately" refers to a frequency that varies by +/−0.2 kHz (i.e., 22.1 kHz to 22.5 kHz).

In preferred embodiments, the ultrasonication occurs for a period of time that ranges from 10 seconds to 120 seconds, from 15 seconds to 120 seconds, from 20 seconds to 120 seconds, from 25 seconds to 120 seconds, from 30 seconds to 120 seconds, from 35 seconds to 120 seconds, from 40 seconds to 120 seconds, from 45 seconds to 120 seconds, from 50 seconds to 120 seconds, from 55 seconds to 120 seconds, from 60 seconds to 120 seconds, from 65 seconds to 120 seconds, from 70 seconds to 120 seconds, from 75 seconds to 120 seconds, from 80 seconds to 120 seconds, from 85 seconds to 120 seconds, from 90 seconds to 120 seconds, from 95 seconds to 120 seconds, from 100 seconds to 120 seconds, from 105 seconds to 120 seconds, from 110 seconds to 120 seconds, or from 115 seconds to 120 seconds. Alternatively, the ultrasonication occurs for a period of time that ranges from 10 seconds to 120 seconds, from 10 seconds to 115 seconds, from 10 seconds to 110 seconds, from 10 seconds to 105 seconds, from 10 seconds to 100 seconds, from 10 seconds to 95 seconds, from 10 seconds to 90 seconds, from 10 seconds to 85 seconds, from 10 seconds to 80 seconds, from 10 seconds to 75 seconds, from 10 seconds to 70 seconds, from 10 seconds to 60 seconds, from 10 seconds to 55 seconds, from 10 seconds to 50 seconds, from 10 seconds to 45 seconds, from 10 seconds to 40 seconds, from 10 seconds to 35 seconds, from 10 seconds to 30 seconds, from 10 seconds to 25 seconds, from 10 seconds to 20 seconds, or from 10 seconds to 15 seconds.

In other embodiments, the ultrasonication occurs for approximately 10 seconds, approximately 15 seconds, approximately 20 seconds, approximately 25 seconds, approximately 30 seconds, approximately 35 seconds, approximately 40 seconds, approximately 45 seconds, approximately 50 seconds, approximately 55 seconds, approximately 60 seconds, approximately 65 seconds, approximately 70 seconds, approximately 75 seconds, approximately 80 seconds, approximately 85 seconds, approximately 90 seconds, approximately 95 seconds, approximately 100 seconds, approximately 115 seconds, or approximately 120 seconds. Preferably the methods disclosed herein are adapted to current processing plants that use piping with open and closed loop flumes. In current processing plants, the lag time between inlet and discharge in a flume wash section is typically 20 seconds. Thus, in a preferred embodiment, the ultrasonication occurs for approximately 20 seconds.

A further aspect of the present disclosure relates to treating the produce and/or produce wash solution with a pulsed electric field before, concurrently, or after treating with the catholyte solution, the solution comprising free available chlorine, the solution comprising peroxyacetic acid, the anolyte solution, and/or the second anolyte solution. In certain embodiments, the produce wash solution is treated with a pulsed electric field before produce is treated with the catholyte solution, the solution comprising free available chlorine, the solution comprising peroxyacetic acid, the anolyte solution, and/or the second anolyte solution.

Pulsed electric field technology relates to the treatment of a solution with high voltage electric pulses. Pulsed electric field technology is commonly known and used for various industrial purposes, including waste water treatment, pasteurization, and algal oil extraction. Without wishing to be bound to theory, it is thought that electric pulses are able to electroporate the cells of microorganisms, thereby rupturing cell membranes and killing the cells. As such, treatment with a pulsed electric field may further sanitize the produce. Many pulsed electric field systems suitable for laboratory or industrial scales are known in the art, such as the POWER-MOD™ systems (Diversified Technologies). Suitable pulsed electric field conditions may readily be determined by one of skill in the art by treating produce with any of the methods disclosed herein, with and without pulsed electric field treatment, and testing the effect of modulating pulsed electric field variables such as voltage, current, field strength, pulse frequency, or duration of treatment on the microbial load of produce (nascent or pathogenic microbes).

A further aspect of the present disclosure relates to treating the produce with an anolyte solution before, concurrently, or after treating with the catholyte solution, the solution comprising free available chlorine, the solution comprising peroxyacetic acid, and/or the second solution comprising free available chlorine.

Treating produce with an anolyte solution of the present disclosure may further sanitize the produce. In some embodiments, the anolyte treatment may be a separate step before or after treating with the catholyte solution, the solution comprising free available chlorine, the solution comprising peroxyacetic acid, and/or the second solution comprising free available chlorine. In some embodiments, an anolyte solution of the present disclosure may be added to the catholyte solution, the solution comprising free available chlorine, the solution comprising peroxyacetic acid, and/or the second solution comprising free available chlorine. Concentrations of an anolyte solution of the present disclosure effective to yield an additional reduction in microbial load, and/or effective to reduce microbial load of a wash solution, may readily be determined by one of skill in the art, e.g., as exemplified herein and/or by treating produce with a catholyte solution, a solution comprising free available chlorine, a solution comprising peroxyacetic acid, and/or a second the solution comprising free available chlorine and comparing the microbial load of produce (nascent or pathogenic microbes) with the microbial load of produce treated with the same wash steps and solutions, but with specific concentration(s) of an anolyte solution of the present disclosure added before, concurrently, or after one or more of the wash steps.

In some embodiments, the anolyte solution of the present disclosure is added to the catholyte solution, the solution comprising free available chlorine, the solution comprising peroxyacetic acid, and/or the second solution comprising free available chlorine at a concentration of approximately 10 ppm, approximately 11 ppm, approximately 12 ppm, approximately 13 ppm, approximately 14 ppm, approximately 15 ppm, approximately 16 ppm, approximately 17 ppm, approximately 18 ppm, approximately 19 ppm, approximately 20 ppm, approximately 21 ppm, approximately 22 ppm, approximately 23 ppm, approximately 24 ppm, approximately 25 ppm, approximately 26 ppm, approximately 27 ppm, approximately 28 ppm, approximately 29 ppm, approximately 30 ppm, approximately 31 ppm, approximately 32 ppm, approximately 33 ppm, approximately 34 ppm, approximately 35 ppm, approximately 36 ppm, approximately 37 ppm, approximately 38 ppm, approximately 39 ppm, approximately 40 ppm, approximately 41 ppm, approximately 42 ppm, approximately 43 ppm, approximately 44 ppm, approximately 45 ppm, approximately 46 ppm, approximately 47 ppm, approximately 48 ppm, approximately 49 ppm, approximately 50 ppm, approximately 51 ppm, approximately 52 ppm, approximately 53 ppm, approximately 54 ppm, approximately 55 ppm, approximately 56 ppm, approximately 57 ppm, approximately 58 ppm, approximately 59 ppm, or approximately 60 ppm FAC. In some embodiments, the anolyte solution of the present disclosure is added to the catholyte solution, the solution comprising free available chlorine, the solution comprising peroxyacetic acid, and/or the second solution comprising free available chlorine at a concentration of approximately 20 ppm FAC.

A further aspect of the present disclosure relates to treating the produce with ozone before, concurrently, or after treating with the catholyte solution, the solution comprising free available chlorine, the solution comprising peroxyacetic acid, and/or the second solution comprising free available chlorine.

Treating produce with ozone may further sanitize the produce. Ozone is able to react with hydroxyl ions to form hydroxyl radicals. Without wishing to be bound to theory, it is believed that ozone treatment may additionally improve the sanitizing properties of the methods described herein. In some embodiments, the ozone treatment may be a separate step before or after treating with the catholyte solution, the solution comprising free available chlorine, the solution comprising peroxyacetic acid, and/or the second solution comprising free available chlorine. In some embodiments, ozone may be added to the catholyte solution, the solution comprising free available chlorine, the solution comprising peroxyacetic acid, and/or the second solution comprising free available chlorine. Concentrations of ozone effective to yield an additional reduction in microbial load, and/or effective to reduce microbial load of a wash solution, may readily be determined by one of skill in the art, e.g., as exemplified herein and/or by treating produce with a catholyte solution, a solution comprising free available chlorine, a solution comprising peroxyacetic acid, and/or a second the solution comprising free available chlorine and comparing the microbial load of produce (nascent or pathogenic microbes) with the microbial load of produce treated with the same wash steps and solutions, but with specific concentration(s) of ozone added before, concurrently, or after one or more of the wash steps. In preferred embodiments, the concentration of ozone is low enough to avoid off-gassing of ozone.

In some embodiments, ozone is added to the catholyte solution, the solution comprising free available chlorine, the solution comprising peroxyacetic acid, and/or the second solution comprising free available chlorine at a concentration of approximately 1 ppm, approximately 2 ppm, approximately 3 ppm, approximately 4 ppm, approximately 5 ppm, approximately 6 ppm, approximately 7 ppm, approximately 8 ppm, approximately 9 ppm, or approximately 10 ppm.

In some embodiments, treating the produce with a pulsed electric field before, concurrently, or after treating with the catholyte solution, the solution comprising free available chlorine, the solution comprising peroxyacetic acid, and/or the second solution comprising free available chlorine may include treating a wash solution that is in contact with, was in contact with, or will be in contact with the produce with the pulsed electric field. In some embodiments, treating the produce with an anolyte solution before, concurrently, or after treating with the catholyte solution, the solution comprising free available chlorine, the solution comprising peroxyacetic acid, and/or the second solution comprising free available chlorine may include treating a wash solution that is in contact with, was in contact with, or will be in contact with the produce with the anolyte solution. In some embodiments, treating the produce with ozone before, concurrently, or after treating with the catholyte solution, the solution comprising free available chlorine, the solution comprising peroxyacetic acid, and/or the second solution comprising free available chlorine may include treating a wash solution that is in contact with, was in contact with, or will be in contact with the produce with the ozone.

Wash Sanitation

As further described and exemplified herein, the addition of one or more sanitizer(s) into a wash solution (e.g., a catholyte solution of the present disclosure) may help improve any of the produce treatments of the present disclosure, e.g., by reducing or preventing the buildup of microbial load, such as background microflora in the wash water. In some embodiments, a catholyte solution of the present disclosure further comprises one or more sanitizer(s). This may be particularly useful if the wash solution is recycled or reused for multiple treatments. As such, in certain embodiments, the catholyte solution further comprising one or more sanitizer(s) is reused for a subsequent produce treatment. Any sanitizer(s) known in the art or described herein may be used, including without limitation anolyte, ozone, PAA, chlorine (e.g., FAC), chlorine dioxide, alcohols, peroxide, and ammonia-based sanitizers. In some embodiments, the sanitizer is compatible with a catholyte solution (e.g., the sanitizer does not degrade, react with, or otherwise comprise the efficacy of catholyte). Concentrations of these sanitizers suitable for sanitizing a wash solution are known in the art and/or described herein; further, such concentrations may readily be determined by one of skill in the art using routine experimentation (see, e.g., the Examples infra for exemplary methods).

In some embodiments, a catholyte solution of the present disclosure further comprises anolyte. As disclosed herein, it has been found that mixing an anolyte solution of the present disclosure with a catholyte solution of the present disclosure is able to reduce the number of bacteria present (e.g., lettuce background microflora) and/or maintain the quality of a wash solution without excessive buildup of microflora. Any concentration of anolyte known in the art or described herein to be effective in yielding an additional reduction in microbial load (e.g., as compared to a catholyte solution that does not comprise anolyte) and/or effective to reduce microbial load of a wash solution may be used. Concentrations of an anolyte solution effective in yielding an additional reduction in microbial load may readily be determined by one of skill in the art, e.g., using the techniques described herein. For example, in some embodiments, the catholyte solution further comprising anolyte comprises free available chlorine at a concentration of 10 ppm to 50 ppm. In some embodiments, the catholyte solution further comprising anolyte comprises free available chlorine at a concentration of 10 ppm to 20 ppm. This treatment is particularly advantageous for commercial or industrial use when a wash solution is reused, e.g., for a subsequent catholyte solution treatment.

In some embodiments, a catholyte solution of the present disclosure further comprises ozone. As disclosed herein, it has been found that mixing ozone of the present disclosure with a catholyte solution of the present disclosure is able to reduce the number of bacteria present (e.g., lettuce background microflora) and/or maintain the quality of a wash solution without excessive buildup of microflora. Any concentration of ozone known in the art or described herein to be effective in yielding an additional reduction in microbial load (e.g., as compared to a catholyte solution that does not comprise ozone) and/or effective to reduce microbial load of a wash solution may be used. Concentrations of ozone effective in yielding an additional reduction in microbial load may readily be determined by one of skill in the art, e.g., using the techniques described herein. In preferred embodiments, the concentration of ozone is low enough to avoid off-gassing of ozone. For example, in some embodiments, the produce is treated with ozone at a concentration of between about 0.15 ppm and about 3 ppm. This may be accomplished, as exemplified herein, by generating an ozone solution of 1-3 ppm and adding a dilution of the ozone solution (e.g., adding the ozone solution at a dilution of 10%, 20%, 30%, 40%, 50%, 60%, 70%, 80%, or 90% in water, or adding the ozone solution without dilution) to a catholyte solution of the present disclosure. This treatment is particularly advantageous for commercial or industrial use when a wash solution is reused, e.g., for a subsequent catholyte solution treatment.

Sanitizing Produce

Further aspects of the present disclosure relate to methods for sanitizing produce by treating the produce with a catholyte solution of the present disclosure, a solution of the present disclosure containing free available chlorine (FAC), and a solution of the present disclosure containing peroxyacetic acid. Yet further aspects of the present disclosure relate to methods for sanitizing produce by treating the produce with a catholyte solution of the present disclosure, a solution of the present disclosure containing FAC (e.g., an anolyte solution), and a second solution of the present disclosure containing FAC.

In particular, the present disclosure relates to sanitizing produce by treating the produce with a catholyte solution for a period of time sufficient to sanitize the produce; treating the produce with a solution containing chlorine for a period of time sufficient to further sanitize the produce; and treating the produce with a solution containing peroxyacetic acid for a period of time sufficient to further sanitize the produce, where treating with the catholyte solution, the solution containing chlorine, and the solution containing peroxyacetic acid yields at least an additional 1 log unit reduction in microbial load, as compared to produce treated with a single solution selected from the catholyte solution, the solution containing chlorine, and the solution containing peroxyacetic acid.

The produce may be treated with each of the three solutions in any order. For example, in certain embodiments, treating with the catholyte solution occurs prior to treating with the solution containing chlorine and treating with the solution containing chlorine occurs prior to treating with the solution containing peroxyacetic acid. Alternatively, the produce may be treated concurrently with the catholyte solution and the solution containing chlorine. Preferably, this occurs prior to treating with the solution containing peroxyacetic acid. In other embodiments, treating with the catholyte solution occurs prior to treating with the solution containing peroxyacetic acid and treating with the solution containing peroxyacetic acid occurs prior to treating with the solution containing chlorine.

In other embodiments, treating with the solution containing chlorine occurs prior to treating with the catholyte solution and treating with the catholyte solution occurs prior to treating with the solution containing peroxyacetic acid. Alternatively, treating with the solution containing chlorine occurs prior to treating with the solution containing peroxyacetic acid and treating with the solution containing peroxyacetic acid occurs prior to treating with the catholyte solution.

In still other embodiments, treating with the solution containing peroxyacetic acid occurs prior to treating with the catholyte solution and treating with the catholyte solution occurs prior to treating with the solution containing chlorine. Alternatively, treating with the solution containing peroxyacetic acid occurs prior to treating with the solution containing chlorine and treating with the solution containing chlorine occurs prior to treating with the catholyte solution.

In still other embodiments, a chlorine dioxide solution may be used to further sanitize the produce. Accordingly, in certain embodiments, the methods for sanitizing produce of the present disclosure further include treating the produce with a chlorine dioxide solution before, concurrently, or after treating with a catholyte solution of the present disclosure, a solution of the present disclosure containing free available chlorine, and/or a solution of the present disclosure containing peroxyacetic acid. Chlorine dioxide is a well-known sanitizer for drinking water. The properties and chemistry of chlorine dioxide are described, for example, in "The Chlorine Dioxide Handbook", D. J. Gates, American Water Works Association, Denver, 1998. Chlorine dioxide may be produced by any suitable method known in the art. Moreover, chlorine dioxide may be obtained from any commercial source known in the art, including without limitation, chlorine dioxide packets, such as packets of Selectrocide™ 2 L500 and Selectrocide™ A-15; chlorine dioxide tablets, such as SafeOx chlorine dioxide tablets; and chlorine dioxide generators, such as AquaPulse Systems chlorine dioxide generators and ClorTec® chlorine dioxide generators. More description of chlorine dioxide solutions may be found in U.S. patent application Ser. No. 13/915,594, which is hereby incorporated by reference in its entirety).

Chlorine dioxide solutions of the present disclosure are used at a concentration that is suitable to dissolves microbial biofilms and to sanitize produce treated with such chlorine dioxide solutions. As used herein, the concentration of chlorine dioxide solutions is given as parts-per-million (ppm). Accordingly, chlorine dioxide solutions of the present disclosure may be used at a concentration that ranges from 0.1 ppm to 40 ppm, from 0.1 ppm to 35 ppm, from 0.1 ppm to 30 ppm, from 0.1 ppm to 29 ppm, from 0.1 ppm to 28 ppm, from 0.1 ppm to 27 ppm, from 0.1 ppm to 26 ppm, from 0.1 ppm to 25 ppm, from 0.1 ppm to 24 ppm, from 0.1 ppm to 23 ppm, from 0.1 ppm to 22 ppm, from 0.1 ppm to 21 ppm, from 0.1 ppm to 20 ppm, from 0.1 ppm to 19 ppm, from 0.1 ppm to 18 ppm, from 0.1 ppm to 17 ppm, from 0.1 ppm to 16 ppm, from 0.1 ppm to 15 ppm, from 0.1 ppm to 14 ppm, from 0.1 ppm to 13 ppm, from 0.1 ppm to 12 ppm, from 0.1 ppm toll ppm, from 0.1 ppm to 10 ppm, from 0.1 ppm to 9 ppm, from 0.1 ppm to 8 ppm, from 0.1 ppm to 7 ppm, from 0.1 ppm to 6 ppm, from 0.1 ppm to 5 ppm, from 0.1 ppm to 4 ppm, from 0.1 ppm to 3 ppm, from 0.1 ppm to 2 ppm, from 0.1 ppm to 1 ppm, from 0.1 ppm to 0.9 ppm, from 0.1 ppm to 0.8 ppm, from 0.1 ppm to 0.7 ppm, from 0.1 ppm to 0.6 ppm, or from 0.1 ppm to 5 ppm. Alternatively, chlorine dioxide solutions of the present disclosure may be used at a concentration that ranges from 0.1 ppm to 40 ppm, 0.2 ppm to 40 ppm, 0.3 ppm to 40 ppm, 0.4 ppm to 40 ppm, 0.5 ppm to 40 ppm, 0.6 ppm to 40 ppm, 0.7 ppm to 40 ppm, 0.8 ppm to 40 ppm, 0.9 ppm to 40 ppm, 1 ppm to 40 ppm, 2 ppm to 40 ppm, from 3 ppm to 40 ppm, from 4 ppm to 40 ppm, from 5 ppm to 40 ppm, from 6 ppm to 40 ppm, from 7 ppm to 40 ppm, from 8 ppm to 40 ppm, from 9 ppm to 40 ppm, from 10 ppm to 40 ppm, from 11 ppm to 40 ppm, from 12 ppm to 40 ppm, from 13 ppm to 40 ppm, from 14 ppm to 40 ppm, from 15 ppm to 40 ppm, from 16 ppm to 40 ppm, from 17 ppm to 40 ppm, from 18 ppm to 40 ppm, from 19 ppm to 40 ppm, from 20 ppm to 40 ppm, from 21 ppm to 40 ppm, from 22 ppm to 40 ppm, from 23 ppm to 40 ppm, from 24 ppm to 40 ppm, from 25 ppm to 40 ppm, from 26 ppm to 40 ppm, from 27 ppm to 40 ppm, from 28 ppm to 40 ppm, from 29 ppm to 40 ppm, from 30 ppm to 40 ppm, from 31 ppm to 40 ppm, from 32 ppm to 40 ppm, from 33 ppm to 40 ppm, from 34 ppm to 40 ppm, or from 35 ppm to 40 ppm. In certain embodiments, chlorine dioxide solutions of the present disclosure are used at a concentration that ranges from 2 ppm to 40 ppm. Preferably, chlorine dioxide solutions of the present disclosure are used at a concentration that ranges from 15 ppm to 30 ppm.

In other embodiments, chlorine dioxide solutions of the present disclosure are used at a concentration of approximately 0.1 ppm, approximately 0.2 ppm, approximately 0.3 ppm, approximately 0.4 ppm, approximately 0.5 ppm, approximately 0.6 ppm, approximately 0.7 ppm, approximately 0.8 ppm, approximately 0.9 ppm, approximately 1 ppm, approximately 2 ppm, approximately 3 ppm, approximately 4 ppm, approximately 5 ppm, approximately 6 ppm, approximately 7 ppm, approximately 8 ppm, approximately 9 ppm, approximately 10 ppm, approximately 11 ppm, approximately 12 ppm, approximately 13 ppm, approximately 14 ppm, approximately 15 ppm, approximately 16 ppm, approximately 17 ppm, approximately 18 ppm, approximately 19 ppm, approximately 20 ppm, approximately 21 ppm, approximately 22 ppm, approximately 23 ppm, approximately 24 ppm, approximately 25 ppm, approximately 26 ppm, approximately 27 ppm, approximately 28 ppm, approximately 29 ppm, approximately 30 ppm, approximately 31 ppm, approximately 32 ppm, approximately 33 ppm, approximately 34 ppm, approximately 35 ppm, approximately 36 ppm, approximately 37 ppm, approximately 38 ppm, approximately 39 ppm, or approximately 40 ppm. Preferably, chlorine dioxide solutions of the present disclosure are used at a concentration of approximately 25 ppm. As used herein an approximate concentration refers to a concentration that varies by +/−2 ppm (i.e., 24 ppm to 26 ppm).

Chlorine dioxide solutions of the present disclosure are also used at a pH that is suitable to dissolve microbial biofilms and sanitize produce treated with such chlorine dioxide solutions. For example, chlorine dioxide solutions of the present disclosure may be used at a pH that ranges from 3 to 9, from 3 to 8.5, from 3 to 8, from 3 to 7.5, from 3 to 7, from 3 to 6.5, from 3 to 6, from 3 to 5.5, from 3 to 5, from 3 to 4.5, or from 3 to 4. Alternatively, chlorine dioxide solutions of the present disclosure may be used at a pH that ranges from 3 to 9, from 3.5 to 9, from 4 to 9, from 4.5 to 9, from 5 to 9, from 5.5 to 9, from 6 to 9, from 6.5 to 9, from 7 to 9, from 7.5 to 9, or from 8 to 9.

In other embodiments, chlorine dioxide solutions of the present disclosure are used at a pH of approximately 3, approximately 3.2, approximately 3.4, approximately 3.5, approximately 3.6, approximately 3.8, approximately 4, approximately 4.2, approximately 4.4, approximately 4.5, approximately 4.6, approximately 4.8, approximately 5, approximately 5.2, approximately 5.4, approximately 5.5, approximately 5.6, approximately 5.8, approximately 6, approximately 6.2, approximately 6.4, approximately 6.5, approximately 6.6, approximately 6.8, approximately 7, approximately 7.2, approximately 7.4, approximately 7.5, approximately 7.6, approximately 3.8, approximately 8, approximately 8.2, approximately 8.4, approximately 8.5, approximately 8.6, approximately 8.8, or approximately 9. As used herein an approximate pH refers to a pH that varies by +/−0.2 (i.e. pH 8.8 to 9.2).

Chlorine dioxide solutions of the present disclosure are further used at a temperature that is suitable to dissolve microbial biofilms and sanitize produce treated with such chlorine dioxide solutions. As disclosed herein, chlorine dioxide is more soluble at cold temperatures, for example temperatures under 75° F. Accordingly, chlorine dioxide solutions of the present disclosure may be used at a temperature that ranges from 32° F. to 150° F., from 32° F. to 145° F., from 32° F. to 140° F., from 32° F. to 135° F., from 32° F. to 130° F., from 32° F. to 125° F., from 32° F. to 120° F., from 32° F. to 115° F., from 32° F. to 110° F., from 32° F. to 105° F., from 32° F. to 100° F., from 32° F. to 95° F., from 32° F. to 90° F., from 32° F. to 85° F., from 32° F. to 80° F., from 32° F. to 75° F., from 32° F. to 70° F., from 32° F. to 69° F., from 32° F. to 68° F., from 32° F. to 67° F., from 32° F. to 66° F., from 32° F. to 65° F., from 32° F. to 60° F., from 32° F. to 55° F., from 32° F. to 50° F., from 32° F. to 45° F., from 32° F. to 40° F., from 32° F. to 39° F., from 32° F. to 38° F., from 32° F. to 37° F., from 32° F. to 36° F., from 32° F. to 35° F., from 32° F. to 34° F., or from 32° F. to 33° F. Alternatively, chlorine dioxide solutions of the present disclosure may be used at a temperature that ranges from 32° F. to 150° F., from 33° F. to 150° F., from 34° F. to 150° F., from 35° F. to 150° F., from 36° F. to 150° F., from 37° F. to 150° F., from 38° F. to 150° F., from 39° F. to 150° F., from 40° F. to 150° F., from 45° F. to 150° F., from 50° F. to 150° F., from 55° F. to 150° F., from 60° F. to 150° F., from 65° F. to 150° F., from 70° F. to 150° F., from 75° F. to 150° F., from 80° F. to 150° F., from 85° F. to 150° F., from 90° F. to 150° F., from 95° F. to 150° F., from 100° F. to 150° F., from 105° F. to 150° F., from 110° F. to 150° F., from 115° F. to 150° F., from 120° F. to 150° F., from 125° F. to 150° F., from 130° F. to 150° F., from 135° F. to 150° F., from 140° F. to 150° F., or from 145° F. to 150° F.

In other embodiments, chlorine dioxide solutions of the present disclosure are used at a temperature of approximately 32° F., approximately 33° F., approximately 34° F., approximately 35° F., approximately 36° F., approximately 37° F., approximately 38° F., approximately 39° F., approximately 40° F., approximately 41° F., approximately 42° F., approximately 43° F., approximately 44° F., approximately 45° F., approximately 46° F., approximately 47° F., approximately 48° F., approximately 49° F., approximately 50° F., approximately 51° F., approximately 52° F., approximately 53° F., approximately 54° F., approximately 55° F., approximately 56° F., approximately 57° F., approximately 58° F., approximately 59° F., approximately 60° F., approximately 61° F., approximately 62° F., approximately 63° F., approximately 64° F., approximately 65° F., approximately 66° F., approximately 67° F., approximately 68° F., approximately 69° F., approximately 70° F., approximately 75° F., approximately 80° F., approximately 85° F., approximately 90° F., approximately 95° F., approximately 100° F., approximately 105° F., approximately 110° F., approximately 115° F., approximately 120° F., approximately 125° F., approximately 130° F., approximately 135° F., approximately 140° F., approximately 145° F., or approximately 150° F. As used herein an approximate temperature refers to a temperature that varies by +/−2° F. (i.e. 35° F. to 37° F.).

Moreover, produce is treated with a chlorine dioxide solution of the present disclosure for a period of time that is sufficient to dissolve microbial biofilms and sanitize the produce. For example, produce may be treated with a chlorine dioxide solution of the present disclosure for a period of time that ranges from 10 seconds to 180 seconds, from 11 seconds to 180 seconds, from 12 seconds to 180 seconds, from 13 seconds to 180 seconds, from 14 seconds to 180 seconds, from 15 seconds to 180 seconds, from 16 seconds to 180 seconds, from 17 seconds to 180 seconds, from 18 seconds to 180 seconds, from 19 seconds to 180 seconds, from 20 seconds to 180 seconds, from 21 seconds to 180 seconds, from 22 seconds to 180 seconds, from 23 seconds to 180 seconds, from 24 seconds to 180 seconds, from 25 seconds to 180 seconds, from 26 seconds to 180 seconds, from 27 seconds to 180 seconds, from 28 seconds to 180 seconds, from 29 seconds to 180 seconds, from 30 seconds to 180 seconds, from 31 seconds to 180 seconds, from 32 seconds to 180 seconds, from 33 seconds to 180 seconds, from 34 seconds to 180 seconds, from 35 seconds to 180 seconds, from 36 seconds to 180 seconds, from 37 seconds to 180 seconds, from 38 seconds to 180 seconds, from 39 seconds to 180 seconds, from 40 seconds to 180 seconds, from 41 seconds to 180 seconds, from 42 seconds to 180 seconds, from 43 seconds to 180 seconds, from 44 seconds to 180 seconds, from 45 seconds to 180 seconds, from 50 seconds to 180 seconds, from 55 seconds to 180 seconds, from 60 seconds to 180 seconds, from 70 seconds to 180 seconds, from 80 seconds to 180 seconds, from 90 seconds to 180 seconds, from 100 seconds to 180 seconds, from 110 seconds to 180 seconds, from 120 seconds to 180 seconds, from 130 seconds to 180 seconds, from 140 seconds to 180 seconds, from 150 seconds to 180 seconds, from 160 seconds to 180 seconds, or from 170 seconds to 180 seconds. Alternatively, produce may be treated with a chlorine dioxide solution of the present disclosure for a period of time that ranges from 10 seconds to 180 seconds, from 10 seconds to 170 seconds, from 10 seconds to 160 seconds, from 10 seconds to 150 seconds, from 10 seconds to 140 seconds, from 10 seconds to 130 seconds, from 10 seconds to 120 seconds, from 10 seconds to 110 seconds, from 10 seconds to 100 seconds, from 10 seconds to 90 seconds, from 10 seconds to 80 seconds, from 10 seconds to 70 seconds, from 10 seconds to 60 seconds, from 10 seconds to 55 seconds, from 10 seconds to 50 seconds, from 10 seconds to 45 seconds, from 10 seconds to 44 seconds, from 10 seconds to 43 seconds, from 10 seconds to 42 seconds, from 10 seconds to 41 seconds, from 10 seconds to 40 seconds, from 10 seconds to 39 seconds, from 10 seconds to 38 seconds, from 10 seconds to 37 seconds, from 10 seconds to 36 seconds, from 10 seconds to 35 seconds, from 10 seconds to 34 seconds, from 10 seconds to 33 seconds, from 10 seconds to 32 seconds, from 10 seconds to 31 seconds, from 10 seconds to 30 seconds, from 10 seconds to 29 seconds, from 10 seconds to 28 seconds, from 10 seconds to 27 seconds, from 10 seconds to 26 seconds, from 10 seconds to 25 seconds, from 10 seconds to 24 seconds, from 10 seconds to 23 seconds, from 10 seconds to 22 seconds, from 10 seconds to 21 seconds, from 10 seconds to 20 seconds, from 10 seconds to 19 seconds, from 10 seconds to 18 seconds, from 10 seconds to 17 seconds, from 10 seconds to 16 seconds, from 10 seconds to 15 seconds, from 10 seconds to 14 seconds, from 10 seconds to 13 seconds, or from 10 seconds to 12 seconds.

In other embodiments, produce may be treated with a chlorine dioxide solution of the present disclosure for approximately 10 seconds, approximately 11 seconds, approximately 12 seconds, approximately 13 seconds, approximately 14 seconds, approximately 15 seconds, approximately 16 seconds, approximately 17 seconds, approximately 18 seconds, approximately 19 seconds, approximately 20 seconds, approximately 21 seconds, approximately 22 seconds, approximately 23 seconds, approximately 24 seconds, approximately 25 seconds, approximately 26 seconds, approximately 27 seconds, approximately 28 seconds, approximately 29 seconds, approximately 30 seconds, approximately 31 seconds, approximately 32 seconds, approximately 33 seconds, approximately 34 seconds, approximately 35 seconds, approximately 36 seconds, approximately 37 seconds, approximately 38 seconds, approximately 39 seconds, approximately 40 seconds, approximately 41 seconds, approximately 42 seconds, approximately 43 seconds, approximately 44 seconds, approximately 45 seconds, approximately 50 seconds, approximately 55 seconds, approximately 60 seconds, approximately 70 seconds, approximately 80 seconds, approximately 90 seconds, approximately 100 seconds, approximately 110 seconds, approximately 120 seconds, approximately 130 seconds, approximately 140 seconds, approximately 150 seconds, approximately 160 seconds, approximately 170 seconds, or approximately 180 seconds. Preferably the methods disclosed herein are adapted to current processing plants that use piping with open and closed loop flumes that expose produce to solutions for approximately 10 seconds or 30 seconds. Thus, in a preferred embodiment, produce is treated with a chlorine dioxide solution of the present disclosure for approximately 10 seconds. In another embodiment, produce is treated with a chlorine dioxide solution of the present disclosure for approximately 30 seconds. As used herein an approximate time of treatment refers to a period of time that varies by +/−2 seconds (i.e., 10 second to 12 seconds).

As disclosed herein, solutions of the present disclosure containing peroxyacetic acid are also useful for inactivating the chlorine dioxide used in chlorine dioxide solutions of the present disclosure. Without wishing to be bound by theory, it is believed that solutions of the present disclosure containing peroxyacetic acid and used at a pH that ranges from 2.5 to 7 are able to inactivate the chlorine dioxide solution by decreasing the concentration of the chlorine dioxide to below 3 ppm. Accordingly, in certain embodiments, treating produce with a solution of the present disclosure containing peroxyacetic acid reduces the concentration of a chlorine dioxide solution of the present disclosure. Preferably, the concentration of the chlorine dioxide solution after treatment with the solution containing peroxyacetic acid is less than 10 ppm, less than 9 ppm, less than 8 ppm, less than 7 ppm, less than 6 ppm, less than 5 ppm, less than 4 ppm, less than 3 ppm, less than 2 ppm, less than 1 ppm, less than 0.9 ppm, less than 0.8 ppm less than 0.7 ppm less than 0.6 ppm less than 0.5 ppm less than 0.4 ppm less than 0.3 ppm less than 0.2 ppm less than 0.1 ppm, less than 0.09 ppm, less than 0.08 ppm, less than 0.07 ppm, less than 0.06 ppm, less than 0.05 ppm, less than 0.04 ppm, less than 0.03 ppm, less than 0.02 ppm, less than 0.01 ppm, less than 0.001 ppm, less than 0.0001 ppm, or less. More preferably, the concentration of the chlorine dioxide solution after treatment with the solution containing peroxyacetic acid is less than 2 ppm.

Moreover, as disclosed herein, treating produce with a mixture of a catholyte solution and a solution containing chlorine, followed by a solution containing peroxyacetic acid results in an approximately 5 log unit reduction in microbial load. Accordingly, other aspects of the present disclosure relate to sanitizing produce, by treating the produce with a mixture of a catholyte solution and a solution containing chlorine for a period of time sufficient to sanitize the produce; and treating the produce with a solution containing peroxyacetic acid for a period of time sufficient to further sanitize the produce, where treating with the catholyte solution, the solution containing chlorine, and the solution containing peroxyacetic acid yields at least an additional 1 log unit reduction in microbial load, as compared to produce treated with a single solution selected from the catholyte solution, the solution containing chlorine, and the solution containing peroxyacetic acid. In certain embodiments, treating with the mixture occurs prior to treating with the solution containing peroxyacetic acid.

Any suitable method known in the art may be used to determine log unit reduction in microbial load. For example, microbial load may be determined by calculating the total Aerobic Plate Counts (APC) in colony forming units per gram (CFU/g). Microbial APC counts may be on the order of, for example, $10^6$ CFU/g, and so preferably log units are used to compare APC counts.

Accordingly, in certain embodiments, treating produce with a catholyte solution of the present disclosure, a solution of the present disclosure containing free available chlorine, and a solution of the present disclosure containing peroxyacetic acid yields an additional log unit reduction in microbial load that ranges from 0.5 to 6, 1.0 to 6, 1.5 to 6, from 2 to 6, from 2.5 to 6, from 2.6 to 6, from 2.8 to 6, from 3 to 6, from 3.2 to 6, from 3.4 to 6, from 3.6 to 6, from 3.8 to 6, from 4 to 6, from 4.2 to 6, from 4.4 to 6, from 4.6 to 6, from 4.8 to 6, from 5 to 6, from 5.2 to 6, from 5.4 to 6, or 5.6 to 6, as compared to produce treated with a single solution selected from a catholyte solution, a solution containing chlorine, and a solution containing peroxyacetic acid. Alternatively, treating produce with a catholyte solution of the present disclosure, a solution of the present disclosure containing free available chlorine, and a solution of the present disclosure containing peroxyacetic acid yields an additional log unit reduction in microbial load that ranges from 0.5 to 6, from 0.5 to 5.8, from 0.5 to 5.6, from 0.5 to 5.4, from 0.5 to 5.2, from 0.5 to 5, from 0.5 to 4.8, from 0.5 to 4.6, from 0.5 to 4.4, from 0.5 to 4.2, from 0.5 to 4, from 0.5 to 3.8, from 0.5 to 3.6, from 0.5 to 3.4, from 0.5 to 3.2, from 0.5 to 3, from 0.5 to 2.8, from 0.5 to 2.6, from 0.5 to 2.4, from 0.5 to 2.2, from 0.5 to 2, or from 0.5 to 1.8, as compared to produce treated with a single solution selected from a catholyte solution, a solution containing chlorine, and a solution containing peroxyacetic acid. In some embodiments, treating produce with a catholyte solution of the present disclosure, a solution of the present disclosure containing free available chlorine, and a solution of the present disclosure containing peroxyacetic acid yields an additional log unit reduction in microbial load that ranges from about 1.5 to about 6, as compared to produce treated with a single solution selected from a catholyte solution, a solution containing chlorine, and a solution containing peroxyacetic acid. In some embodiments, treating produce with a catholyte solution of the present disclosure, a solution of the present disclosure containing free available chlorine, and a solution of the present disclosure containing peroxyacetic acid yields an additional log unit reduction in microbial load that ranges from about 0.5 to about 2, as compared to produce treated with a single solution selected from a catholyte solution, a solution containing chlorine, and a solution containing peroxyacetic acid.

In other embodiments, treating produce with a catholyte solution of the present disclosure, a solution of the present disclosure containing free available chlorine, and a solution of the present disclosure containing peroxyacetic acid yields approximately an additional 0.5 log unit reduction, approximately an additional 1 log unit reduction, approximately an additional 1.5 log unit reduction, approximately an additional 2 log unit reduction, approximately an additional 2.5 log unit reduction, approximately an additional 2.6 log unit reduction, approximately an additional 2.8 log unit reduction, approximately an additional 3 log unit reduction, approximately an additional 3.2 log unit reduction, approximately an additional 3.4 log unit reduction, approximately an additional 3.6 log unit reduction, approximately an additional 3.8 log unit reduction, approximately an additional 4 log unit reduction, approximately an additional 4.2 log unit reduction, approximately an additional 4.4 log unit reduction, approximately an additional 4.6 log unit reduction, approximately an additional 4.8 log unit reduction, approximately an additional 5 log unit reduction, approximately an additional 5.2 log unit reduction, approximately an additional 5.4 log unit reduction, approximately an additional 5.6 log unit reduction, approximately an additional 5.8 log unit reduction, or approximately an additional 6 log unit reduction, as compared to produce treated with a single solution selected from a catholyte solution, a solution containing chlorine, and a solution containing peroxyacetic acid.

In some embodiments, treating produce with a catholyte solution of the present disclosure, a solution of the present disclosure containing free available chlorine, and a solution of the present disclosure containing peroxyacetic acid yields an approximately equivalent log unit reduction, as compared to produce treated with a chlorine dioxide solution, a solution of the present disclosure containing free available chlorine, and a solution of the present disclosure containing peroxyacetic acid. In some embodiments, treating produce with a catholyte solution of the present disclosure, a solution of the present disclosure containing free available chlorine, and a solution of the present disclosure containing peroxyacetic acid yields a greater log unit reduction, as compared to produce treated with a chlorine dioxide solution, a solution of the present disclosure containing free available chlorine, and a solution of the present disclosure containing peroxyacetic acid.

Advantageously, the at least an additional 1 log unit reduction in microbial load not only sanitizes the produce, but also increases the shelf-life of the treated produce. Accordingly, in certain embodiments, treating with a catholyte solution of the present disclosure, a solution of the present disclosure containing free available chlorine (FAC), and a solution of the present disclosure containing peroxyacetic acid yields an increase in shelf-life of the produce, as compared to produce treated with a single solution selected from the catholyte solution, the solution containing chlorine, and the solution containing peroxyacetic acid. Accordingly, in certain embodiments, treating with a catholyte solution of the present disclosure, a solution of the present disclosure containing FAC (e.g., an anolyte solution), and a second a solution of the present disclosure containing FAC yields an increase in shelf-life of the produce, as compared to produce treated with a single solution selected from the catholyte solution, the solution of the present disclosure containing FAC, and the second solution of the present disclosure containing FAC.

As disclosed herein, once the produce has been treated with a catholyte solution of the present disclosure, a solution of the present disclosure containing free available chlorine and a solution of the present disclosure containing peroxyacetic acid, the produce is washed with potable water to remove residual sanitizer solutions and to reduce the residual chlorine concentration to below 2 ppm chlorine. Similarly, as disclosed herein, once the produce has been treated with a catholyte solution of the present disclosure, solution of the present disclosure containing FAC (e.g., an anolyte solution), and a second solution of the present disclosure containing FAC, the produce is washed with potable water to remove residual sanitizer solutions and to reduce the residual chlorine concentration to below 2 ppm chlorine. The washing is preferably performed by spraying the produce. Moreover, washing with potable water preferably occurs before dewatering the produce for packaging. The produce may be dewatered by any suitable method known in the art, including but not limited to, drying methods such as spin drying and air drying. Accordingly, in certain embodiments, the methods for sanitizing produce of the present disclosure further include treating the produce with potable water after treating with a catholyte solution of the present disclosure, a solution of the present disclosure containing free available chlorine, and a solution of the present disclosure containing peroxyacetic acid. Accordingly, in other embodiments, the methods for sanitizing produce of the present disclosure further include treating the produce with potable water after treating with a catholyte solution of the present disclosure, solution of the present disclosure containing FAC (e.g., an anolyte solution), and a second solution of the present disclosure containing FAC. Preferably, the produce is sprayed with potable water. In other embodiments, the methods for sanitizing produce of the present disclosure further include dewatering the produce after spraying with potable water.

Systems for Sanitizing Produce

Other aspects of the present disclosure relate to systems for sanitizing produce that incorporate treating the produce with a catholyte solution of the present disclosure, a solution of the present disclosure containing free available chlorine, and a solution of the present disclosure containing peroxyacetic acid. Yet other aspects of the present disclosure relate to systems for sanitizing produce that incorporate treating the produce with a catholyte solution of the present disclosure, solution of the present disclosure containing FAC (e.g., an anolyte solution), and a second solution of the present disclosure containing FAC. As disclosed herein, any produce processing plant system known in the art may be used. Suitable systems include, without limitation, systems that utilize open flumes, systems that utilize piping with open and closed loop flumes, and systems that utilize piping with closed loop flumes.

One non-limiting embodiment of a system for sanitizing produce that incorporates treating the produce with a catholyte solution of the present disclosure, a solution of the present disclosure containing free available chlorine, and a solution of the present disclosure containing peroxyacetic acid is shown in FIG. 1A. The system depicted in FIG. 1A contains a product flow inclined conveyor belt for introducing produce into an initial wash tank containing a conveyor belt for transporting the produce through the wash tank (Wash Tank #1). The first sanitizer injection pump for introducing the first sanitizer solution, such as a catholyte solution of the present disclosure, is operably connected to Wash Tank #1 and introduces the first sanitizer solution into Wash Tank #1, thus treating the submerged produce as it progresses on the conveyer belt through Wash Tank #1. The produce then exits Wash Tank #1 onto a conveyor belt that dewaters the produce. In some embodiments, the solution from Wash Tank #1 may be reused for a subsequent produce treatment. In some embodiments, this solution further comprises one or more sanitizer(s), e.g., anolyte or ozone. The conveyer belt then introduces the produce into a second wash tank containing a conveyor belt for transporting the produce through the wash tank (Wash Tank #2). A second sanitizer injection pump for introducing a second sanitizer solution, such as a solution of the present disclosure containing free available chlorine, is operably connected to Wash Tank #2 and introduces the second sanitizer solution into Wash Tank #2, thus treating the submerged produce as it progresses on the conveyer belt through Wash Tank #2. The produce then exits Wash Tank #2 onto a conveyor belt that dewaters the produce. The conveyer belt then introduces the produce into a third wash tank containing a conveyor belt for transporting the produce through the wash tank (Wash Tank #3). A third sanitizer injection pump for introducing a third sanitizer solution, such as a solution of the present disclosure containing peroxyacetic acid, is operably connected to Wash Tank #3 and introduces the third sanitizer solution into Wash Tank #3, thus treating the submerged produce as it progresses on the conveyer belt through Wash Tank #3. The produce then exits Wash Tank #3 onto a conveyor belt that is operably connected to a fresh water sprayer. The produce is then sprayed with fresh water and is dewatered as it exits the conveyor belt. The produce can then be transferred to dewatering and packout systems.

Figure 1B:
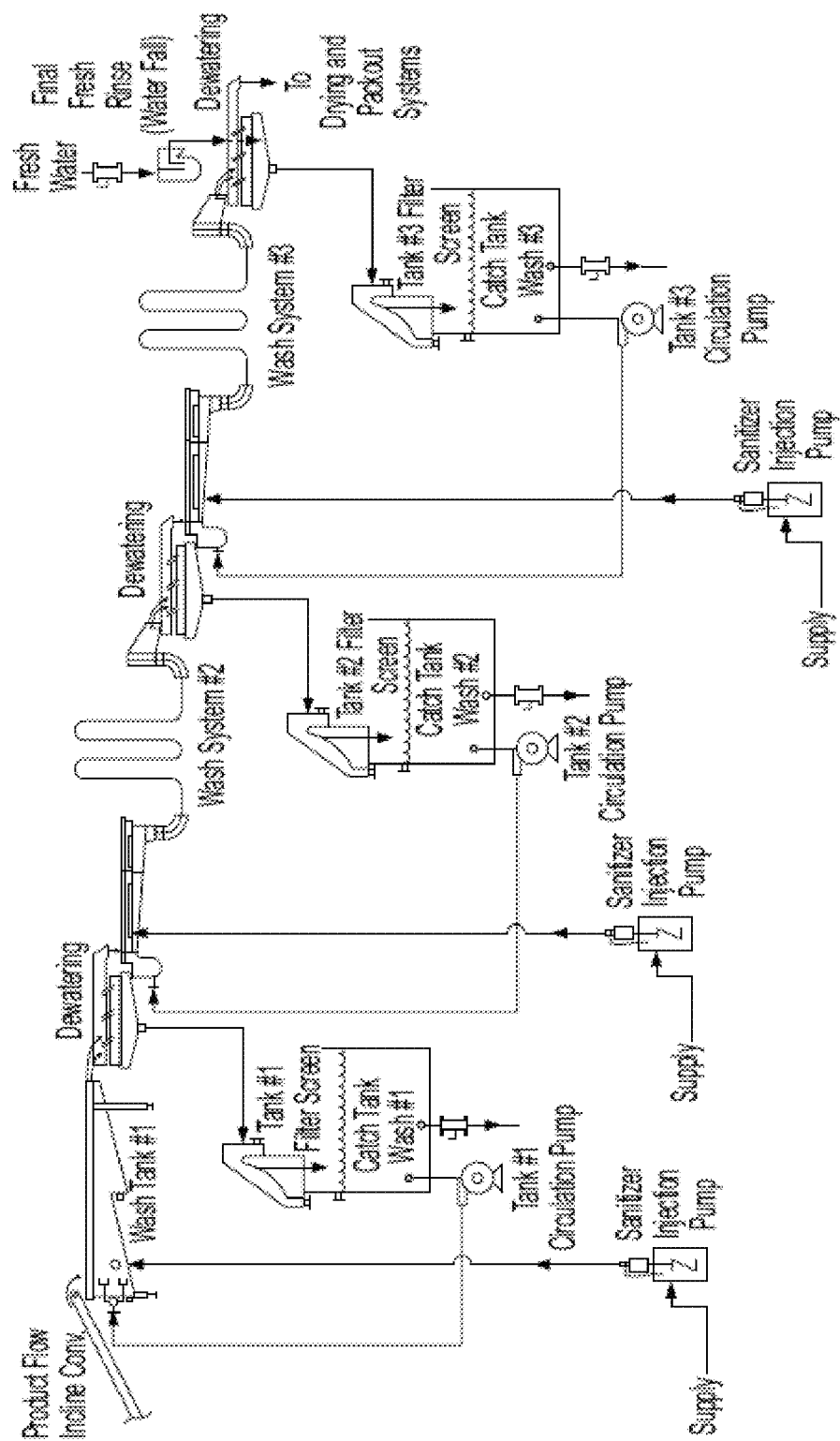
FIG. 1B is a diagram of an exemplary wash system for sanitizing produce that includes one open flume and two closed loop flumes.

Another non-limiting embodiment of a system for sanitizing produce that incorporates treating the produce with a catholyte solution of the present disclosure, a solution of the present disclosure containing free available chlorine, and a solution of the present disclosure containing peroxyacetic acid is shown in FIG. 1B. The system depicted in FIG. 1B contains a product flow inclined conveyor belt for introducing produce into an initial wash tank containing a conveyor belt for transporting the produce through the wash tank (Wash Tank #1). The first sanitizer injection pump for introducing the first sanitizer solution, such as a catholyte solution of the present disclosure, is operably connected to Wash Tank #1 and introduces the first sanitizer solution into Wash Tank #1, thus treating the submerged produce as it progresses on the conveyer belt through Wash Tank #1. The produce then exits Wash Tank #1 onto a conveyor belt that dewaters the produce. In some embodiments, the solution from Wash Tank #1 may be reused for a subsequent produce treatment. In some embodiments, this solution further comprises one or more sanitizer(s), e.g., anolyte or ozone. The conveyer belt then introduces the produce into an initial closed loop flume system (Wash System #2). A second sanitizer injection pump for introducing a second sanitizer solution, such as a solution of the present disclosure containing free available chlorine, is operably connected to Wash System #2 and introduces the second sanitizer solution into Wash System #2, thus treating the enclosed produce as it flows through Wash System #2. The produce then exits Wash System #2 by positive flow onto a conveyor belt that dewaters the produce. The conveyer belt then introduces the produce into a second closed loop flume system (Wash System #3). A third sanitizer injection pump for introducing a third sanitizer solution, such as a solution of the present disclosure containing peroxyacetic acid, is operably connected to Wash System #3 and introduces the third sanitizer solution into Wash System #3, thus treating the enclosed produce as it flows through Wash System #3. The produce then exits Wash System #3 by positive flow onto a conveyor belt that is operably connected to a fresh water sprayer. The produce is then sprayed with fresh water and is dewatered as it exits the conveyor belt. The produce can then be transferred to dewatering and packout systems.

Figure 1C:
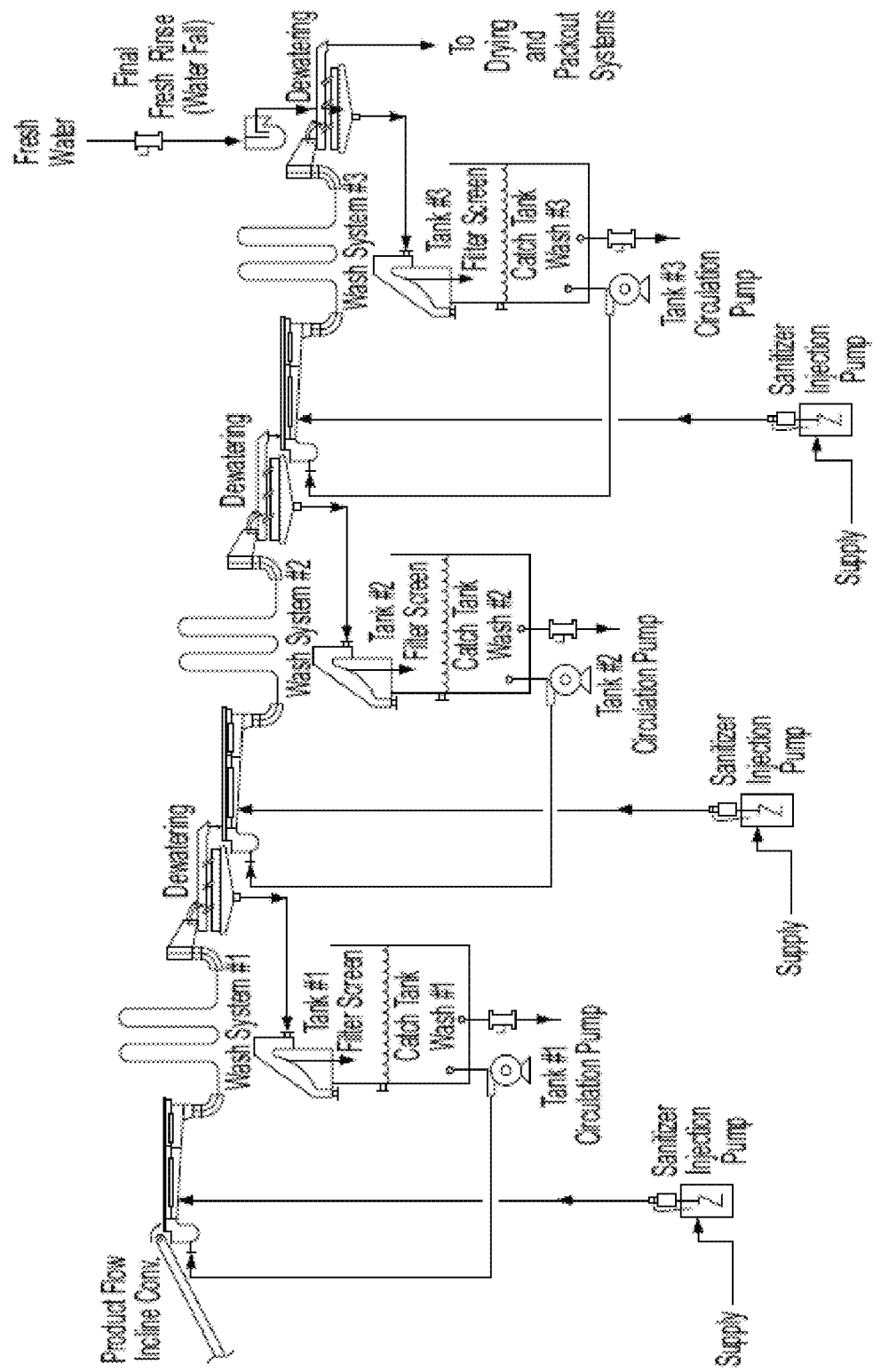
FIG. 1C is a diagram of an exemplary wash system for sanitizing produce that includes three closed loop flumes.

A further non-limiting embodiment of a system for sanitizing produce that incorporates treating the produce with a catholyte solution of the present disclosure, a solution of the present disclosure containing free available chlorine, and a solution of the present disclosure containing peroxyacetic acid is shown in FIG. 1C. The system depicted in FIG. 1C contains a product flow inclined conveyor belt for introducing produce into an initial closed loop flume system (Wash System #1). The first sanitizer injection pump for introducing the first sanitizer solution, such as a catholyte solution of the present disclosure, is operably connected to Wash System #1 and introduces the first sanitizer solution into Wash System #1, thus treating the enclosed produce as it flows through Wash System #1. The produce then exits Wash System #1 by positive flow onto a conveyor belt that dewaters the produce. In some embodiments, the solution from Wash System #1 may be reused for a subsequent produce treatment. In some embodiments, this solution further comprises one or more sanitizer(s), e.g., anolyte or ozone. The conveyer belt then introduces the produce into a second closed loop flume system (Wash System #2). A second sanitizer injection pump for introducing a second sanitizer solution, such as a solution of the present disclosure containing free available chlorine, is operably connected to Wash System #2 and introduces the second sanitizer solution into Wash System #2, thus treating the enclosed produce as it flows through Wash System #2. The produce then exits Wash System #2 by positive flow onto a conveyor belt that dewaters the produce. The conveyer belt then introduces the produce into a third closed loop flume system (Wash System #3). A third sanitizer injection pump for introducing a third sanitizer solution, such as a solution of the present disclosure containing peroxyacetic acid, is operably connected to Wash System #3 and introduces the third sanitizer solution into Wash System #3, thus treating the enclosed produce as it flows through Wash System #3. The produce then exits Wash System #3 by positive flow onto a conveyor belt that is operably connected to a fresh water sprayer. The produce is then sprayed with fresh water and is dewatered as it exits the conveyor belt. The produce can then be transferred to dewatering and packout systems.

The following Examples are merely illustrative and are not meant to limit any aspects of the present disclosure in any way.

EXAMPLES

Example 1: Sanitizing Produce by Treating with a Chlorine Dioxide Solution, a Chlorine Solution, and an Peroxyacetic Acid Solution The following Example demonstrates that a triple wash treatment utilizing a chlorine dioxide ($ClO_2$) solution, a chlorine solution ($Cl_2$), and a peroxyacetic acid solution (PAA) is successful in sanitizing leafy vegetables, such as lettuces and spinach. The triple wash treatment described below includes the use of the sanitizers chlorine dioxide ($ClO_2$), chlorine solution ($Cl_2$), and peroxyacetic acid (PAA). Without wishing to be bound by theory, it is believed that use of the chlorine dioxide solution dissolves or otherwise removes bacterial biofilms present on leafy vegetables that protect the bacteria from the effects of sanitizers. Once the biofilm is removed, chlorine dioxide and chlorine solutions sanitize the leafy vegetable by eliminating the bacteria. The use of the PAA solution not only further sanitizes the leafy vegetables, but it is also believed that residual acetic acid in the PAA solution acts as a trap to inactivate the chlorine dioxide, making it safer to use the chlorine dioxide solution.

The results depicted below indicate that the sequential addition of $ClO_2$, $Cl_2$, and PAA provides at least a 4 log unit reduction in microbial load, when compared with a chlorine-only treatment control that only provides a 2 log unit reduction. Advantageously, the results demonstrated that the triple wash treatment provides a greater amount of sanitation in commercial produce processing than previously available in the fresh produce industry.

Materials and Methods

Bench-Top Triple Wash Treatment

Sample Preparation

Unwashed product was collected and used for all bench-top testing. Commodity Romaine lettuce, and Iceberg lettuce were collected post-transslicer. Spring Mix lettuces and commodity spinach were collected as unwashed and already-proportioned. 10 replicates (minimum 25 g) of raw, unwashed product were collected for microbial load analysis.

Solution Preparation

Separate chlorine dioxide ($ClO_2$), chlorine ($Cl_2$), and peroxyacetic acid (PAA) solution dip stations were prepared with target concentrations of each chemical in a total volume of 20 L.

The target concentration for $ClO_2$ was 25 ppm. This solution was prepared by diluting concentrate solutions of $ClO_2$. The concentrate solutions of $ClO_2$ were generated from packets of Selectrocide™ 2 L500 and Selectrocide™ A-15. The Selectrocide™ 2 L500 was used to generate 2 liters of 500 ppm concentrate $ClO_2$ solution and the Selectrocide™ A-15 was used to generate 20 liters of 800 ppm concentrate $ClO_2$ solution. The $ClO_2$ concentration of the final working solution was confirmed using an HACH Spectrophotomer DR 2800 (program 76).

The target concentration for $Cl_2$ was 40 ppm. This solution was prepared using sodium hypochlorite from Ecolab, Inc. The $Cl_2$ concentration was confirmed using a HACH Spechtrophotometer DR 2800 (program 80).

The target concentration for PAA was 80 ppm. This solution was prepared using Sanidate® 5.0 (5.25% PAA). The PAA concentration was confirmed using an Ecolab, Inc. Peracid/Peroxide #311 Test Kit.

Triple Wash Dipping Procedure

Product was dipped at a rate of 908 g/20 L (2 lbs/20 L) and dipped in solution in the following orders:
a. 10 seconds in 25 ppm $ClO_2$
b. 90 seconds in 40 ppm $Cl_2$
c. 30 seconds in 80 ppm PAA; or
a. 30 seconds in 25 ppm $ClO_2$
b. 90 seconds in 40 ppm $Cl_2$
c. 30 seconds in 80 ppm PAA; or
a. 30 seconds in 25 ppm $ClO_2$
b. 90 seconds in 80 ppm PAA
c. 30 seconds in 40 ppm $Cl_2$; or
a. 10 seconds in 80 ppm PAA
b. 90 seconds in 25 ppm $ClO_2$
c. 30 seconds in 40 ppm $Cl_2$; or
a. 10 seconds in 80 ppm PAA
b. 90 seconds in 40 ppm $Cl_2$
c. 30 seconds in 25 ppm $ClO_2$ It should be noted that all concentrations listed above are target concentrations.

The $ClO_2$ was performed at a pH that ranged from approximately 4-9. However, $ClO_2$ is effective over a broad range of pH, and so the pH was not controlled. The $Cl_2$ wash step was performed at a controlled pH of approximately 6.5+/−0.2 pH units. The PAA wash step was performed at a pH that ranged from approximately 3-4.

Product was agitated while dipped to simulate processing, retrieved using a sterilized basket, and placed onto sterilized tray between dips. Both basket and tray were sterilized using 70% ethanol.

For each trial, 5 replicates (25 g minimum) were collected following each dip step for microbial load analysis. Product collected for microbial load analysis was not dried before collection.

Microbial Load Analysis

All samples collected for microbial load analysis (i.e., both unwashed and treated sample) were sent to a third party Food Safety Lab (IEH Laboratories in Salinas, Calif.) for Total Aerobic Plate Count (APC) analysis using standard FDA BAM techniques. APC results are reported as colony forming units per gram (CFU/g.).

Average APC log value for each treatment was calculated by calculating the log value of the APC count for each replicate in a given treatment, and then averaging the log values for all replicates in each treatment.

Average APC log unit reduction was based on the average APC log value of the raw, untreated control. The average APC log value of each treatment was subtracted from the average APC log value of control to obtain the average APC log unit reduction for a given treatment. For example, if the average APC log value of the control is 3.77 and the average APC log value of the triple wash treatment is 2.01, then the average APC log unit reduction for the triple wash treatment would be 3.77−2.01=1.76.

Results

Triple Wash Treatment of Romaine Lettuce

For Treatment 1, unwashed, cut Romaine was used for the trial. Samples of raw (i.e., unwashed) Romaine and Romaine following final dip were collected in triplicate and APC testing was performed. Dips were completed as follows: a) 10 s dip in 80 ppm PAA; b) 90 s dip in 25 ppm $ClO_2$; and c) 30 s dip in 40 ppm $Cl_2$.

For Treatment 2, unwashed, cut Romaine lettuce was used for the trial. Samples of raw (i.e., unwashed) Romaine and Romaine following final dip were collected in triplicate and APC testing was performed. Dips were completed as follows: a) 30 s dip in 25 ppm $ClO_2$; b) 90 s dip in 40 ppm $Cl_2$; and c) 30 s dip in 80 ppm PAA.

Figure 2A:
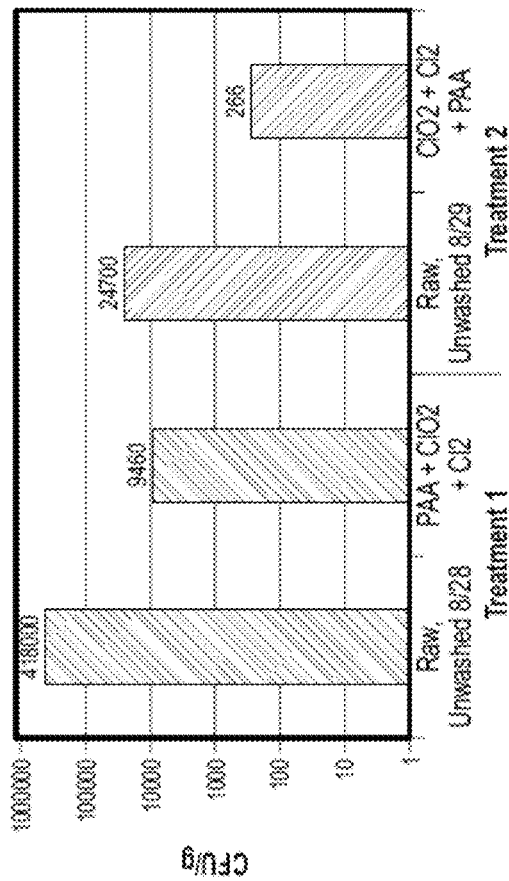
FIG. 2A is a bar graph depicting average Aerobic Plate Counts (APC) on Romaine lettuce from 2 treatments with $ClO_2$, $Cl_2$, and PAA.
Figure 2B:
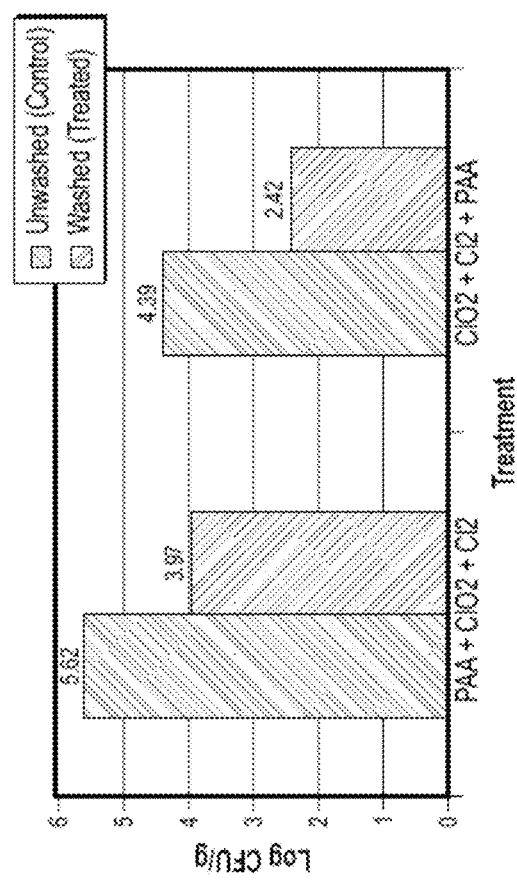
FIG. 2B is a bar graph depicting average Aerobic Plate Count (APC) log unit reduction on Romaine lettuce from 2 treatments with $ClO_2$, $Cl_2$, and PAA. Treatment 1 was performed in the following order: 80 ppm PAA for 10 s, 25 ppm $ClO_2$ for 90 s, then 40 ppm $Cl_2$ for 30 s. Treatment 2 was performed in the following order: 25 ppm $ClO_2$ for 30 s, 40 ppm $Cl_2$ for 90 s, then 80 ppm PAA for 30 s.

As shown in FIGS. 2A and 2B, the raw control in Treatment 1 had an average APC of 418,000 CFU/g (5.62 log units), while the triple wash treatment (PAA+ClO2+Cl2) had an average APC of 9,460 CFU/g (3.97 log units). This represents a log unit reduction of approximately 1.64 for the triple wash treatment.

The raw control in Treatment 2 had an average APC of 24,700 CFU/g (4.39 log units), while the triple wash treatment ($ClO_2$+$Cl_2$+PAA) had an average APC of 266 CFU/g (2.42 log units) (FIGS. 2A-B). This represents a log unit reduction of approximately 1.97 for the triple wash treatment. Moreover, the order of the triple wash treatments demonstrated that the sequence of (ClO2+Cl2+PAA) results in a lower final microbial count (an additional 1.5 log, 2.42 vs 3.97) as compared to the triple wash treatment sequence of (PAA+ClO2+Cl2), as evaluated by APC counts.

Triple Wash Treatment Comparison with Triple Chlorine Treatment

Unwashed, cut Romaine lettuce used for the trial. Samples of raw (i.e., unwashed) Romaine (10 samples), and Romaine following dip 1, following dip 2 and after the final dip (5 samples per dipped variable) were collected and APC testing was performed.

Triple wash dips were completed as follows: a) 30 s dip in 25 ppm $ClO_2$; b) 90 s dip in 40 ppm $Cl_2$; and c) 30 s dip in 80 ppm PAA.

Triple chlorine treatment dips were completed as follows: a) 30 s dip in 40 ppm C12;
b) 90 s dip in 40 ppm $Cl_2$; and c) 30 s dip in 40 ppm $Cl_2$.

Figure 3A:
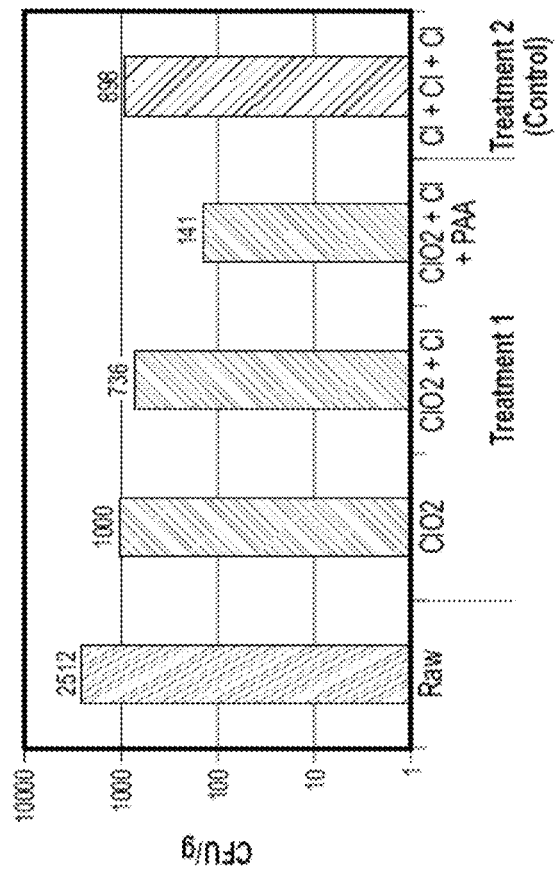
FIG. 3A is a bar graph depicting average Aerobic Plate Counts (APC) on Romaine lettuce from 1 treatment with $ClO_2$, $Cl_2$, and PAA, and 1 control treatment with three washes of $Cl_2$ alone.

As shown in FIG. 3A, the raw control in had an average APC of 2,512 CFU/g, the triple wash treatment after the first dip (ClO2) had an average APC of 1,000 CFU/g, the triple wash treatment after the second dip (Cl2) had an average APC of 736 CFU/g, and the triple wash treatment after the final dip (PAA) had an average APC of 141 CFU/g. In contrast, the triple chlorine treatment had an average APC of 898 CFU/g (FIG. 3A).

Figure 3B:
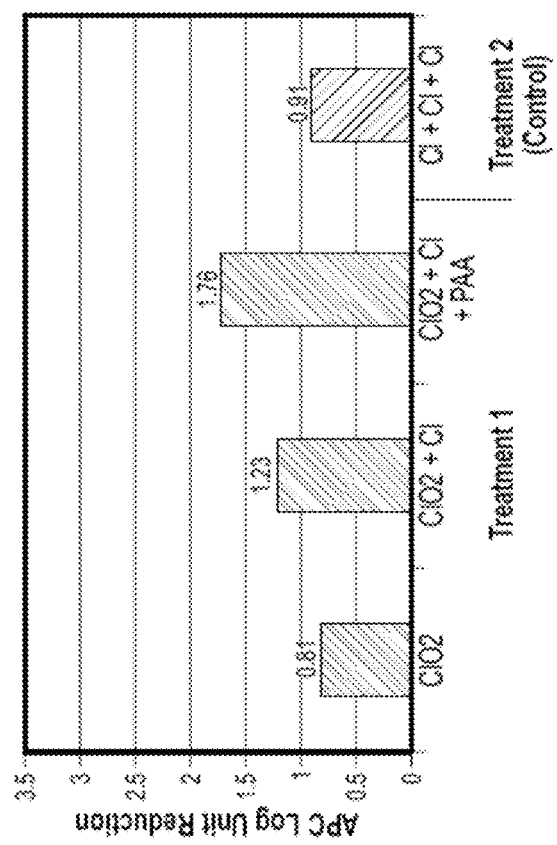
FIG. 3B is a bar graph depicting average Aerobic Plate Count (APC) log unit reduction on Romaine lettuce from 1 treatment with $ClO_2$, $Cl_2$, and PAA, and 1 control treatment with three washes of $Cl_2$ alone. Treatment 1 was performed in the following order: 25 ppm $ClO_2$ for 30 s, 40 ppm $Cl_2$ for 90 s, then 80 ppm PAA for 30 s. Treatment 2 (Control) was performed in the following order: 40 ppm $Cl_2$ for 30 s, 40 ppm $Cl_2$ for 90 s, then 40 ppm $Cl_2$ for 30 s.

The average log unit reduction, compared to the raw control, for the triple wash treatment after each dip was then calculated and compared to that of the triple chlorine treatment. As shown in FIG. 3B, the triple wash treatment after the first dip ($ClO_2$) had an average APC log unit reduction of approximately 0.81; the triple wash treatment after the second dip ($Cl_2$) had an average APC log unit reduction of approximately 1.23, and the triple wash treatment after the final dip (PAA) had an average APC log unit reduction of approximately 1.76. In contrast, the triple chlorine treatment had an average APC log unit reduction of approximately 0.91.

The results depicted in FIG. 3 indicate that each step of the triple wash treatment ($ClO_2$, $Cl_2$, PAA) has at least an additive, if not synergistic effect on microbial load reduction. Moreover, compared to the triple chlorine treatment, the triple wash treatment resulted in approximately an additional log reduction in microbial load, as evaluated by APC counts (FIG. 3B).

Comparison of Order of PAA and $Cl_2$ in Triple Wash Treatment

Unwashed, cut Romaine was used for the trial. For each treatment, samples of raw (i.e., unwashed) Romaine (10 samples), and Romaine following dip 1, dip 2, and final dip (5 samples per dipped variable) were collected and APC testing was performed.

Triple wash dips were for Treatment 1 were completed as follows: a) 30 s dip in 25 ppm $ClO_2$; b) 90 s dip in 40 ppm $Cl_2$; and c) 30 s dip in 80 ppm PAA.

Triple wash dips were for Treatment 2 were completed as follows: a) 30 s dip in 25 ppm $ClO_2$; b) 90 s dip in 80 ppm PAA; and c) 30 s dip in 40 ppm $Cl_2$.

Figure 4:
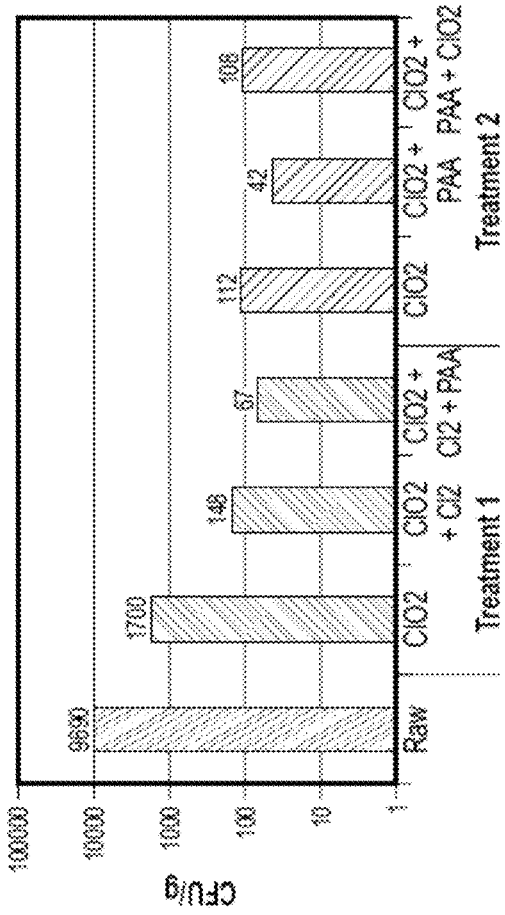
FIG. 4 is a bar graph depicting average Aerobic Plate Counts (APC) on Romaine lettuce from 2 treatments with $ClO_2$, $Cl_2$, and PAA. Treatment 1 was performed in the following order: 25 ppm $ClO_2$ for 30 s, 40 ppm $Cl_2$ for 90 s, then 80 ppm PAA for 30 s. Treatment 2 was performed in the following order: 25 ppm $ClO_2$ for 30 s, 80 ppm PAA for 90 s, then 40 ppm $Cl_2$ for 30 s.

The raw control in had an average APC of 9,690 CFU/g (FIG. 4)

For Treatment 1, the triple wash treatment after the first dip ($ClO_2$) had an average APC of 1,700 CFU/g, the triple wash treatment after the second dip ($Cl_2$) had an average APC of 148 CFU/g, and the triple wash treatment after the final dip (PAA) had an average APC of 67 CFU/g (FIG. 4).

For Treatment 2, the triple wash treatment after the first dip ($ClO_2$) had an average APC of 112 CFU/g, the triple wash treatment after the second dip (PAA) had an average APC of 42 CFU/g, and the triple wash treatment after the final dip ($Cl_2$) had an average APC of 108 CFU/g (FIG. 4).

The raw Romaine lettuce samples have very variable initial APC counts. As such, and without wishing to be bound by theory, it is believed that this high variability leads to variability in microbial load reduction after treatments. It is further believed that the variability in APC counts seen after the first dip in Treatment 1 and Treatment 2 is due to the variability in initial APC counts of raw Romaine samples.

The results indicate that triple dip order in Treatment 1 had a greater overall log reduction following the last dip (2.2 log unit reduction) than Treatment 2 following the last dip (1.88 log unit reduction).

Triple Wash Treatment of Spring Mix Lettuces

Unwashed Spring Mix after proportion mixing was used for the trial. For each treatment, samples of raw (i.e., unwashed) product (10 raw samples) and samples following final dip (6 samples per treatment) were collected and APC testing was performed.

Triple wash dips for Treatment 1 were completed as follows: a) 10 s dip in 25 ppm $ClO_2$; b) 90 s dip in 40 ppm $Cl_2$; and c) 30 s dip in 80 ppm PAA. Triple wash dips for Treatment 2 were completed as follows: a) 10 s dip in 80 ppm PAA; b) 90 s dip in 40 ppm $Cl_2$; and c) 30 s dip in 25 ppm $ClO_2$.

A triple chlorine treatment was also included as a control. For triple chlorine treatment, the dips were completed as follows: a) 1 0 s or 30 s dip in 40 ppm $Cl_2$; b) 90 s dip in 40 ppm $Cl_2$; and c) 30 s dip in 40 ppm $Cl_2$.

Figure 5:
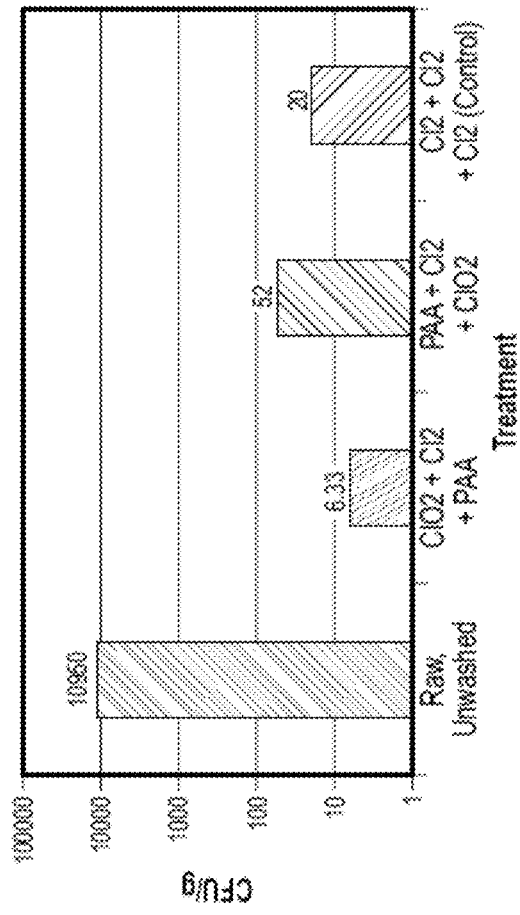
FIG. 5 is a bar graph depicting average Aerobic Plate Counts (APC) on Spring Mix lettuces from 2 treatments with $ClO_2$, $Cl_2$, and PAA. Treatment 1 was performed in the following order: 25 ppm $ClO_2$ for 10 s, 40 ppm $Cl_2$ for 90 s, then 80 ppm PAA for 30 s. Treatment 2 was performed in the following order: 80 ppm PAA for 10 s, 40 ppm $Cl_2$ for 90 s, then 25 ppm $ClO_2$ for 30 s.

As shown in FIG. 5, the raw control in had an average APC of 10,950 CFU/g.

For Treatment 1, the triple wash Treatment 1 ($ClO_2$+$Cl_2$+PAA) had an average APC of 6.33 CFU/g, and the triple wash Treatment 2 (PAA+$Cl_2$+$ClO_2$) had an average APC of 52 CFU/g (FIG. 5). The triple chlorine treatment ($Cl_2$+$Cl_2$+$Cl_2$) had an average APC of 20 CFU/g (FIG. 5).

Without wishing to be bound by theory, it is believed that the low APC count seen with the triple chlorine control treatment is due to the variability in initial APC counts of raw (unwashed) samples.

The results depicted in FIG. 5 indicate that Treatment 1 showed an extra 1 log unit reduction (3.31 log unit reduction) as compared to Treatment 2 (2.24 log unit reduction). Moreover, Treatment 1 showed an extra 0.5 log reduction as compared to the triple chlorine control (2.8 log reduction).

Triple Wash Treatment of Iceberg Lettuce

Unwashed Iceberg lettuce was used for the trial. For each treatment, 10 samples of raw (i.e., unwashed) product (raw samples) and 10 samples following triple wash treatment were collected and APC testing was performed.

Triple wash dips were completed as follows: a) 10 s dip in 25 ppm $ClO_2$; b) 90 s dip in 40 ppm $Cl_2$; and c) 30 s dip in 80 ppm PAA.

A triple chlorine treatment was also included as a control. For triple chlorine treatment, the dips were completed as follows: a) 30 s dip in 40 ppm $Cl_2$; b) 90 s dip in 40 ppm $Cl_2$; and c) 30 s dip in 40 ppm $Cl_2$.

Figure 6:
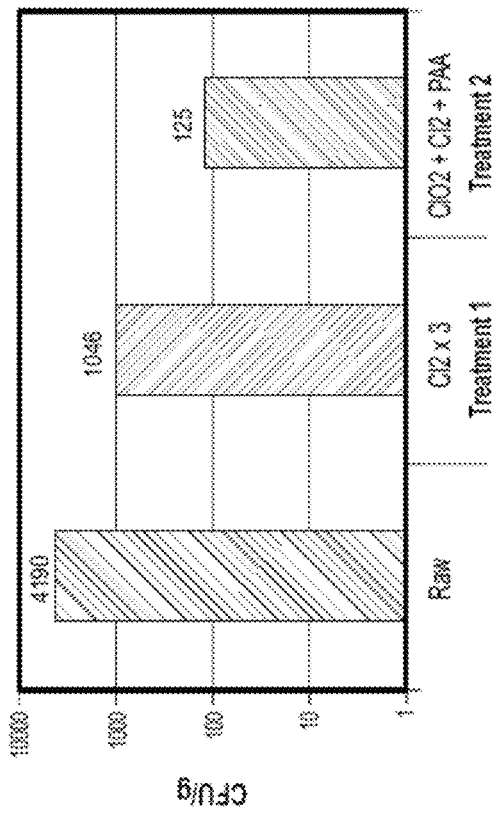
FIG. 6 is a bar graph depicting average Aerobic Plate Counts (APC) on shredded Iceberg lettuce from 2 treatments with $ClO_2$, $Cl_2$, and PAA. Treatment 1 was performed in the following order: 40 ppm $Cl_2$ for 10 s, 40 ppm $Cl_2$ for 90 s, then 40 ppm $Cl_2$ for 30 s. Treatment 2 was performed in the following order: 25 ppm $ClO_2$ for 10 s, 40 ppm $Cl_2$ for 90 s, then 80 ppm PAA for 30 s.

The results are depicted in Table 1 and FIG. 6.

TABLE 1

| Sample Treatment | APC (CFU/g) |
| --- | --- |
| Raw | 4,190 CFU/g |
| Chlorine control | 1,046 CFU/g |
| Triple wash | 125 CFU/g |

The results in Table 1 and FIG. 6 indicate that the triple wash treatment resulted in approximately an additional 1 log unit reduction in bacterial load, as compared to the triple chlorine control.

Triple Wash Treatment of Spinach

Unwashed spinach was used for the trial. For each treatment, samples of raw (i.e., unwashed) product (10 raw samples), water wash control (5 samples), processing plant control (5 samples), and samples following triple wash treatment (5 samples per treatment) were collected and APC testing was performed.

Triple wash dips were completed as follows: a) 10 s dip in 25 ppm $ClO_2$; b) 90 s dip in 40 ppm $Cl_2$; and c) 30 s dip in 80 ppm PAA.

A triple chlorine treatment was also included as a control. For triple chlorine treatment, the dips were completed as follows: a) 30 s dip in 40 ppm $Cl_2$; b) 90 s dip in 40 ppm $Cl_2$; and c) 30 s dip in 40 ppm $Cl_2$.

Figure 7:
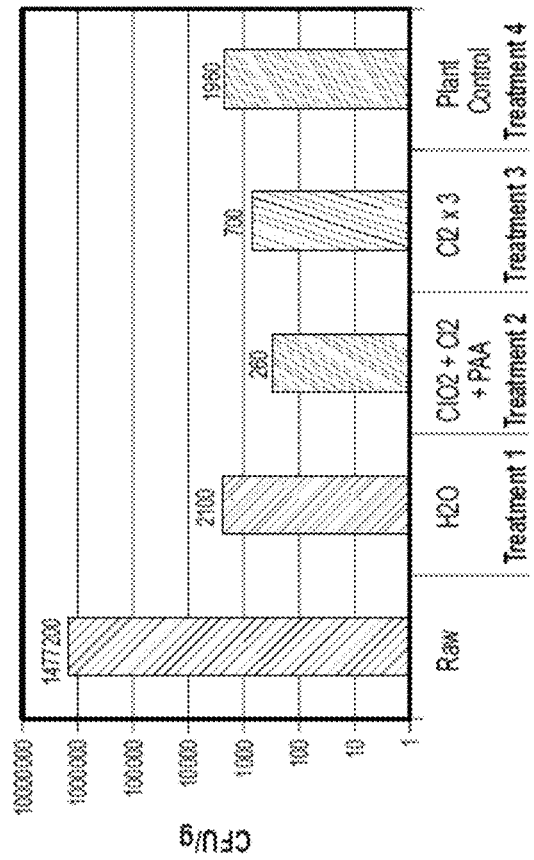
FIG. 7 is a bar graph depicting average Aerobic Plate Counts (APC) on spinach from 4 treatments with $H_2O$, $ClO_2$, $Cl_2$, and PAA. Treatment 1 was performed in the following order: $H_2O$ for 10 s, $H_2O$ for 90 s, then $H_2O$ for 30 s. Treatment 2 was performed in the following order: 25 ppm $ClO_2$ for 10 s, 40 ppm $Cl_2$ for 90 s, then 80 ppm PAA for 30 s. Treatment 3 was performed in the following order: 40 ppm $Cl_2$ for 10 s, 40 ppm $Cl_2$ for 90 s, then 40 ppm $Cl_2$ for 30 s. Treatment 4 was performed in the following order: 50 s wash with 10 ppm $Cl_2$ in a wash tank, then a final spray with 90-150 ppm $Cl_2$ for 1-3 s.

The results are depicted in Table 2 and FIG. 7.

TABLE 2

| Sample Treatment | APC (CFU/g) |
| --- | --- |
| Raw control | 1,477,200 CFU/g |
| Water wash control | 2,100 CFU/g |
| Processing plant control | 1,960 CFU/g |
| Chlorine control | 700 CFU/g |
| Triple wash | 260 CFU/g |

The results in Table 2 and FIG. 7 indicate that the triple wash treatment resulted in a significant reduction in bacterial load, as compared to the processing plant control and the water wash control.

Additionally, the triple wash treatment was better than the chlorine control in reducing bacterial load. It should be noted that raw spinach samples contain a lot of dirt. As such, and without wishing to be bound by theory, it is believed that the bacterial load reduction seen with the water wash control is due to the removal of the dirt from the spinach samples.

Analysis of Sanidate® 5.0 Solution

In the results described above, Sanidate® 5.0 was used as the commercial source of peroxyacetic acid (PAA) for the triple wash treatments. However, Sanidate® 5.0 contains approximately 23% of hydrogen peroxide ($H_2O_2$), while only containing approximately 5.25% of PAA. Accordingly, $H_2O_2$ at 350 ppm, a concentration corresponding to the 23% present in Sanidate® 5.0, was tested to determine whether the $H_2O_2$ contributes to the microbial load reduction seen with the triple wash treatment.

Unwashed Romaine lettuce was used for the trial. Samples of raw (i.e., unwashed) lettuce and samples following each wash treatment were collected and APC testing was performed. The treatments included a chlorine triple dip control ($Cl_2$), a Sanidate® 5.0 triple dip treatment, and a hydrogen peroxide ($H_2O_2$) triple dip treatment. The first dip lasted 10 seconds, the second dip lasted 90 seconds, and the third dip lasted 30 seconds.

Figure 8:
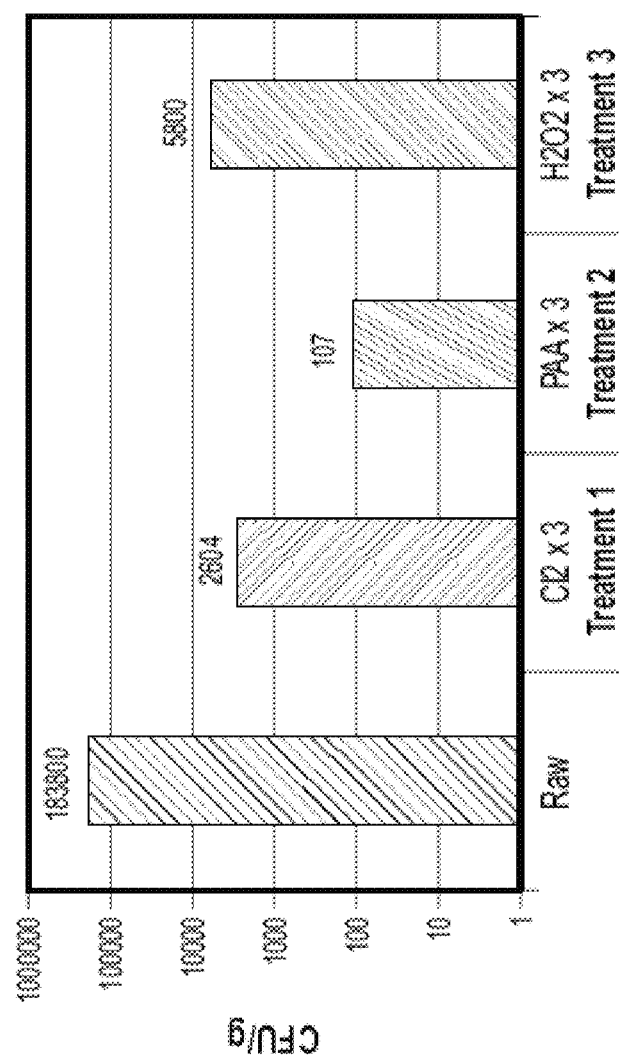
FIG. 8 is a bar graph depicting average Aerobic Plate Counts (APC) on Romaine lettuce from 3 treatments with $Cl_2$, $H_2O_2$, and Sanidate® 5.0 (5.25% PAA). Treatment 1 was performed in the following order: 40 ppm $Cl_2$ for 10 s, 40 ppm $Cl_2$ for 90 s, then 40 ppm $Cl_2$ for 30 s. Treatment 2 was performed in the following order: 80 ppm PAA for 10 s, 80 ppm PAA for 90 s, then 80 ppm PAA for 30 s. Treatment 3 was performed in the following order: 23% $H_2O_2$ solution for 10 s, 23% $H_2O_2$ solution for 90 s, and then 23% $H_2O_2$ solution for 30 s.

The results are depicted in Table 3 and FIG. 8.

TABLE 3

| Sample Treatment | APC (CFU/g) |
| --- | --- |
| Raw control | 183,800 CFU/g |
| $Cl_2$ control | 2,604 CFU/g |
| Sanidate ® 5.0 (PAA) | 107 CFU/g |
| $H_2O_2$ | 5,800 CFU/g |

The results in Table 3 and FIG. 8 indicate that the hydrogen peroxide does not contribute significantly to the bacterial load reduction effects of Sanidate® 5.0, as the hydrogen peroxide only reduced the bacterial load (5,800 CFU/g) to level comparable to that of the chlorine control (2,604 CFU/g). However, the Sanidate® 5.0 (PAA) reduced the bacterial load to 107.2 CFU/g, which is approximately an additional 1 log unit reduction in bacterial load as compared to the hydrogen peroxide.

Conclusions

The above results show that the triple wash treatment yields total APC counts after treatment of lettuce and spinach that were in the low hundreds, and often lower than 100 CFU/g. This is a significant result, as it is unheard of that sanitizing treatments utilized in fresh produce processing plants yield such low total APC counts after treatment.

It should be noted that the raw lettuce and spinach that were used as controls were very variable in the amount of soil contamination and resulting bacterial load. This resulted in the raw controls having very variable initial APC counts. As such, and without wishing to be bound by theory, it is believed that this high variability leads to variability in microbial load reduction after treatments. However, the results show that despite these difficulties, it is clear that the triple wash treatment results in a significant reduction in total APC counts after treatment.

Moreover, the results also show that the triple wash treatment with $ClO_2$, $Cl_2$, and PAA yields up to a 3-4 log unit reduction in microbial load of lettuce and spinach. This is in contrast to previous results showing that treatment with $ClO_2$ alone yields a 2-2.5 log unit reduction in microbial load, treatment with $Cl_2$ alone yields a 1.5-2.5 log unit reduction in microbial load, and treatment with PAA yields a 2-2.5 log unit reduction in microbial load. While it has been shown that PAA can yield a 2-2.5 log reduction in microbial load, this has only been shown in combination with lactic acid using a stomacher process to gently massage lettuce samples in solution prior to determining the microbial count of the resulting solution. It is believed that the bacteria will be massaged off the lettuce and into the solution. However, in the case of lactic acid, it appears that treating with lactic acid strips the cuticle layer off the lettuce leaf, which allows bacteria to stick to the leaves. It is thus believed that if more bacteria are sticking to the leaves, then less are massaged into the solution from the stomaching process. This results in false low microbial counts that are not truly representative of the microbial load present on the lettuce. Moreover, treatment with a combination of $ClO_2$ and $Cl_2$, yields a 1.5-2.5 log unit reduction in microbial load, a combination of $ClO_2$ and PAA yields a 2-2.5 log unit reduction in microbial load, and a combination of PAA and $Cl_2$ yields approximately a 3 log unit reduction in microbial load.

Based on these previous results, it is clear that the triple wash treatment utilizing $ClO_2$, $Cl_2$, and PAA in a sequential and unique order yields a synergistic reduction in microbial load.

It is also noted that the use of $ClO_2$, $Cl_2$, and PAA is approved for use with certified organic produce, as such the triple wash treatment can also be used to sanitize organic produce.

Example 2: Efficacy of Triple Wash Treatment for Sanitizing Leafy Greens Inoculated with Pathogenic Bacteria Introduction The following Example demonstrates the efficacy of a triple wash treatment utilizing a chlorine dioxide ($ClO_2$) solution, a chlorine solution ($Cl_2$), and a peroxyacetic acid solution (PAA) in reducing microbial load in leafy vegetables inoculated with *E. coli*, *Salmonella* and *Listeria*, common pathogenic contaminants.

Materials and Methods

Log Reduction Analysis of Background Bacteria

Commodity lettuce (FIG. 9A), such as Romaine lettuce (i.e., product that has not been subjected to a sanitization treatment and/or bagged under modified atmospheric packaging), was used for each trial, and stored at 4° C. until analyzed.

Any leaves that had visible damage were discarded. For the lettuce (FIG. 9A), the midrib of the leaf was removed (FIG. 9B). This was done to ensure the same leaf tissue was used to reduce the variability between samples. The leaves were then cut into 2.5×1.5 inch pieces using a sterile razor blade.

For each trial a total of 5 replicates were used. After exposing the leaf samples to a given treatment, the samples were immediately placed in 100 ml of sterile 0.1M phosphate buffer, pH 7.0 to neutralize any residual sanitizer.

A no treatment control sample was also performed where the samples were treated exactly the same as the treatment samples, except that they were not exposed to any of the sanitizers. For each trial 5 replicates of the no treatment controls were used. These controls were used to calculate the average log unit reduction of the sanitization treatments.

Each sample was then blended for 2 minutes using a blender. Between each sample, the blending jars were washed with 95% ethanol and rinsed with sterile water. A blender that has blending jars for smaller volumes (such as for smoothies) works well for this application.

The samples are then serially diluted and plated on appropriate media, such as LB or Total Plate Count Agar, and then incubated as required.

The average (i.e., mean) CFU/ml, together with the standard error of the mean, was then calculated for each treatment and no treatment control sample. The mean log unit reduction values were then calculated by dividing the mean for the no treatment control by the mean value for each treatment and taking the log 10 of the result. Standard errors for the log reduction values were calculated using propagation of error formulas.

Bacteria

Cultures of *E. coli* O157:H7, sv. *Typhimurium*, and *Listeria monocytogenes* were grown overnight at 37° C. The growth media was removed by washing the cultures 3 times and resuspending the final pellet in an equal volume of phosphate-buffered saline (PBS) at pH 7.0.

Overnight cultures of *E. coli* O157:H7, sv. *Typhimurium*, and *Listeria monocytogenes* were grown from freezer stocks (glycerol or DMSO) in 20 ml of Luria Bertani broth (LB growing medium) with shaking at 150 rpm at 37° C.

The cultures were then centrifuged for 6 minutes at 3,000 rpm. The supernatant was then removed from the tubes and each pellet was resuspended in 20 ml (equal volume) of 0.1 M phosphate buffer, pH 7.0. This step was then repeated 2 times for a total of 3 wash steps to remove all growing medium from the culture.

Triple Wash Solution Preparation and Dipping Procedure

The 25 ppm $ClO_2$, 40 ppm $Cl_2$, and 80 ppm PAA triple wash solutions at the listed target concentrations were prepared as described in Example 1 above. Citric acid was used to adjust the pH of the $Cl_2$ solution. The triple wash dipping procedure was performed as described in Example 1 above.

Analysis of Inoculation with Human Bacterial Pathogens

Leaf samples were then prepared as described above. The leaf pieces were inoculated by spotting 200 μL of the washed culture on the surface of the leaf section. Each inoculum contained approximately $1\times10^6$ bacteria. The inoculation was repeated for 5 leaf sections (5 replicated for each treatment). The leaves were then incubated for 1.5 hours at 24° C. in an incubator containing Drierite™. Initially, the top surface of 3 leaves and bottom surface of 2 leaves was spotted to determine whether there were differences in efficacy of each treatment between leaf surfaces. Once it was determined that no differences were observed, only the top surface of leaf samples was subsequently used.

After inoculation, each leaf sample was treated with the triple wash treatment ($ClO_2$, $Cl_2$, and PAA) and control treatments.

Following each treatment, the leaf samples were sampled and the average log unit reduction was calculated for each sample.

Results

Efficacy of Triple Wash Treatment with Romaine Lettuce at Room Temperature

Triple wash treatment was performed at room temperature (75° F.) with fresh Romaine lettuce samples that were inoculated with each of *E. coli* O157:H7, sv. *Typhimurium*, and *Listeria monocytogenes*. The triple wash dips were completed as follows: a) 10 s dip in 25 ppm $ClO_2$; b) 90 s dip in 40 ppm $Cl_2$; and c) 30 s dip in 80 ppm PAA. The background microbial load (LB load), as well as that of *E. coli* O157:H7, sv. *Typhimurium*, and *Listeria monocytogenes* was calculated after treatment.

The results are summarized in Tables 4-6.

TABLE 4

| Sample Treatment | Avg. *E. coli* Load | Std. Dev. of *E. coli* Load | Avg. LB Load | Std. Dev. of LB |
|---|---|---|---|---|
| No treatment | $1.76 \times 10^6$ | $1.95 \times 10^5$ | $2.30 \times 10^6$ | $3.54 \times 10^5$ |
| Triple wash | $1.14 \times 10^3$ | $1.72 \times 10^3$ | $1.27 \times 10^3$ | $1.72 \times 10^3$ |

The results in Table 4 indicate that the triple dip treatment resulted in a 3.19 log unit reduction in *E. coli* O157:H7 load. The triple wash treatment also resulted in a 3.26 log unit reduction in the background bacterial load (LB load).

TABLE 5

| Sample Treatment | Avg. *Salmonella* Load | Std. Dev. of *Salmonella* Load | Avg. LB Load | Std. Dev. of LB |
|---|---|---|---|---|
| No treatment | $2.68 \times 10^6$ | $2.86 \times 10^5$ | $3.52 \times 10^6$ | $1.92 \times 10^5$ |
| Triple wash | $6.27 \times 10^3$ | $1.16 \times 10^4$ | $6.38 \times 10^3$ | $1.16 \times 10^4$ |

The results in Table 5 indicate that the triple dip treatment resulted in a 2.63 log unit reduction in sv. *Typhimurium* load. The triple wash treatment also resulted in a 2.74 log unit reduction in the background bacterial load (LB load).

TABLE 6

| Sample Treatment | Avg. *Listeria* Load | Std. Dev. of *Listeria* Load | Avg. LB Load | Std. Dev. of LB |
|---|---|---|---|---|
| No treatment | $1.56 \times 10^5$ | $4.93 \times 10^4$ | $2.28 \times 10^6$ | $2.05 \times 10^5$ |
| Triple wash | $6.40 \times 10^2$ | $1.32 \times 10^3$ | $8.72 \times 10^3$ | $1.75 \times 10^4$ |

The results in Table 6 indicate that the triple dip treatment resulted in a 2.39 log unit reduction in *Listeria monocytogenes* load. The triple wash treatment also resulted in a 2.42 log unit reduction in the background bacterial load (LB load).

Efficacy of Triple Wash Treatment with Romaine Lettuce at Cold Temperature

Triple wash treatment was performed at 35° F. with fresh Romaine lettuce samples that were inoculated with each of *E. coli* O157:H7, sv. *Typhimurium*, and *Listeria monocytogenes*. The triple wash dips were completed as follows: a) 10 s dip in 25 ppm $ClO_2$; b) 90 s dip in 40 ppm $Cl_2$; and c) 30 s dip in 80 ppm PAA. The background microbial load (LB load), as well as that of *E. coli* O157:H7, sv. *Typhimurium*, and *Listeria monocytogenes* was calculated after treatment.

The results are summarized in Tables 7-9.

TABLE 7

| Sample Treatment | Avg. *E. coli* Load | Std. Dev. of *E. coli* Load | Avg. LB Load | Std. Dev. of LB |
|---|---|---|---|---|
| No treatment | $2.30 \times 10^6$ | $2.83 \times 10^5$ | $3.86 \times 10^6$ | $1.21 \times 10^5$ |
| Triple wash | $9.66 \times 10^2$ | $1.66 \times 10^3$ | $1.22 \times 10^3$ | $1.57 \times 10^3$ |

The results in Table 7 indicate that the triple dip treatment resulted in a 3.38 log unit reduction in *E. coli* O157:1-17 load. The triple wash treatment also resulted in a 3.50 log unit reduction in the background bacterial load (LB load).

TABLE 8

| Sample Treatment | Avg. *Salmonella* Load | Std. Dev. of *Salmonella* Load | Avg. LB Load | Std. Dev. of LB |
|---|---|---|---|---|
| No treatment | $4.24 \times 10^6$ | $3.85 \times 10^5$ | $5.36 \times 10^6$ | $1.71 \times 10^6$ |
| Triple wash | $2.08 \times 10^3$ | $2.66 \times 10^3$ | $1.18 \times 10^4$ | $2.21 \times 10^4$ |

The results in Table 8 indicate that the triple dip treatment resulted in a 3.31 log unit reduction in sv. *Typhimurium* load. The triple wash treatment also resulted in a 2.66 log unit reduction in the background bacterial load (LB load).

TABLE 9

| Sample Treatment | Avg. *Listeria* Load | Std. Dev. of *Listeria* Load | Avg. LB Load | Std. Dev. of LB |
|---|---|---|---|---|
| No treatment | $3.70 \times 10^5$ | $2.43 \times 10^5$ | $2.60 \times 10^6$ | $4.30 \times 10^5$ |
| Triple wash | $1.46 \times 10^2$ | $1.48 \times 10^2$ | $1.75 \times 10^3$ | $2.00 \times 10^3$ |

The results in Table 9 indicate that the triple dip treatment resulted in a 3.40 log unit reduction in *Listeria monocytogenes* load. The triple wash treatment also resulted in a 3.17 log unit reduction in the background bacterial load (LB load).

Efficacy of Triple Wash Treatment with Romaine Lettuce Inoculated with a Mixed Culture Fresh Romaine lettuce samples were inoculated with a mixture of *E. coli* O157:H7, sv. *Typhimurium*, and *Listeria monocytogenes*. The inoculated lettuce was then treated with the triple wash treatment at 35° F. The triple wash dips were completed as follows: a) 10 s dip in 25 ppm $ClO_2$; b) 90 s dip in 40 ppm $Cl_2$; and c) 30 s dip in 80 ppm PAA. The background microbial load (LB load), as well as that of *E. coli* O157:H7, sv. *Typhimurium*, and *Listeria monocytogenes* was calculated after treatment.

The results are summarized in Tables 10-13.

TABLE 10

| Sample Treatment | Avg. *E. coli* Load | Std. Dev. of *E. coli* Load |
|---|---|---|
| No treatment | $9.74 \times 10^5$ | $4.29 \times 10^5$ |
| Triple wash | $8.00 \times 10^1$ | $1.57 \times 10^2$ |

The results in Table 10 indicate that the triple dip treatment resulted in a 4.09 log unit reduction in *E. coli* O157:H7 load.

TABLE 11

| Sample Treatment | Avg. *Salmonella* Load | Std. Dev. of *Salmonella* Load |
|---|---|---|
| No treatment | $1.52 \times 10^6$ | $2.49 \times 10^5$ |
| Triple wash | $5.60 \times 10^1$ | $1.20 \times 10^2$ |

The results in Table 11 indicate that the triple dip treatment resulted in a 4.43 log unit reduction in sv. *Typhimurium* load.

TABLE 12

| Sample Treatment | Avg. *Listeria* Load | Std. Dev. of *Listeria* Load |
|---|---|---|
| No treatment | $1.300 \times 10^5$ | $3.54 \times 10^4$ |
| Triple wash | $6.00 \times 10^0$ | $1.34 \times 10^1$ |

The results in Table 12 indicate that the triple dip treatment resulted in a 4.34 log unit reduction in *Listeria monocytogenes* load.

TABLE 13

| Sample Treatment | Avg. LB Load | Std. Dev. of LB Load |
|---|---|---|
| No treatment | $2.88 \times 10^6$ | $2.68 \times 10^5$ |
| Triple wash | $1.74 \times 10^2$ | $1.85 \times 10^2$ |

The results in Table 13 indicate that the triple dip treatment resulted in a 4.22 log unit reduction in the background bacterial load (LB load).

Efficacy of Triple Wash Treatment for Reducing *Listeria* Load

Fresh Romaine lettuce samples were inoculated with *Listeria*, and then treated with the triple wash treatment. The triple wash dips were completed as follows: a) 10 s dip in 25 ppm $ClO_2$; b) 90 s dip in 40 ppm $Cl_2$; and c) 30 s dip in 80 ppm PAA. The average bacterial load in log units was calculated after triple wash treatment. Additionally, the *Listeria* load as a percentage of the total bacterial load was calculated after triple wash treatment, or after each dip of the triple wash treatment.

The results are depicted in Table 14.

TABLE 14

| Sample Treatment | Avg. Bacterial Load | Listeria Load (%) |
| --- | --- | --- |
| No treatment | 1.25 | 2.5% |
| Triple wash | 0.1 | 0.0% |

As shown in Table 14, the triple wash treatment resulted in a significant decrease in bacterial load, and the complete elimination of Listeria.

Efficacy of Triple Wash Treatment Dip Order for Reducing Listeria Load

Fresh Romaine lettuce samples were inoculated with Listeria, and then treated with the triple wash treatment. For Treatment 1, the triple wash dips were completed as follows: a) 10 s dip in 25 ppm $ClO_2$; b) 90 s dip in 40 ppm $Cl_2$; and c) 30 s dip in 80 ppm PAA.

For Treatment 2, the triple wash dips were completed as follows: a) 10 s dip in 25 ppm $ClO_2$; b) 90 s dip in 80 ppm PAA; and c) 30 s dip in in 40 ppm $Cl_2$.

The average bacterial load in log units was calculated after triple wash treatment, or after each dip of the triple wash treatment. Additionally, the Listeria load as a percentage of the total bacterial load was calculated after triple wash treatment, or after each dip of the triple wash treatment.

The results are depicted in Tables 15 and 16.

TABLE 15

| Treatment 1 | Avg. Bacterial Load | Listeria Load (%) |
| --- | --- | --- |
| No treatment | 4.81 | 16.33% |
| ClO2 dip | 1.56 | 2.87% |
| ClO2 + Cl2 dip | 0.65 | 0.82% |
| Triple dip | 0.35 | 0.65% |

TABLE 16

| Treatment 2 | Avg. Bacterial Load | Listeria Load (%) |
| --- | --- | --- |
| No treatment | 4.81 | 16.33% |
| ClO2 dip | 2.41 | 4.29% |
| ClO2 + PAA dip | 0.33 | 7.53% |
| Triple dip | 0.08 | 0.51% |

As shown in Tables 15 and 16, the triple Treatments 1 and 2 resulted in a significant reduction in bacterial load, and almost complete elimination of Listeria. The results also indicate that addition of each sanitizer solution in the triple wash treatment results in a synergistic decrease in bacterial load, as the bacterial load decreased after each dip for both Treatment 1 and Treatment 2.

Example 3: Efficacy of Triple Wash Treatment for Sanitizing Leafy Greens Under Commercial Processing Conditions Introduction The following Example demonstrates the efficacy of a triple wash treatment utilizing a chlorine dioxide ($ClO_2$) solution, a chlorine solution ($Cl_2$), and a peroxyacetic acid solution (PAA) in sanitizing (i.e., reducing microbial load) in lettuce using a processing wash line under commercial processing plant conditions.

Materials and Methods

Processing Apparatus

Figure 10:
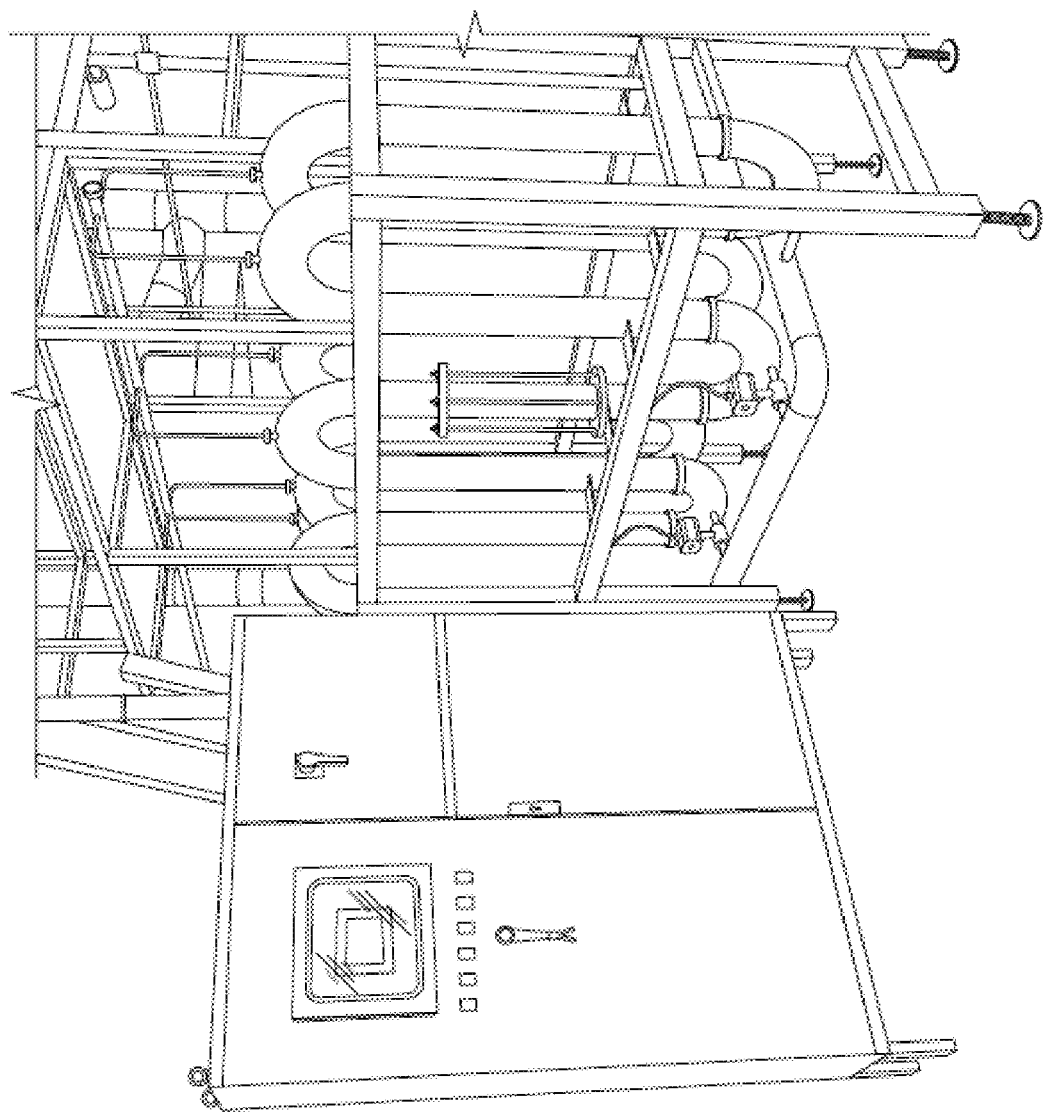
FIG. 10 depicts a sanitizing treatment apparatus.

Chopped Romaine lettuce was processed and treated with the triple wash treatment using a similar apparatus as to that shown in FIG. 10.

The apparatus has the ability to completely submerge the chopped lettuce for overall and uniform treatment exposure, and to convey the lettuce with precise time of treatment. Residence time in the apparatus was controlled by controlling the speed of the water pump motor that is responsible for conveying the water and submerged product through the device. The apparatus has an inlet hopper where the lettuce was fed into via a belt conveyor. Sanitizing water enters the hopper along with the product. At the end of the apparatus, lettuce submerged in water exited onto a perforated belt, which allowed the water to go through and collect in a catch tank, while conveying the dewatered lettuce into a bin. Sanitizing solutions (i.e., $ClO_2$, $Cl_2$, and PAA) were injected into the apparatus just below the inlet hopper.

Lettuce Preparation

Cooled Whole Head Romaine after trimming and cutting was chopped and then fed continuously into the apparatus at a feed rate of approximately 1000 lbs/hr.

Triple Wash Solution Preparation and Treatment Procedure

The triple wash treatment solutions were chlorine dioxide ($ClO_2$), chlorine ($Cl_2$), and peroxyacetic acid (PAA). The $Cl_2$ and PAA solutions were prepared as described in Example 1 above. Citric acid concentrate was used to adjust pH of the chlorinated wash to the desired range. The chlorine dioxide solution was produced using a 3 chemical on site generation system. This solution was prepared by diluting concentrate solutions of $ClO_2$. The concentrate solutions of $ClO_2$ were generated using a 3 chemical $ClO_2$ generator. Sodium chlorite, hydrochloric acid, and sodium hypochlorous acid were used to generate the concentrate solutions of $ClO_2$. The AquaPulse Systems APS-3T-30 was used to generate 2000-6000 ppm concentrate $ClO_2$ solution. The $ClO_2$ concentration of the final working solution was confirmed using an HACH Spectrophotomer DR 2800 (program 76).

For the triple wash treatment, each washing step was conducted individually in the same apparatus in sequence. After each washing step, the remaining wash water in the treatment apparatus and the collection wash tank was changed and refilled with the sanitizer solutions required for the next step.

The three sequential sanitizing treatments provided were: 1) $ClO_2$+$Cl_2$ solutions for 30 seconds; 2) $Cl_2$+$ClO_2$ solutions for 30 seconds; and 3) PAA for 30 seconds.

The individual concentrations for each solution were monitored during the run and are listed in Table 17.

TABLE 17

| Treatment 1, 30 sec. | Treatment 2, 30 sec. | Treatment 3, 30 sec. |
| --- | --- | --- |
| Chlorine dioxide<br>Average = 5.27 ppm<br>Range = 3-7 ppm | Chlorine (total free chlorine)<br>Average = 30.8 ppm<br>Range = 15-50 ppm<br>pH < 6.8 | PAA<br>Average = 38 ppm<br>Range = 20-60 ppm |
| Chlorine<br>(total free chlorine)<br>Average = 30.8 ppm<br>Range = 15-50 ppm<br>pH < 6.8 | Chlorine dioxide<br>Average = 5.27 ppm<br>Range = 3-7 ppm | |

In Table 17, Treatment 1 corresponds to $ClO_2+Cl_2$ solutions for 30 seconds; Treatment 2 corresponds to $Cl_2+ClO_2$ solutions for 30 seconds; and Treatment 3 corresponds to PAA for 30 seconds. Chlorine concentration is given as concentration of total free chlorine.

A processing plant control utilizing a three step chlorinated wash system was also used as a processing plant control.

Microbial Load Analysis

Microbial load analysis was performed for lettuce samples both before and after each wash treatment step. Microbial load analysis was performed by APC testing as described in Example 1 above.

The control used for microbial load reduction comparison was raw (i.e., unwashed) chopped Romaine lettuce that was obtained from the manufacturing plant on the day of treatment on an existing wash line, with samples taken before and after the existing washing/sanitizing steps. The control lettuce was from the same batch of raw material as used in this trial.

Results

Figure 11:
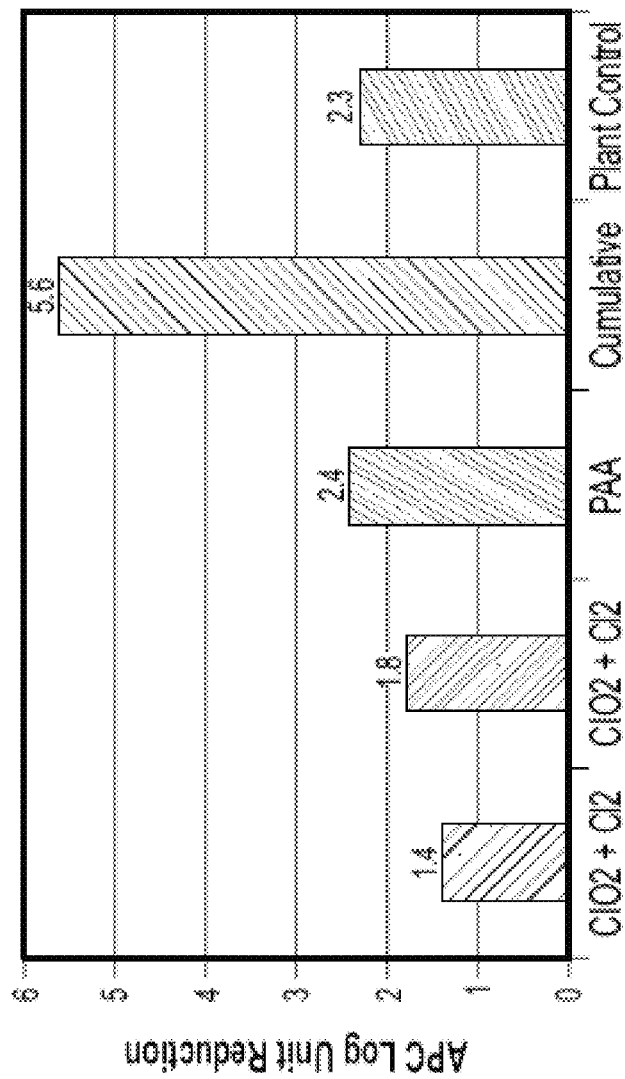
FIG. 11 is a bar graph depicting average Aerobic Plate Count (APC) log unit reduction on chopped Romaine lettuce from a triple wash system. The triple wash system includes 3 wash treatments. Treatment 1 includes washing with $ClO_2$ and $Cl_2$, Treatment 2 includes washing with $ClO_2$ and $Cl_2$, and Treatment 3 includes washing with PAA. The "Plant Control" refers to a Trim Line 7: $Cl_2$ control.

FIG. 11 depicts the results from a trial with lettuce samples processed through a processing wash line. In particular, FIG. 11 shows the average log unit reduction in microbial load associated with each wash step and a cumulative representation from all 3 steps, as compared to the raw control.

The results indicate that the processing plant control (Plant Control) yielded a 2.3 log unit reduction in microbial load from the unwashed to washed lettuce (FIG. 11). However, the triple wash treatment yielded a cumulative 5.6 log unit reduction in microbial load from the unwashed to the final washed lettuce (FIG. 11). The results show that the triple wash treatment results in an additional 3 log unit reduction in microbial load as compared to the plant control treatment. This indicates that the triple wash treatment is significantly more effective than the triple chlorine treatment of the plant processing control.

Additionally, the results in FIG. 11 show that the Treatment 1 wash ($ClO_2+Cl_2$) yields a 1.4 log unit reduction in microbial load, that the Treatment 2 wash ($Cl_2+ClO_2$) yields a 1.8 log unit reduction in microbial load; and that the Treatment 3 wash (PAA) yields a 2.4 log unit reduction in microbial load. These results represent microbial load reductions after each individual step. It should be noted Treatment 1 and Treatment 2 represent a mixture of chlorine dioxide (ClO2) and chlorine ($Cl_2$).

The results from FIG. 11 also demonstrate that the sanitizers $ClO_2$, $Cl_2$, and PAA act synergistically to yield a log unit reduction in microbial load that is significantly better than that seen with the triple chlorine treatment.

Example 4: Effects of Temperature and Treatment Duration on Sanitizer Efficacy Against Pathogenic Bacterial Suspensions Introduction The following Example demonstrates the temperatures at which chlorine and chlorine dioxide sanitizer treatments effectively reduce the microbial load of pathogenic bacterial suspensions. The Example also demonstrates the effects treatment duration on reducing the microbial load of pathogenic bacterial suspensions.

Materials and Methods

Suspension Tests

Cultures of *E. coli* O157:H7, sv. *Typhimurium*, and *Listeria monocytogenes* were grown overnight at 37° C. with shaking at 150 rpm from 7% dimethyl sulfoxide freezer stocks stored at −80° C. The growing media (Luria Bertani broth for *E. coli* and *Salmonella*; brain heart infusion broth for *Listeria*) was removed by washing the cultures 3 times at 3,000 rpm and resuspending the final pellet in an equal volume of 0.1 M phosphate buffer, pH 7.0. The mixed culture was prepared by adding equal volumes of each strain and vortexed to ensure mixing. For the suspension tests, 0.1 ml of the mixed culture was added to 0.9 ml of the treatment solution at the appropriate concentration and temperature. Controls were performed for each culture by adding 0.9 ml of water instead of the sanitizer. After 30 or 90 seconds of contact, 0.1 ml of the sanitizer/bacteria mixture was removed and immediately diluted 100-fold in 0.1 M phosphate buffer, pH 7.0 (this neutralizes the disinfectant). The samples were serially diluted and plated on selective agars to enumerate each bacterial species and a non-selective agar to enumerate total load of a mixed culture of all species. All of the suspension tests were carried out using a total of 5 replicates. Disinfectant activity was determined for each treatment by comparing the growth on the control and treatment plates and calculating the average log reduction in CFU/ml and percentage of bacteria killed by disinfectant.

Results

TABLE 18

Suspension tests conducted for 30 seconds at 4° C.

| | | Bacteria | | | |
|---|---|---|---|---|---|
| Treatment | Measurement | Non-selective mix | *E. coli* O157:H7 | *Salmonella* | *Listeria monocytogenes* |
| Water | Average | $1.00 \times 10^7$ | $5.72 \times 10^6$ | $5.32 \times 10^6$ | $4.96 \times 10^5$ |
| | Standard Deviation | $1.54 \times 10^6$ | $4.85 \times 10^5$ | $6.52 \times 10^5$ | $3.03 \times 10^5$ |
| Chlorine (40 ppm, pH 6.0) | Average | $3.25 \times 10^3$ | 0.00 | 0.00 | 0.00 |
| | Standard Deviation | $4.12 \times 10^3$ | 0.00 | 0.00 | 0.00 |
| | Average log reduction | 3.49 | * | * | * |
| | % bacteria killed | 99.968% | 100% | 100% | 100% |

TABLE 18-continued

Suspension tests conducted for 30 seconds at 4° C.

| | | Bacteria | | | |
|---|---|---|---|---|---|
| Treatment | Measurement | Non-selective mix | E. coli O157:H7 | Salmonella | Listeria monocytogenes |
| Chlorine dioxide (10 ppm) | Average | 0.00 | 0.00 | 0.00 | 0.00 |
| | Standard Deviation | 0.00 | 0.00 | 0.00 | 0.00 |
| | Average log reduction | * | * | * | * |
| | % bacteria killed | 100% | 100% | 100% | 100% |

* indicates a sample in which no bacteria grew, so no fold reduction may be calculated.

TABLE 19

Suspension tests conducted for 90 seconds at 4° C.

| | | Bacteria | | | |
|---|---|---|---|---|---|
| Treatment | Measurement | Non-selective mix | E. coli O157:H7 | Salmonella | Listeria monocytogenes |
| Water | Average | $6.22 \times 10^6$ | $3.96 \times 10^6$ | $1.57 \times 10^6$ | $2.06 \times 10^5$ |
| | Standard Deviation | $1.10 \times 10^6$ | $6.44 \times 10^5$ | $1.13 \times 10^6$ | $3.38 \times 10^4$ |
| Chlorine (40 ppm, pH 6.0) | Average | $2.50 \times 10^2$ | 0.00 | 0.00 | 0.00 |
| | Standard Deviation | $3.94 \times 10^2$ | 0.00 | 0.00 | 0.00 |
| | Average log reduction | 4.40 | * | * | * |
| | % bacteria killed | 99.996% | 100% | 100% | 100% |
| Chlorine dioxide (10 ppm) | Average | $2.00 \times 10^0$ | 0.00 | 0.00 | 0.00 |
| | Standard Deviation | $4.47 \times 10^0$ | 0.00 | 0.00 | 0.00 |
| | Average log reduction | 6.49 | * | * | * |
| | % bacteria killed | 99.99997% | 100% | 100% | 100% |

* indicates a sample in which no bacteria grew, so no fold reduction may be calculated.

TABLE 20

Suspension tests conducted for 30 seconds at 15° C.

| | | Bacteria | | | |
|---|---|---|---|---|---|
| Treatment | Measurement | Non-selective mix | E. coli O157:H7 | Salmonella | Listeria monocytogenes |
| Water | Average | $8.46 \times 10^6$ | $5.96 \times 10^6$ | $2.70 \times 10^6$ | $2.24 \times 10^6$ |
| | Standard Deviation | $1.69 \times 10^6$ | $8.14 \times 10^5$ | $8.99 \times 10^5$ | $4.08 \times 10^5$ |
| Chlorine (40 ppm, pH 6.0) | Average | $4.00 \times 10^0$ | 0.00 | 0.00 | 0.00 |
| | Standard Deviation | $8.94 \times 10^0$ | 0.00 | 0.00 | 0.00 |
| | Average log reduction | 6.33 | * | * | * |
| | % bacteria killed | 99.99995% | 100% | 100% | 100% |
| Chlorine dioxide (10 ppm) | Average | 0.00 | 0.00 | 0.00 | 0.00 |
| | Standard Deviation | 0.00 | 0.00 | 0.00 | 0.00 |
| | Average log reduction | * | * | * | * |
| | % bacteria killed | 100% | 100% | 100% | 100% |

* indicates a sample in which no bacteria grew, so no fold reduction may be calculated.

TABLE 21

Suspension tests conducted for 90 seconds at 15° C.

| | | Bacteria | | | |
|---|---|---|---|---|---|
| Treatment | Measurement | Non-selective mix | E. coli O157:H7 | Salmonella | Listeria monocytogenes |
| Water | Average | $1.21 \times 10^7$ | $5.74 \times 10^6$ | $4.54 \times 10^6$ | $7.14 \times 10^4$ |
| | Standard Deviation | $2.30 \times 10^6$ | $5.43 \times 10^5$ | $5.54 \times 10^5$ | $6.43 \times 10^4$ |
| Chlorine (40 ppm, pH 6.0) | Average | $8.00 \times 10^0$ | 0.00 | 0.00 | $2.00 \times 10^0$ |
| | Standard Deviation | $1.79 \times 10^1$ | 0.00 | 0.00 | $4.47 \times 10^0$ |
| | Average log reduction | 6.18 | * | * | 4.55 |
| | % bacteria killed | 99.99993% | 100% | 100% | 99.997% |
| Chlorine dioxide (10 ppm) | Average | $2.00 \times 10^1$ | 0.00 | 0.00 | 0.00 |
| | Standard Deviation | $4.47 \times 10^1$ | 0.00 | 0.00 | 0.00 |
| | Average log reduction | 5.78 | * | * | * |
| | % bacteria killed | 99.9998% | 100% | 100% | 100% |

* indicates a sample in which no bacteria grew, so no fold reduction may be calculated.

TABLE 22

Suspension tests conducted for 30 seconds at 40° C.

| | | Bacteria | | | |
|---|---|---|---|---|---|
| Treatment | Measurement | Non-selective mix | E. coli O157:H7 | Salmonella | Listeria monocytogenes |
| Water | Average | $8.30 \times 10^6$ | $3.22 \times 10^6$ | $4.36 \times 10^6$ | $2.32 \times 10^6$ |
| | Standard Deviation | $4.64 \times 10^5$ | $2.79 \times 10^5$ | $3.14 \times 10^5$ | $6.05 \times 10^5$ |
| Chlorine (40 ppm, pH 6.0) | Average | $2.00 \times 10^0$ | 0.00 | 0.00 | 0.00 |
| | Standard Deviation | $4.47 \times 10^0$ | 0.00 | 0.00 | 0.00 |
| | Average log reduction | 6.62 | * | * | * |
| | % bacteria killed | 99.99998% | 100% | 100% | 100% |
| Chlorine dioxide (10 ppm) | Average | $1.00 \times 10^2$ | $2.20 \times 10^1$ | $2.20 \times 10^1$ | $2.00 \times 10^0$ |
| | Standard Deviation | $6.16 \times 10^1$ | $4.38 \times 10^1$ | $4.38 \times 10^1$ | $4.47 \times 10^0$ |
| | Average log reduction | 4.92 | 5.17 | 5.30 | 6.06 |
| | % bacteria killed | 99.9988% | 99.9993% | 99.9995% | 99.9999% |

* indicates a sample in which no bacteria grew, so no fold reduction may be calculated.

TABLE 23

Suspension tests conducted for 90 seconds at 40° C.

| | | Bacteria | | | |
|---|---|---|---|---|---|
| Treatment | Measurement | Non-selective mix | E. coli O157:H7 | Salmonella | Listeria monocytogenes |
| Water | Average | $9.76 \times 10^6$ | $3.14 \times 10^6$ | $7.42 \times 10^6$ | $2.50 \times 10^6$ |
| | Standard Deviation | $4.04 \times 10^5$ | $2.42 \times 10^5$ | $1.05 \times 10^6$ | $2.28 \times 10^5$ |
| Chlorine (40 ppm, pH 6.0) | Average | $1.60 \times 10^1$ | 0.00 | 0.00 | 0.00 |
| | Standard Deviation | $2.19 \times 10^1$ | 0.00 | 0.00 | 0.00 |
| | Average log reduction | 5.79 | * | * | * |
| | % bacteria killed | 99.99984% | 100% | 100% | 100% |

TABLE 23-continued

Suspension tests conducted for 90 seconds at 40° C.

| Treatment | Measurement | Bacteria | | | |
|---|---|---|---|---|---|
| | | Non-selective mix | E. coli O157:H7 | Salmonella | Listeria monocytogenes |
| Chlorine dioxide (10 ppm) | Average | $7.20 \times 10^4$ | $2.80 \times 10^4$ | $3.80 \times 10^4$ | $9.80 \times 10^4$ |
| | Standard Deviation | $1.61 \times 10^5$ | $6.26 \times 10^4$ | $8.50 \times 10^4$ | $2.19 \times 10^5$ |
| | Average log reduction | 2.13 | 2.05 | 2.29 | 1.41 |
| | % bacteria killed | 99.2623% | 99.1083% | 99.4879% | 96.080% |

* indicates a sample in which no bacteria grew, so no fold reduction may be calculated.

TABLE 24

Summary of bacterial kill percentages from suspension tests (non-selected bacteria)

| Test condition | % bacteria killed, 40 ppm chlorine | % bacteria killed, 10 ppm chlorine dioxide |
|---|---|---|
| 4° C. for 30 seconds | 99.968 | 100 |
| 4° C. for 90 seconds | 99.996 | 99.99997 |
| 15° C. for 30 seconds | 99.99995 | 100 |
| 15° C. for 90 seconds | 99.99993 | 99.9998 |
| 40° C. for 30 seconds | 99.99998 | 99.9988 |
| 40° C. for 90 seconds | 99.99984 | 99.2623 |

Tables 18-23 show the results from the suspension tests for chlorine and chlorine dioxide treatment solutions. Quantification of bacterial load (expressed as averages with standard deviation) is indicated for each species (as well as for a mix of all three bacterial species). Furthermore, for each sanitizer treatment, the average log reduction in bacterial load and percentage of bacteria killed are given (relative to corresponding no-treatment control samples that were treated with only water at the appropriate temperature). Table 24 summarizes the percentage of bacteria (mix of all three bacterial species) killed after treatment with either 40 ppm chlorine or 10 ppm chlorine dioxide.

The results indicate that chlorine and chlorine dioxide have different effective temperature ranges. Chlorine is more effective at killing all three pathogens at a higher temperature. For example, 99.99998% of mixed bacteria are killed when treated at 40° C. for 30 seconds, as compared to only 99.9968% when treated at 4° C. for 30 seconds (Table 24). This is a difference of more than 3 log units. In contrast, chlorine dioxide is more effective at lower temperatures. For example, 100.000% of mixed bacteria are killed when treated at 4° C. or 15° C. for 30 seconds, as compared to only 99.9988% when treated at 40° C. for 30 seconds (Table 24). Similar results were also seen when treatment was prolonged to 90 seconds (Table 24). Without wishing to be bound by theory, it is believed that chlorine dioxide possesses greater chemical stability and solubility at lower temperatures. As such, it is believed that at lower temperatures, chlorine dioxide does not convert to chlorate and chlorite, which are not effective as disinfectants. It also believed that turbulence reduces the efficacy of chlorine dioxide, as chlorine dioxide is volatile and will breakdown to chlorate/chlorite when exposed to turbulence.

These results demonstrate that chlorine dioxide is more effective at reducing pathogenic microbial load when used at lower temperatures, such as 15° C. or 4° C.; and that chlorine is more effective at reducing pathogenic microbial load when used at high temperatures, such as 40° C.

Example 5: Effects of Mixing Chlorine and Chlorine Dioxide Treatments at Different Temperatures on Sanitizing Leafy Greens Inoculated with Pathogenic Bacteria Introduction The following Example describes the effects of combining chlorine and chlorine dioxide treatments in the second step of a triple wash system. The Example also assesses the effects of temperature on the combined treatments. The Example further describes the effects of directly dumping produce from the first treatment solution (chlorine) into the second solution (chlorine dioxide).

Materials and Methods

Mixed Chlorine and Chlorine Dioxide Treatments

Commodity Romaine lettuce was inoculated with human pathogens (*E. coli* O157:H7, sv. *Typhimurium*, and *Listeria monocytogenes*) as described in Example 2 above. The inoculation was repeated for 5 leaf sections (5 replicated for each treatment). The leaves were then incubated for 1.5 hours at room temperature.

Four variations on the triple wash procedure were carried out and compared to a chlorine-only control treatment. To distinguish the effects of temperature, treatments A and B were run together with a unique control, and C and D were run together with a unique control. The chlorine control treatments for both were completed as follows: a) 20 s dip at 4° C.; b) 90 s dip at 40° C.; and c) 30 s dip at 4° C. (all dips used 40 ppm $Cl_2$).

Treatment A was completed as follows: a) 20 s dip in 30 ppm $Cl_2$ at 16° C.; b) 90 s dip in 10 ppm $ClO_2$ at 40° C.; and c) 30 s dip in 60 ppm PAA at 4° C.

Treatment B was completed as follows: a) 20 s dip in 30 ppm $Cl_2$ at 16° C.; b) 90 s dip in a combination of both 10 ppm $ClO_2$ and 30 ppm $Cl_2$ at 40° C.; and c) 30 s dip in 60 ppm PAA at 4° C.

Treatment C was completed as follows: a) 20 s dip in 30 ppm Chat 16° C.; b) 90 s dip in 10 ppm $ClO_2$ at 16° C.; and c) 30 s dip in 60 ppm PAA at 4° C.

Treatment D was completed as follows: a) 20 s dip in 30 ppm $Cl_2$ at 16° C.; b) 90 s dip in combination of both 10 ppm $ClO_2$ and 30 ppm $Cl_2$ at 16° C.; and c) 30 s dip in 60 ppm PAA at 4° C.

Following each treatment, the leaf samples were sampled, serially diluted, and plated on selective agars to enumerate each bacterial species and a non-selective agar to enumerate total load of a mixed culture of all species. The average log unit reduction was calculated for each sample compared to the chlorine control.

Dumping Produce Directly from Chlorine to Chlorine Dioxide Treatments

Commodity Romaine lettuce was inoculated with human pathogens (*E. coli* O157:H7, sv. *Typhimurium*, and *Listeria monocytogenes*) as described in Example 2 above. The inoculation was repeated for 5 leaf sections (5 replicated for each treatment). The leaves were then incubated for 1.5 hours at room temperature.

The lettuce was incubated in 50 ppm $Cl_2$ for 20 s at 4° C., then dumped directly into 20 ppm $ClO_2$ to treat for 90 s at 4° C., and finally dipped in 60 ppm PAA for 30 s at 4° C. For control, chlorine-only treatment was carried out as follows: a) 20 s at 4° C.; b) 90 s dip at 4° C.; and c) 30 s dip at 4° C. (all dips used 40 ppm $Cl_2$).

Following each treatment, the leaf samples were sampled, serially diluted, and plated on selective agars to enumerate each bacterial species and a non-selective agar to enumerate total load of all species. The average log unit reduction was calculated for each sample compared to the chlorine control.

Results

Effect of Mixing Chlorine and Chlorine Dioxide Treatments at Different Temperatures on Reducing Pathogenic Bacterial Load Table 25 shows the results of 4 treatment procedures on reducing pathogenic bacterial load on lettuce as compared to chlorine-only controls. For each treatment, average log reduction of bacterial load is given, compared to appropriate chlorine control. To assess the effect of mixing chlorine and chlorine dioxide in a single treatment, treatments A and B should be compared, and C and D should be compared.

In Table 25, "Std. Dev." refers to standard deviation; "Control 1" refers to the chlorine control used with Treatments A and B; and "Control 2" refers to the chlorine control used with Treatments C and D.

TABLE 26

| Bacteria | Treatment (avg. log reduction compared to control) | | | |
|---|---|---|---|---|
| | A | B | C | D |
| Non-selective mix | 1.26 | 0.72 | 0.46 | 0.05 |
| *E. coli* O157:H7 | −0.23 | −0.34 | 0.90 | 0.39 |
| sv. *Typhimurium* | 0.67 | 0.51 | 0.60 | 0.25 |
| *Listeria monocytogenes* | 0.76 | 0.23 | 0.37 | −0.05 |

Table 26 summarizes the results of Table 25, showing the reduction of pathogenic bacterial load on lettuce, as compared to the chlorine-only control, for each of the four treatments AD. For each treatment, average log reduction in indicated bacterial load is given, compared to appropriate chlorine control. To assess the effect of mixing chlorine and chlorine dioxide in a single treatment, treatments A and B should be compared, and C and D should be compared.

The results indicate that mixing chlorine and chlorine dioxide in a second step after an initial chlorine wash step in a triple wash system is not very effective at reducing bacterial load (comparing Treatment A with B, and Treatment C with D). As shown in Tables 25 and 26, the results were similar regardless of the temperature at which this combined treatment step was performed (Treatments A and B were conducted at 40° C., while Treatments C and D were conducted at 16° C.). Without wishing to be bound by theory, it is believed that mixing of chlorine and chlorine dioxide breaks down the chlorine dioxide to chlorate and chlorite, which are not very effective disinfectants. The results were also consistent among all pathogen inoculants tested.

These results also demonstrate that performing the chlorine treatment step before the chlorine dioxide step is not as effective as performing the chlorine dioxide step first in the triple wash system (comparing the results depicted in Table 26 to those depicted in Tables 10-13).

Effect of Dumping Produce from Chlorine into Chlorine Dioxide on Reducing Pathogenic Bacterial Load

TABLE 25

| Treatment | Measurement | Bacterial Inoculation | | | |
|---|---|---|---|---|---|
| | | Non-selective mix | *E. coli* | *Salmonella* | *Listeria monocytogenes* |
| Control 1 | Average | $1.01 \times 10^5$ | $6.42 \times 10^3$ | $3.76 \times 10^4$ | $1.48 \times 10^4$ |
| | Std. Dev. | $1.07 \times 10^5$ | $5.61 \times 10^3$ | $3.74 \times 10^4$ | $1.61 \times 10^4$ |
| A | Average | $5.51 \times 10^3$ | $1.10 \times 10^4$ | $8.10 \times 10^3$ | $2.55 \times 10^3$ |
| | Std. Dev. | $4.73 \times 10^3$ | $1.27 \times 10^4$ | $1.02 \times 10^4$ | $2.32 \times 10^3$ |
| B | Average | $1.94 \times 10^4$ | $1.42 \times 10^4$ | $1.16 \times 10^4$ | $8.62 \times 10^3$ |
| | Std. Dev. | $3.96 \times 10^4$ | $3.12 \times 10^4$ | $2.22 \times 10^4$ | $1.76 \times 10^4$ |
| Control 2 | Average | $8.77 \times 10^3$ | $3.54 \times 10^3$ | $5.10 \times 10^3$ | $2.86 \times 10^3$ |
| | Std. Dev. | $1.38 \times 10^4$ | $6.50 \times 10^3$ | $8.63 \times 10^3$ | $4.75 \times 10^3$ |
| C | Average | $3.02 \times 10^3$ | $4.48 \times 10^2$ | $1.28 \times 10^3$ | $1.22 \times 10^3$ |
| | Std. Dev. | $3.02 \times 10^3$ | $6.92 \times 10^2$ | $1.62 \times 10^3$ | $1.64 \times 10^3$ |
| D | Average | $7.73 \times 10^3$ | $1.45 \times 10^3$ | $2.88 \times 10^3$ | $3.23 \times 10^3$ |
| | Std. Dev. | $1.18 \times 10^4$ | $1.87 \times 10^3$ | $3.11 \times 10^3$ | $4.14 \times 10^3$ |

TABLE 27

| Treatment | Measurement | Bacterial Inoculation | | |
|---|---|---|---|---|
| | | Non-selective mix | E. coli | Salmonella |
| Control | Average | $1.54 \times 10^2$ | $1.00 \times 10^2$ | $1.80 \times 10^1$ |
| | Std. Dev. | $2.04 \times 10^2$ | $1.46 \times 10^2$ | $2.39 \times 10^1$ |
| Dump treatment | Average | $7.60 \times 10^2$ | $2.42 \times 10^2$ | $1.84 \times 10^2$ |
| | Std. Dev. | $1.27 \times 10^3$ | $2.92 \times 10^2$ | $2.56 \times 10^2$ |

TABLE 28

| Bacteria | Average log reduction compared to control |
|---|---|
| Non-selective mix | −0.69 |
| E. coli | −0.38 |
| sv. Typhimurium | −1.01 |

Table 27 shows the results of dumping lettuce inoculated with pathogenic bacteria directly from the chlorine treatment to the chlorine dioxide treatment. Table 28 summarizes the results, showing the reduction of pathogenic bacterial load on lettuce, as compared to a chlorine-only control.

The results indicate that directly dumping produce from a first-step chlorine solution into a second-step chlorine dioxide solution is not very effective at reducing microbial load, as the chlorine control yields a greater reduction in microbial load than the dump treatment (Table 28). Similar to the results of combined chlorine and chlorine dioxide treatments, dumping the produce directly from one treatment to the other results in mixing of the chlorine and chlorine dioxide solutions. Without wishing to be bound by theory, it is believed that such mixing leads to the breakdown of chlorine dioxide, forming chlorate and chlorite. Without wishing to be bound by theory, it is thus believed that the each treatment should be conducted serially, without mixing chlorine and chlorine dioxide solutions. Preferably, it is believed that a de-watering step or section should be included between the chlorine and chlorine dioxide wash step in order to ensure that the chlorine solution does not mix with the chlorine dioxide solution.

The results thus demonstrate that combining chlorine and chlorine dioxide solutions in the second treatment step of the triple wash system, either directly by mixing or indirectly by dumping produce between solutions, reduces the efficacy of the chlorine dioxide solution, as compared to controls that only utilize single solutions.

Example 6: Efficacy of Various Triple Wash Treatments for Sanitizing Leafy Greens Under Laboratory or Commercial Processing Conditions Introduction The following Example describes the effects of utilizing either chlorine or a combination of chlorine and chlorine dioxide as the first treatment step in the combining chlorine and chlorine dioxide treatments in the second step of the triple wash system under commercial processing plant conditions.

Materials and Methods

Triple Wash Solution Preparation and Treatment Procedure

Treatment of lettuce under commercial processing plant conditions was performed as described in Example 3. The apparatus used was a larger scale commercial processing system as described in FIG. 1B, which includes 1 open flume, followed by 2 closed loop full immersion pipe loops. Chopped romaine for testing was fed into the system at a rate of 3000 to 5000 lb/hr. The triple wash treatment solutions were chlorine dioxide ($ClO_2$), chlorine ($Cl_2$), and peroxyacetic acid (PAA). For the triple wash treatment, each washing step led into the next washing step in series and in the sequence described. Since each washing step had its own collection tank, the sanitizing solutions were individually maintained. The individual concentrations for each solution were monitored during the run and are listed in FIG. 12

Treatment of lettuce under laboratory conditions was performed as described in Example 2.

Microbial Load Analysis

Microbial load analysis was performed for lettuce samples both before ("Initial Micro") and after each wash treatment step. Microbial load reduction (expressed as a reduction: "Micro Red") was calculated by subtracting the microbial load after each wash treatment step from the microbial load before each wash treatment step ("Initial Micro"). Microbial load analysis was performed by APC testing as described in Example 1. Initial and post-treatment microbial loads are given in log units. The differences between experimental and corresponding control microbial reductions are expressed as log units ("Micro Red to Control").

Results

FIG. 12 depicts the results of multiple trials showing the effectiveness of different triple wash procedures on reducing microbial load of leafy produce. Beginning at the left column, each date depicts a set of trials and their results undertaken on the given date. The trials are listed with treatments ("Treat 1," "Treat 2," etc.) grouped with corresponding chlorine-only controls ("Control" listed for each date). The triple wash procedure was either conducted under laboratory conditions ("Lab"), or commercial processing plant conditions ("Commercial"). For each experimental and control treatment, the temperature and sanitizing solution are described for each wash step. The three rightmost columns depict measurements of microbial load: an initial measurement ("Initial Micro"), the reduction in microbial load by each treatment given in log units ("Micro Red"), and the difference between microbial load reduction of each treatment and its corresponding control, given in log units ("Micro Red to Control").

As shown in FIG. 12, the largest reductions in microbial load over control treatment are observed when chlorine dioxide is used as the first step and chlorine is used as the second step (see 1/15/2013 Treat 1; 1/15/2013 Treat 3; and first 3/8/2013 Treat 1, all in bold). This is consistent with the results shown in Examples 1 and 2. However, using chlorine first, or mixing the chlorine and chlorine dioxide solutions resulted in reduced efficacy (FIG. 12). FIG. 12 also demonstrates that utilizing the chlorine solution or a combination of the chlorine and chlorine dioxide solutions as the first wash step is not as effective under commercial processing plant conditions as utilizing the chlorine dioxide solution first as compared to Lab (see, Example 3 and FIG. 11)]. Moreover, FIG. 12 shows that the higher temperatures under commercial processing plant conditions also reduced the efficacy of the chlorine dioxide solution (see 3/24/2013 Treat 1).

Looking at both the laboratory and commercial conditions, the results indicate that the order of the wash steps is important in effectively reducing bacterial load in produce, such as lettuce. In particular, the results show that using chlorine or a mixture of chlorine and chlorine dioxide as a first wash step is less effective than using chlorine dioxide as the first wash step. The results further indicate that mixing chlorine and chlorine dioxide in the second step is less effective than using chlorine alone.

Example 7: Effects of Substituting Catholyte for Chlorine Dioxide in Triple Wash Treatment for Sanitizing Leafy Greens Introduction The previous Examples demonstrate that a triple wash treatment, in which produce is exposed to chlorine dioxide, chlorine, and peroxyacetic acid solutions, is significantly more effective than the triple chlorine treatment of the plant processing control. However, for health, safety, and other reasons, it may be advantageous to use a catholyte solution instead of chlorine dioxide. For example, catholyte solutions are not gaseous and therefore may present fewer safety concerns than solutions that produce gas, e.g., chlorine dioxide. The following Example demonstrates at least three surprising results. First, substituting catholyte solutions for chlorine dioxide (a well-known sanitizer) in the triple wash treatment as described above leads to an approximately equivalent log reduction of nascent bacteria on unwashed Romaine lettuce. Second, substituting catholyte solutions for chlorine dioxide in the triple wash treatment as described above leads to an equivalent or greater log reduction in bacterial load of Romaine lettuce inoculated with one of three different common pathogenic contaminants. Finally, triple wash treatments using anolyte solutions as the source of free available chlorine yield more effective sanitization of produce than triple wash treatments using sodium hypochlorite as the free available chlorine source.

Materials and Methods

Log Reduction Analysis of Background Bacteria

Unwashed, chopped Romaine lettuce was collected from the production line the day before the trial. Six samples of the unwashed raw materials were collected in individual bags. Chemical solutions were made in three tanks. The lettuce was dipped into the first tank for 30 seconds, the second tank for 90 seconds, and the third tank for 30 seconds. Unless otherwise indicated, the order in which the solutions are listed is the order in which the produce was treated.

After treatment in the third tank, three samples were collected for microbial analysis, and the entire trial was repeated for a total of six trials per treatment. Unless otherwise stated, all other procedures related to culturing and measurement of bacteria were carried out as described in Example 2. APC results are reported as colony forming units per gram (CFU/g.).

Solution Preparation

Chlorine, chlorine dioxide, and peroxyacetic acid solutions were prepared as described in Example 1. The concentration of each solution is as described in this Example below.

Fresh catholyte solutions were produced less than 6 hours prior to treatment using an electrolytic cell (ECAFLOW C101). A brine solution was diluted with deionized water to an approximate ratio of 0.2% NaCl to $H_2O$, using the valve control on the electrolytic cell, and electrolyzed. The brine solution was input into the electrolytic cell at an approximate rate of 3.5 L input/min. The flow rate of the electrolysis was 20 GPH (gallons per hour) at a free available chlorine (FAC) concentration of 400 ppm, which was diluted with water to solution target concentrations. The electrolytic cell yielded a catholyte output rate of approximately 1.2 L/min with a pH 12.7-13.0. This catholyte was then diluted 1:10 in tap water to yield a 10% catholyte solution.

Analysis of Inoculation with Human Bacterial Pathogens

Cultures of *E. coli* O157:H7, sv. *Typhimurium*, and *Listeria monocytogenes* were grown and used to inoculate commodity Romaine lettuce as described in Example 2 above. The initial pathogen load was $10^5$ for each of the three pathogens tested.

Triple wash treatments and measurement of bacterial loads were performed as described in Example 2 above. The pH of the $Cl_2$ solution was measured to be 6.5. The pH of the catholyte solution was measured to be 11.4. All treatment steps in the triple wash procedure were carried out at room temperature.

Results

Efficacy of Triple Wash Treatments with Catholyte or Chlorine Dioxide Solutions on Unwashed Romaine Lettuce The efficacy of a triple wash treatment using catholyte, chlorine, and PAA (catholyte triple wash) or a triple wash treatment using chlorine dioxide, chlorine, and PAA (chlorine dioxide triple wash) were compared to a triple wash treatment using chlorine alone (triple chlorine treatment). Unwashed, chopped Romaine lettuce was used for these trials. The microbial load of produce after each treatment was quantified and compared to the microbial load measured for the unwashed raw materials.

Catholyte triple wash treatments were completed as follows: a) 30 s dip in 10% catholyte; b) 90 s dip in 33 ppm $Cl_2$ (pH 5.53); and c) 30 s dip in 80 ppm PAA.

Chlorine dioxide triple wash treatments were completed as follows: a) 30 s dip in 15.8 or 20 ppm $ClO_2$ (pH 5.57); b) 90 s dip in 32 or 34 ppm $Cl_2$ (pH 5.65); and c) 30 s dip in 75 or 85 ppm PAA.

Triple chlorine treatments were completed as follows: a) 30 s dip in 31 ppm $Cl_2$ (pH 5.81); b) 90 s dip in 33 ppm $Cl_2$ (pH 5.67); and c) 30 s dip in 38 ppm $Cl_2$ (pH 5.76).

Figure 13:
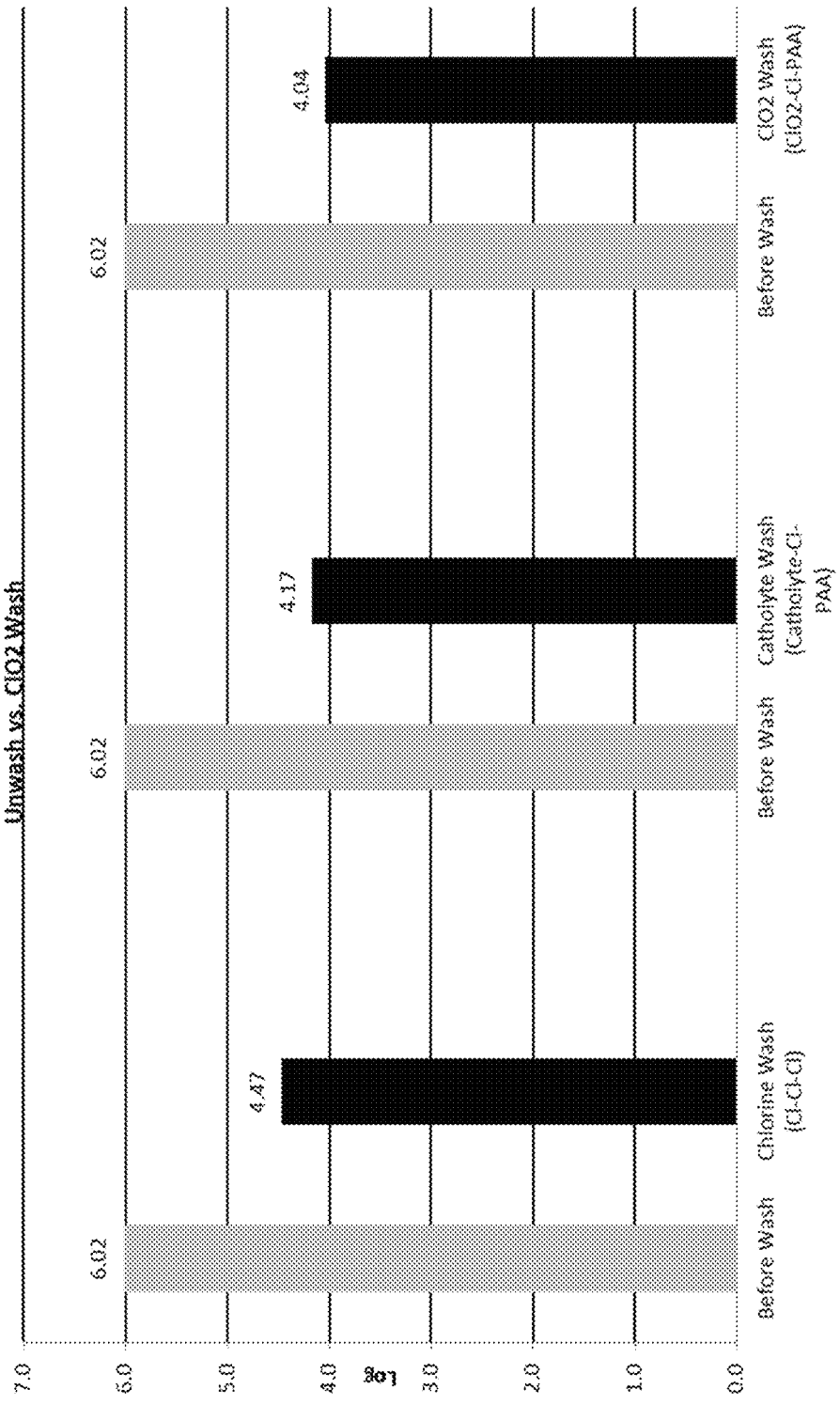
FIG. 13 is a bar graph depicting Aerobic Plate Counts (APC) on chopped Romaine lettuce from three triple wash systems. Treatment 1 ("Chlorine Wash") was performed in the following order: 31 ppm $Cl_2$ for 30 s, 33 ppm $Cl_2$ for 90 s, then 38 ppm $Cl_2$ for 30 s. Treatment 2 ("Catholyte Wash") was performed in the following order: 10% Catholyte solution for 30 s, 33 ppm $Cl_2$ for 90 s, then 80 ppm PAA for 30 s. Treatment 3 ("$ClO_2$ Wash") was performed in the following order: 15.8 ppm $ClO_2$ for 30 s, 32 ppm $Cl_2$ for 90 s, then 75 ppm PAA for 30 s.

The results are depicted in Table 29 and FIG. 13. As shown in Table 29, "Control" refers to a trial using a triple chlorine treatment, "Catholyte" refers to a catholyte triple wash treatment, and "$ClO_2$" refers to a chlorine dioxide triple wash treatment. Six trials were used for each treatment was indicated.

TABLE 29

| Treatment | Bacterial Load | Avg. Bacterial Load | Log |
| --- | --- | --- | --- |
| Raw Materials 1 | 1900000 | 1055500 | 6.02346 |
| Raw Materials 2 | 513000 | | |
| Raw Materials 3 | 2500000 | | |
| Raw Materials 4 | 470000 | | |
| Raw Materials 5 | 340000 | | |
| Raw Materials 6 | 610000 | | |
| Control 1 | 18000 | 29533.3 | 4.47031 |
| Control 2 | 24000 | | |
| Control 3 | 92000 | | |
| Control 4 | 13000 | | |
| Control 5 | 25000 | | |
| Control 6 | 5200 | | |
| Catholyte 1 | 15000 | 14783.3 | 4.16977 |
| Catholyte 2 | 18000 | | |
| Catholyte 3 | 6700 | | |
| Catholyte 4 | 13000 | | |
| Catholyte 5 | 16000 | | |
| Catholyte 6 | 20000 | | |
| $ClO_2$ 1 | 18000 | 11016.7 | 4.04205 |
| $ClO_2$ 2 | 5100 | | |
| $ClO_2$ 3 | 12000 | | |

TABLE 29-continued

| Treatment | Bacterial Load | Avg. Bacterial Load | Log |
|---|---|---|---|
| $ClO_2$ 4 | 10000 | | |
| $ClO_2$ 5 | 2000 | | |
| $ClO_2$ 6 | 19000 | | |

As shown in Table 29, the catholyte triple was treatment was approximately as effective at reducing bacterial load as the chlorine dioxide triple wash treatment. Both of these treatments were more effective than a triple chlorine treatment. A graphical summary of the log bacterial loads of Romaine lettuce before treatment and after each treatment is provided in FIG. 13. These results indicate that, surprisingly, a catholyte solution can be as effective at reducing bacterial load as part of a triple wash treatment as the well-known sanitizer chlorine dioxide.

Efficacy of Triple Wash Treatments with Catholyte or Chlorine Dioxide Solutions on Sanitizing Romaine Lettuce Inoculated with Pathogenic Bacteria Triple wash treatment was performed at room temperature (75° F.) with fresh Romaine lettuce samples that were inoculated with *E. coli* O157:H7, sv. *Typhimurium*, or *Listeria monocytogenes*. The bacterial load was calculated after treatment. The bacterial load after each triple wash treatment was compared to a no treatment control ("NTC"). For each trial, the reduction of bacterial load was calculated by dividing the mean NTC value by the mean treatment value. The log of this reduction value was expressed as the average log reduction.

Catholyte triple wash treatments were completed as follows: a) 20 s dip in 10% catholyte; b) 90 s dip in 60 ppm $Cl_2$; and c) 30 s dip in 80 ppm PAA.

Chlorine dioxide triple wash treatments were completed as follows: a) 20 s dip in 20 ppm $ClO_2$; b) 90 s dip in 60 ppm $Cl_2$; and c) 30 s dip in 80 ppm PAA.

Chlorine triple wash treatments were completed as follows: a) 20 s dip in 60 ppm $Cl_2$; b) 90 s dip in 60 ppm $Cl_2$; and c) 30 s dip in 80 ppm PAA.

The results are summarized in FIG. 14. Chlorine triple wash treatment was found to yield average log reductions of 1.20, 1.37, and 1.47 for sv. *Typhimurium*, *E. coli* O157:H7, and *Listeria monocytogenes*, respectively. In contrast, chlorine dioxide treatment was found to have a greater sanitizing effect, with average log reductions of 3.22, 3.22, and 3.27 for sv. *Typhimurium*, *E. coli* O157:H7, and *Listeria monocytogenes*, respectively. The greatest sanitizing effect was observed with a catholyte triple wash treatment, with average log reductions of 3.52, 3.56, and 3.55 for sv. *Typhimurium*, *E. coli* O157:H7, and *Listeria monocytogenes*, respectively.

These results indicate that both the catholyte and chlorine dioxide triple wash treatments were orders of magnitude more effective at reducing the load of each of the three pathogens compared to the chlorine triple wash treatment. In addition, the catholyte triple wash treatment was found to yield a smaller bacterial load, and hence greater average log reduction, than the chlorine dioxide triple wash treatment. This enhanced effect was consistently observed for each of the three pathogens. These results demonstrate that catholyte solutions may be substituted for chlorine dioxide solutions as part of a triple wash treatment and yield an equivalent, or even enhanced, reduction of bacterial load of several human pathogens commonly found on unwashed produce.

Efficacy of Triple Wash Treatments with Catholyte and Different Free Available Chlorine Solutions on Sanitizing Romaine Lettuce Inoculated with Pathogenic Bacteria To further test the efficacy of catholyte solutions, triple wash treatments were tested using different sources of free available chlorine for the chlorine solutions.

Triple wash treatment was performed at room temperature (75° F.) with fresh Romaine lettuce samples that were inoculated with *E. coli* O157:H7, sv. *Typhimurium*, or *Listeria monocytogenes*. The bacterial load was calculated after treatment. The bacterial load after each triple wash treatment was compared to a no treatment control. For each trial, the reduction of bacterial load was calculated by dividing the mean NTC value by the mean treatment value. The log of this reduction value was expressed as the average log reduction.

Chlorine-only triple wash treatments were completed as follows: a) 20 s dip in 60 ppm $Cl_2$; b) 90 s dip in 60 ppm $Cl_2$; and c) 30 s dip in 60 ppm $Cl_2$ (all dips were conducted at room temperature). 60 ppm chlorine solutions (pH 6.5) were prepared by 5% sodium hypochlorite solution. The concentration of free chlorine was measured using a HACH meter.

Chlorine dioxide triple wash treatments were completed as follows: a) 20 s dip in 20 ppm $ClO_2$; b) 90 s dip in 60 ppm $Cl_2$; and c) 30 s dip in 80 ppm PAA (all dips were conducted at room temperature). 20 ppm $ClO_2$ solutions were prepared using Selectrocide (500 ppm $ClO_2$ starting solution). 60 ppm chlorine solutions (pH 6.5) were prepared by 5% sodium hypochlorite solution. The concentrations of $ClO_2$ and free chlorine were measured using a HACH meter. 80 ppm PAA was prepared using Sanidate (5.3% PAA solution), and the concentration of PAA was measured using a PAA test kit (EcoLab®).

Catholyte/NaClO triple wash treatments were completed as follows: a) 20 s dip in 10% catholyte; b) 90 s dip in 60 ppm $Cl_2$; and c) 30 s dip in 80 ppm PAA (all dips were conducted at room temperature). 60 ppm chlorine solutions (pH 6.5) were prepared by 5% sodium hypochlorite solution. The concentration of free chlorine was measured using a HACH meter. PAA was prepared as described above. The pH of the 10% catholyte solution was 11.4.

Catholyte/anolyte triple wash treatments were completed as follows: a) 20 s dip in 10% catholyte; b) 90 s dip in 60 ppm $Cl_2$; and c) 30 s dip in 80 ppm PAA (all dips were conducted at room temperature). 60 ppm chlorine solutions (pH 6.5) were prepared using an anolyte solution (140 ppm free chlorine in stock anolyte solution). The concentration of free chlorine was measured using a HACH meter. PAA was prepared as described above. The pH of the 10% catholyte solution was 11.5.

Catholyte/chlorine only triple wash treatments were completed as follows: a) 20 s dip in 10% catholyte; b) 90 s dip in 60 ppm $Cl_2$; and c) 30 s dip in 60 ppm $Cl_2$ (all dips were conducted at room temperature). 60 ppm chlorine solutions (pH 6.5) were prepared using an anolyte solution (140 ppm free chlorine in stock anolyte solution). The concentration of free chlorine was measured using a HACH meter. PAA was prepared as described above. The pH of the 10% catholyte solution was 11.5.

Catholyte/5 ppm chlorine dioxide triple wash treatments were completed as follows: a) 20 s dip in 10% catholyte & 5 ppm $ClO_2$; b) 90 s dip in 60 ppm $Cl_2$; and c) 30 s dip in 80 ppm PAA (all dips were conducted at room temperature). 5 ppm chlorine dioxide solutions were prepared by Selectrocide (500 ppm chlorine dioxide stock solution). 60 ppm chlorine solutions (pH 6.5) were prepared using an anolyte solution (140 ppm free chlorine in stock anolyte solution).

The concentrations of chlorine dioxide and free chlorine were measured using a HACH meter. PAA was prepared as described above. The pH of the 10% catholyte solution was 11.5.

Catholyte/20 ppm chlorine dioxide triple wash treatments were completed as follows: a) 20 s dip in 10% catholyte & 20 ppm $ClO_2$; b) 90 s dip in 60 ppm $Cl_2$; and c) 30 s dip in 80 ppm PAA (all dips were conducted at room temperature). 20 ppm chlorine dioxide solutions were prepared by Selectrocide (500 ppm chlorine dioxide stock solution). 60 ppm chlorine solutions (pH 6.5) were prepared using an anolyte solution (140 ppm free chlorine in stock anolyte solution). The concentrations of chlorine dioxide and free chlorine were measured using a HACH meter. PAA was prepared as described above. The pH of the 10% catholyte solution was 11.5.

The results are depicted in Table 30.

that using a second wash in free available chlorine solution (from anolyte) instead of PAA treatment was able to yield a highly effective sanitization. These results also demonstrate that the addition of chlorine dioxide to the catholyte solution decreases the log reduction in bacterial load observed with catholyte solution alone. Without wishing to be bound to theory, it is thought that chlorine dioxide and hydroxide ions may react to form chlorate ions, chlorite ions, and water, thereby reducing the amount of chlorine dioxide and hydroxide ions in the solution.

Example 8: Effects of Catholyte pH for Sanitizing Leafy Greens

Introduction

The previous Example demonstrates the efficacy of triple wash treatments, e.g., a catholyte+anolyte+PAA treatment

TABLE 30

| | Average Log Reduction | Average No. Treatment Control (CFU/ml) | Average Following Treatment (CFU/ml) | Average # of Cells after Treatment |
|---|---|---|---|---|
| Treatment: | 60 ppm $Cl_2$ (RT) 20 sec + 60 ppm $Cl_2$ (RT) 90 sec + 60 ppm $Cl_2$ (RT) 30 sec | | | |
| sv. *Typhimurium* | 1.20 | 5.94E+05 | 3.78E+04 | 37765 |
| *E. coli* O157:H7 | 1.37 | 5.10E+05 | 2.17E+04 | 21694 |
| *Listeria monocytogenes* | 1.47 | 4.64E+05 | 1.59E+04 | 15871 |
| Treatment: | 20 ppm $ClO_2$ (RT) 20 sec + 60 ppm $Cl_2$ (RT) 90 sec + 80 ppm PAA (RT) 30 sec | | | |
| sv. *Typhimurium* | 3.22 | 5.94E+05 | 3.56E+02 | 356 |
| *E. coli* O157:H7 | 3.22 | 5.10E+05 | 3.06E+02 | 306 |
| *Listeria monocytogenes* | 3.27 | 4.64E+05 | 2.50E+02 | 250 |
| Treatment: | 10% Catholyte (RT) 20 sec + 60 ppm $Cl_2$ (RT) 90 sec (NaClO) + 80 ppm PAA (RT) 30 sec | | | |
| sv. *Typhimurium* | 3.52 | 5.94E+05 | 1.78E+02 | 178 |
| *E. coli* O157:H7 | 3.56 | 5.10E+05 | 1.40E+02 | 140 |
| *Listeria monocytogenes* | 3.55 | 4.64E+05 | 1.30E+02 | 130 |
| Treatment: | 10% Catholyte (RT) 20 sec + 60 ppm $Cl_2$ (RT) 90 sec (anolyte) + 80 ppm PAA (RT) 30 sec | | | |
| sv. *Typhimurium* | 5.10 | 5.02E+05 | 4.00E+00 | 4 |
| *E. coli* O157:H7 | 4.71 | 4.14E+05 | 8.00E+00 | 8 |
| *Listeria monocytogenes* | 5.59 | 7.82E+05 | 2.00E+00 | 2 |
| Treatment: | 10% Catholyte (RT) 20 sec + 60 ppm $Cl_2$ (RT) 90 sec (anolyte) + 60 ppm $Cl_2$ (RT) 30 sec (anolyte) | | | |
| sv. *Typhimurium* | 5.40 | 5.02E+05 | 2.00E+00 | 2 |
| *E. coli* O157:H7 | 5.01 | 4.14E+05 | 4.00E+00 | 4 |
| *Listeria monocytogenes* | 5.59 | 7.82E+05 | 2.00E+00 | 2 |
| Treatment: | 10% Catholyte & 5 ppm $ClO_2$ (RT) 20 sec + 60 ppm $Cl_2$ (RT) 90 sec + 80 ppm PAA (RT) 30 sec | | | |
| sv. *Typhimurium* | 3.49 | 5.02E+05 | 1.64E+02 | 164 |
| *E. coli* O157:H7 | 2.76 | 4.14E+05 | 7.26E+02 | 726 |
| *Listeria monocytogenes* | 3.14 | 7.82E+05 | 5.70E+02 | 570 |
| Treatment: | 10% Catholyte & 20 ppm $ClO_2$ (RT) 20 sec + 60 ppm $Cl_2$ (RT) 90 sec + 80 ppm PAA (RT) 30 sec | | | |
| sv. *Typhimurium* | 3.04 | 5.02E+05 | 4.62E+02 | 462 |
| *E. coli* O157:H7 | 2.85 | 4.14E+05 | 5.84E+02 | 584 |
| *Listeria monocytogenes* | 3.10 | 7.82E+05 | 6.20E+02 | 620 |

These results indicate that all triple wash treatments were more effective than chlorine only treatment. Surprisingly, substitution of catholyte solution for chlorine dioxide resulted in an enhanced log reduction for all three types of bacteria. It was also unexpected that the combinations of 10% catholyte solution, free available chlorine solution from anolyte, and either PAA or a second treatment with free available chlorine solution from anolyte resulted in the most effective treatment, yielding greater than 5 log reductions in bacterial load and less than 10 cells after treatment. These results demonstrate the surprising result that triple wash treatments using anolyte solutions as the source of free available chlorine yield more effective sanitization of produce than triple wash treatments using sodium hypochlorite as the free available chlorine source. It was also unexpected and a catholyte+anolyte+anolyte treatment, for providing microbial reduction on commercial produce. In an exemplary commercial process, bulk tanks of freshly generated catholyte and anolyte solutions may be used to inject into the wash tanks (where produce is treated) and maintain a desired concentration of catholyte or anolyte. By way of example, an anolyte solution containing 500 ppm-1200 ppm FAC may be used as concentrate to maintain 60 ppm FAC in the wash tank. Instead of a percentage-based catholyte solution, however, it may be desirable to use pH as a control mechanism. For example, an amount of neat catholyte solution required to maintain a certain pH may be added to the wash tank in a continuous online wash process. Therefore, the following Example provides a set of trials that use pH as a catholyte control mechanism, rather than a percentage of catholyte.

Materials and Methods

Bacteria

Overnight cultures of *E. coli* O157:H7, *Salmonella* sv. *Typhimurium*, and *Listeria monocytogenes* were grown from freezer stocks (glycerol or DMSO) in 20 ml of Luria Bertani broth (LB growing medium) with shaking at 150 rpm at 37° C. The cultures were centrifuged for 6 minutes at 3,000 rpm. The supernatant was then removed from the tubes, and each cell pellet was resuspended in 20 ml (equal volume) of 0.1 M phosphate buffer (pH 7.0; PB). This step was then repeated 2 times for a total of 3 wash steps to remove all growing medium from the culture.

Analysis of Inoculation with Human Bacterial Pathogens

Romaine lettuce was purchased from a local grocery store. The samples were prepared by removing the leaves from at least 2 heads to obtain a random sample of multiple heads, as well as inner and outer leaves. Leaves were cut into 1×2 inch pieces (total of 5 replicates) and spot inoculated with *E. coli* O157:H7, *S. typhimurium*, and *L. monocytogenes* (initial concentration ~$10^7$ CFU/ml). The inoculated leaf samples were incubated for 1.5 hours at 25° C. A portion was set aside, and treatments were performed on the remainder to sanitize romaine lettuce samples as described below.

Following treatment, each sample was immediately placed into 100 ml of PB to dilute the sanitizer to prevent further sanitizer activity and blended for 2 minutes. The samples were then serially diluted using PB as the diluent and spread plated on MacConkey agar for *E. coli* O157:H7, XLT4 agar for *S. typhimurium*, and Modified Oxford Medium for *L. monocytogenes*. The MacConkey agar plates for *E. coli* O157:H7 and XLT4 agar plates for *S. typhimurium* were incubated overnight at 37° C. and modified oxford medium plates for *L. monocytogenes* were incubated at 30° C. for 48 hours for enumeration of bacteria present from the samples.

The mean CFU/ml, together with the standard error of the mean, was then calculated for each of the treatments and initial no treatment samples. The no treatment samples were the portion of inoculated leaves that were set aside (i.e. not exposed to the sanitization treatment) and similarly processed for enumeration of the initial microbial load as described above. The mean log reduction values were then calculated by dividing the mean for the no treatment samples by the mean value for each treatment and taking the $log_{10}$ of the result. Standard errors for the log reduction values were then calculated using propagation of error formulas.

Results

Triple wash procedures using different catholyte levels as the first wash (e.g., 10% catholyte, or a specific pH of catholyte from pH 9-11) and 60 ppm FAC anolyte as the second and third washes were tested and compared against a triple chlorine wash as described in Table 31 below.

TABLE 31

Electro Chemical Activation (ECA) treatments with different pH in first wash.

| | $1^{st}$ wash | | | $2^{nd}$ wash | | | $3^{rd}$ wash | | |
|---|---|---|---|---|---|---|---|---|---|
| Treatment | Solution | Temp. | Time | Solution | Temp. | Time | Solution | Temp. | Time |
| 1 | 60 ppm Chlorine | 25° C. | 20 seconds | 60 ppm Chlorine | 25° C. | 90 seconds | 60 ppm Chlorine | 25° C. | 30 seconds |
| 2 | 10% Catholyte | | | 60 ppm Anolyte | | | 60 ppm Anolyte | | |
| 3 | pH 9 Catholyte | | | | | | | | |
| 4 | pH 10 Catholyte | | | | | | | | |
| 5 | pH 11 Catholyte | | | | | | | | |

The effect of each of these treatments on microbial log reduction of *Salmonella* sv. *Typhimurium*, *E. coli* O157:H7, and *Listeria monocytogenes* are provided in Table 32 below. The average log reduction obtained by each treatment is plotted in FIG. 15.

TABLE 32

Average log reduction (LR) and standard deviation (SDEV) following treatment.

| TREATMENT | S. Typhimurium | | E. coli O157:H7 | | L. monocytogenes | |
|---|---|---|---|---|---|---|
| | LR | SDEV | LR | SDEV | LR | SDEV |
| Triple Chlorine @25° C. for 20 sec + 90 sec + 30 sec | 2.20 | 0.21 | 2.41 | 0.21 | 2.54 | 0.31 |
| 10% Catholyte @25° C. 20 sec + 60 ppm Anolyte @25° C. 90 sec + 60 ppm Anolyte @25° C. 30 sec | 3.77 | 0.20 | 3.11 | 0.38 | 3.30 | 0.36 |
| pH 9 Catholyte (3.3%) @25° C. 20 sec + 60 ppm Anolyte @25° C. 90 sec + 60 ppm Anolyte @25° C. 30 sec | 3.80 | 0.20 | 3.78 | 0.26 | 3.81 | 0.20 |

TABLE 32-continued

Average log reduction (LR) and standard deviation (SDEV) following treatment.

| TREATMENT | S. Typhimurium | | E. coli O157:H7 | | L. monocytogenes | |
|---|---|---|---|---|---|---|
| | LR | SDEV | LR | SDEV | LR | SDEV |
| pH 10 Catholyte (1.7%) @25° C. 20 sec + 60 ppm Anolyte @25° C. 90 sec + 60 ppm Anolyte @25° C. 30 sec | 3.70 | 0.38 | 4.01 | 0.39 | 3.60 | 0.24 |
| pH 11 Catholyte (3.3%) @25° C. 20 sec + 60 ppm Anolyte @25° C. 90 sec + 60 ppm Anolyte @25° C. 30 sec | 3.65 | 0.23 | 3.58 | 0.31 | 3.50 | 0.28 |

Figure 15:
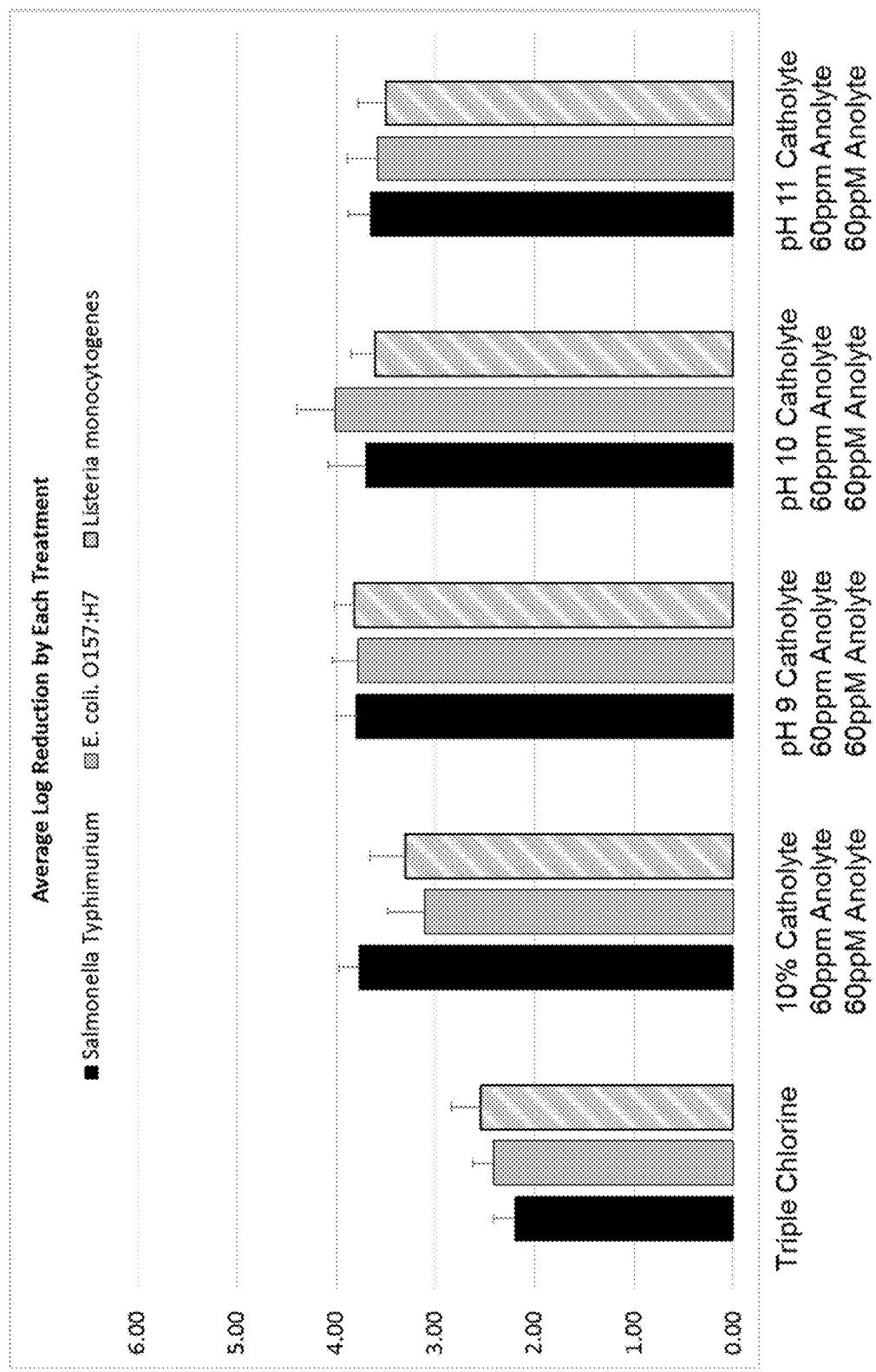
FIG. 15 is a graph depicting the effect of different triple wash treatments on reducing bacterial loads on commodity Romaine lettuce contaminated with *E. coli* O157:H7 (gray bars), sv. *Typhimurium* (black bars), or *Listeria monocytogenes* (hatched bars). Conditions for each treatment are as described in Tables 31 and 32.

As shown in Table 32 and FIG. 15, using the catholyte solution at a pH of 10 had similar results to using catholyte at a pH of 9 and 11. Importantly, these results were similar to those obtained using 10% catholyte. Advantageously, whereas measuring 10% catholyte during production may be difficult, monitoring the pH of the solution can be easily performed.

The pH 10-catholyte solution was chosen to be used in additional experiments, as a slightly higher reduction of *E. coli* O157:H7 from the romaine lettuce leaves was observed (compared to the other treatments). Notably, each of the ECA catholyte/anolyte water treatments were at least 1 log better at reducing *E. coli* O157:H7, *S. typhimurium*, and *L. monocytogenes* than the triple chlorine only treatment, consistent with the results described in the previous Examples. These results demonstrate the feasibility of establishing and maintaining a catholyte pH set point at a target pH of 10 with a range from pH 9-11 to allow for process variations (e.g., using a programmable logic controller or PLC). A bulk, concentrated catholyte solution of high pH may then be used to feed the tank, e.g., with metering pumps and PLC controls.

Example 9: Effects of Catholyte and Ozone for Sanitizing Leafy Greens

Introduction

As described above, triple wash treatments including catholyte+anolyte+PAA and catholyte+anolyte+anolyte are highly effective in providing microbial reduction on commercial produce. In situations such as commercial use, it may be advantageous for each individual wash tank of the three wash tanks to include a sanitizer, e.g., to avoid any long term microbiological build up in the wash water. Since anolyte solution has FAC (free available chlorine), it functions as a sanitizer for the wash water and for the produce being washed to reduce the microbial load on the produce. For catholyte solutions, which function as a biofilm and/or surface wash agent, it may be advantageous to include a sanitizing solution to prevent microbiological build up in the wash water of organisms that were washed off the surface of the produce.

In this Example, ozone was tested as a water sanitizing agent, with the first catholyte wash, to minimize long term build up in the wash water tank. This synergistic use of catholyte with ozone is merely exemplary, as other sanitizers may be used, including the anolyte solution, or any other commercial friendly solution that is compatible with produce treatment and the catholyte solution (e.g., a solution that does not reduce catholyte properties such as pH, surfactant properties, biofilm reduction, etc.).

Ozone was selected, inter alia, because it is known as a high oxidation reduction potential sanitizer that does not affect the pH, surfactant and other chemical properties of the catholyte solution. In a commercial situation, it may be advantageous to use the ozone such that it does not produce off gassing or odors (e.g., for environmental and/or OSHA compliance). While higher ozone levels can be used for greater water re-use and increased water sanitizing capability by installing air exhaust hoods over the wash tanks, low ozone levels more practical for commercial use were employed for these trials.

Materials and Methods

Effect of Water/10% Catholyte Treatment of Background Microflora

Romaine lettuce was purchased from a local grocery store and prepared by removing all the leaves from five heads of lettuce. The leaves were then taken apart and chopped to mimic cutting for processed bag salads. The chopped leaves were mixed to obtain a random sample of multiple heads, as well as inner and outer leaves. To obtain water that contained natural lettuce background microflora, 200 g of lettuce was dipped into 2 L of the treatment solution (water and pH 10 catholyte) for 20 seconds. The lettuce was removed, discarded, and 100 ml of solution was collected into sterile water sampling bottles containing sodium thiosulfate as a neutralizer. After 60 seconds, an additional 100 ml of solution was collected in sterile water sample bottles containing sodium thiosulfate. An additional 200 g of lettuce was then added to the same treatment solution and sampled as described. This sampling protocol was repeated for a total of 3 dips of lettuce and collection of water samples both following dipping the lettuce and waiting for 60 seconds. The water samples were serially diluted using PB as the diluent and plated on Total Plate Count Agar. The plates were incubated at 30° C. for 48 hours for enumeration of the bacteria that were present in the treatment water.

The total background microflora from the romaine lettuce leaves was enumerated from five replicates by blending 25 g in 225 ml of PB for 2 minutes. The samples were serially diluted using PB as the diluent and plated on Total Plate Count Agar. The plates were incubated at 30° C. for 48 hours for enumeration of the natural bacteria that were associated with the romaine lettuce.

Effect of Ozonated Water Treatment of Background Microflora

Water containing high levels of background microflora was generated by dipping 200 g of lettuce in 2 L of water for 20 seconds. This lettuce was discarded and another 200 g of lettuce was dipped in the same water for 20 seconds. This was repeated for a total of 10 dips (referred to as Control in Table 34 below). Water with dissolved Ozone was then generated using a ClearWater Tech MSW245 Mobile Ozone Generator (San Luis Obispo, Calif.). The control microflora containing water was then mixed with this 'Ozonated water' at various mix levels ranging from 10 to 60% of the ozonated water with the control microflora containing water. First, 10% ozonated water was blended with 90% microflora containing water and after 20 seconds, 100 ml of water was removed into a sterile water sample bottle. This protocol was repeated in triplicate, as well as testing 20%, 30%, 40%, 50%, and 60% blends of ozonated water combined with the microflora containing water. In addition, 200 g of lettuce was added to the ozonated solution for 20 seconds and 100 ml of water was then collected in a sterile water sample bottle. This was also repeated in triplicate. The samples were serially diluted using PB as the diluent and plated on Total Plate Count agar. The plates were incubated for 48 hours at 30° C. for enumeration of the bacteria present following treatment.

Effect of Anolyte Addition to pH 10 Catholyte Solution

Romaine lettuce was purchased from a local grocery store and prepared by removing all the leaves from five heads of lettuce. The leaves were then taken apart and chopped to mimic the cutting for processed bag salads. The chopped leaves were mixed to obtain a random sample of multiple heads, as well as inner and outer leaves. To obtain water that contained natural lettuce background microflora, 200 g of lettuce was dipped into the treatment solution (pH 10 catholyte with 50 ppm anolyte, pH 10 catholyte with 20 ppm anolyte, or pH 10 catholyte with 10 ppm anolyte) for 20 seconds. The lettuce was removed, discarded, and 100 ml of solution was collected into sterile water sampling bottles containing sodium thiosulfate as a neutralizer. After 60 seconds, an additional 100 ml of solution was collected in sterile water sample bottles containing sodium thiosulfate. An additional 200 g of lettuce was then added to the same treatment solution and sampled as described. This sampling protocol was repeated for a total of 3 dips of lettuce and collection of water samples both following dipping lettuce and waiting for 60 seconds. The water samples were serially diluted using PB as the diluent and plated on Total Plate Count Agar. The plates were incubated at 30° C. for 48 hours for enumeration of the bacteria that were present in the treatment water.

The total background microflora from the romaine lettuce leaves were enumerated from five replicates by blending 25 g in 225 ml of PB for 2 minutes. The samples were serially diluted using PB as the diluent and plated on Total Plate Count Agar. The plates were incubated at 30° C. for 48 hours for enumeration of the natural bacteria that were associated with the romaine lettuce.

Results

The effect of water and catholyte solutions (pH 10) on reducing background microflora was tested, and the results are shown in Table 33 below.

TABLE 33

Number of bacteria present in water and pH 10 catholyte treatment solutions.

| Treatment | Sampling (log CFU/ml) | | | | | |
|---|---|---|---|---|---|---|
| | 1 (20 s) | 2 (60 s) | 3 (20 s) | 4 (60 s) | 5 (20 s) | 6 (60 s) |
| Initial average Log CFU/ml | 8.26 | 8.26 | 8.26 | 8.26 | 8.26 | 8.26 |
| Water (pH = 6.0) @25° C. | 6.37 | 6.31 | 6.78 | 4.85 | 6.91 | 5.93 |
| pH 10 catholyte @25° C. | 5.86 | 6.41 | 5.81 | 7.08 | 6.92 | 6.75 |

As shown in Table 33, water and pH 10 catholyte alone were not effective at reducing the bacteria that were present in the treatment solution.

Next, the effect of ozone was tested on reduction of background microflora (Table

TABLE 34

Reduction of bacteria from wash water using ozone.

| Treatment | Initial Ozone (ppm) | Replicate | | | Avg. CFU/ml | Theoretical dilution reduction | SD |
|---|---|---|---|---|---|---|---|
| | | 1 | 2 | 3 | | | |
| 20 sec in water | — | 1.08.E+04 | 2.60.E+04 | 2.10.E+04 | 19266 | | 7.75.E+03 |
| 20 sec in ozone solution | 2.2 | 6.70.E+03 | 6.90.E+03 | 7.10.E+03 | 6900 | | 2.00.E+02 |
| After 10 dips in water (Control) | — | 3.60.E+05 | 2.50.E+05 | 2.90.E+05 | 300000 | | 5.57.E+04 |
| After mixing 10% ozone solution | 1.8 | 3.00.E+05 | 3.10.E+05 | 2.90.E+05 | 300000 | 270000 | 1.00.E+04 |
| After mixing 20% ozone solution | 1.8 | 1.50.E+05 | 2.40.E+05 | 1.66.E+05 | 185333 | 240000 | 4.80.E+04 |
| After mixing 30% ozone solution | 1.8 | 2.00.E+05 | 1.49.E+05 | 1.75.E+05 | 174667 | 210000 | 2.55.E+04 |
| After mixing 40% ozone solution | 1.8 | 1.42.E+05 | 8.80.E+04 | 1.35.E+05 | 121667 | 180000 | 2.94.E+04 |
| After mixing 50% ozone solution | 1.8 | 8.50.E+04 | 9.60.E+04 | 8.20.E+04 | 87667 | 150000 | 7.37.E+03 |
| After mixing 60% ozone solution | 1.8 | 6.10.E+04 | 8.50.E+04 | 6.50.E+04 | 70333 | 120000 | 1.29.E+04 |

The theoretical dilution reduction in Table 34 was calculated based on the number of cells that would be present if they were diluted in water or buffer (i.e. not a solution that would cause cell death or injury). Based on these calculations, the higher amounts of ozone present did reduce the number of bacteria present better than the number of CFU/ml that would be expected if the samples were diluted in a solution that did not have a killing capacity (Table 34). These results demonstrate that ozone may be used, e.g., added to a pH 10-catholyte solution, to reduce the number of bacteria present and preserve/maintain the quality of the wash water without excessive buildup of microflora.

Next, different concentrations of anolyte (50, 20, and 10 ppm) were added to the pH 10 catholyte solution to determine if adding anolyte would decrease the number of bacteria present in the solution. These results are shown in Table 35 below.

TABLE 35

Number of bacteria present when 50, 20, or 10 ppm
anolyte is added to pH 10 catholyte solution.

| | Sampling (log CFU/ml) | | | | | |
|---|---|---|---|---|---|---|
| Treatment (Dip #) | 1 (20 s) | 1 (60 s) | 2 (20 s) | 2 (60 s) | 3 (20 s) | 3 (60 s) |
| Initial average Log CFU/ml | 8.26 | 8.26 | 8.26 | 8.26 | 8.26 | 8.26 |
| pH 10 catholyte & 50 ppm FAC anolyte (25° C.) | 2.64 | 3.71 | 5.46 | 4.19 | 4.83 | 3.96 |
| pH 10 catholyte & 20 ppm FAC anolyte (25° C.) | 3.59 | 2.68 | 2.63 | 2.95 | 3.10 | 3.40 |
| pH 10 catholyte & 10 ppm FAC anolyte (25° C.) | 3.18 | 2.49 | 3.34 | 3.01 | 6.16 | 7.38 |

As shown in Table 35, the number of bacteria decreased when anolyte was added to yield 50, 20 or 10 ppm of free available chlorine (FAC) in the catholyte solution. This indicates these concentrations of anolyte are able to reduce the bacteria present in the wash water when added to a pH 10-catholyte solution. As shown above, by the time the 3$^{rd}$ dip was repeated for 10 ppm FAC anolyte solution, the bacteria levels had increased. Without wishing to be bound to theory, it is thought that the 10 ppm starting solution was used up by the third dip, thus decreasing in its effectiveness for further microbial reduction. Thus, it may be advantageous to maintain a continuous level of the desired anolyte to keep up with the consumption caused by the continued amount of produce being washed, which continuously contributes to consumption of the sanitizer by the organic matter.

These results show that a 50 ppm FAC anolyte solution mixed in the pH 10 catholyte solution was effective in reducing microflora. However, since a microbial reduction was observed with 10 and 20 ppm FAC anolyte solution mixed in the first wash catholyte solution, a commercial target of 15 ppm FAC anolyte solution may be used for a more efficient process, which provides a process control range from 10 to 20 ppm.

Example 10: Comparison of Catholyte/Anolyte Treatments and Commercial Chemicals for Sanitizing Leafy Greens Introduction As described above, catholyte and anolyte solutions may be used in efficacious treatments for reducing microbial load of produce. Catholyte and anolyte may be produced, e.g., using an Electro Chemical Activation System (ECAS), examples of which are commercially available from different manufacturers. As discussed herein, relevant control parameters useful for the catholyte and anolyte solutions are pH and FAC, respectively. To compare the efficacy of catholyte/anolyte treatment with chemically similar solutions having a similar pH, triple wash treatments using catholyte and anolyte solutions were compared with triple wash treatments using NaOH and NaClO instead.

Materials and Methods

Analysis of Catholyte/Anolyte Treatments Vs. NaOH/NaClO Treatments

Overnight cultures of *E. coli* O157:H7, *Salmonella* sv. *Typhimurium*, and *Listeria monocytogenes* were grown from freezer stocks (glycerol or DMSO) in 20 ml of Luria Bertani broth (LB growing medium) with shaking at 150 rpm at 37° C. The cultures were centrifuged for 6 minutes at 3,000 rpm. The supernatant was then removed from the tubes and each cell pellet was resuspended in 20 ml (equal volume) of 0.1 M phosphate buffer (pH 7.0; PB). This step was then repeated 2 times for a total of 3 wash steps to remove all growing medium from the culture.

Romaine lettuce was purchased from a local grocery store. The samples were prepared by removing the leaves from at least 2 heads to obtain a random sample of multiple heads, as well as inner and outer leaves. Leaves were cut into 1×2 inch pieces (total of 5 replicates) and spot inoculated with *E. coli* O157:H7, *S. typhimurium*, and *L. monocytogenes* (initial concentration ~10$^7$ CFU/ml). The inoculated leaf samples were incubated for 1.5 hours at 25° C. A portion was set aside and on the remainder, treatments were performed to sanitize romaine lettuce samples as described in Table 36 below. A triple chlorine wash treatment was included as a control.

Following treatment, each sample was immediately placed into 100 ml of PB to dilute the sanitizer to prevent further sanitizer activity and blended for 2 minutes. The samples were then serially diluted using PB as the diluent and spread plated on McConkey agar for *E. coli* O157:H7, XLT4 agar for *S. typhimurium*, and Modified Oxford Medium for *L. monocytogenes*. The MacConkey agar plates for *E. coli* O157:H7 and XLT4 agar plates for *S. typhimurium* were incubated overnight at 37° C., and modified oxford medium plates for *L. monocytogenes* were incubated at 30° C. for 48 hours for enumeration of bacteria present from the samples.

The mean CFU/ml, together with the standard error of the mean, was then calculated for each of the treatments and initial no treatment samples. The no treatment samples were the portion of inoculated leaves that were set aside (i.e. not exposed to the sanitization treatment) and similarly processed for enumeration of the initial microbial load as described above. The mean log reduction values were then calculated by dividing the mean for the no treatment samples by the mean value for each treatment and taking the $log_{10}$ of the result. Standard errors for the log reduction values were then calculated using propagation of error formulas.

Results

The treatments used to compare catholyte/anolyte-based triple wash treatments with NaOH/NaClO-based triple wash treatments are provided in Table 36 below.

TABLE 36

Treatments used for comparison between Electro Chemical Activation (ECA) water treatment and NaOH and NaClO solutions.

| | | 1$^{st}$ wash | | | 2$^{nd}$ wash | | | 3$^{rd}$ wash | | |
|---|---|---|---|---|---|---|---|---|---|---|
| Treatment | Solution | Temp. | Time | Solution | Temp. | Time | Solution | Temp. | Time |
| 1 | pH 10 NaOH & 15 ppm NaClO | 25° C. | 20 seconds | 60 ppm NaClO | 25° C. | 90 seconds | 60 ppm NaClO | 25° C. | 30 seconds |

TABLE 36-continued

Treatments used for comparison between Electro Chemical Activation (ECA) water treatment and NaOH and NaClO solutions.

| Treatment | 1st wash Solution | Temp. | Time | 2nd wash Solution | Temp. | Time | 3rd wash Solution | Temp. | Time |
|---|---|---|---|---|---|---|---|---|---|
| 2 | pH 10 Catholyte & 15 ppm Anolyte | | | 60 ppm Anolyte | | | 60 ppm Anolyte | | |
| 3 | 60 ppm Chlorine | | | 60 ppm Chlorine | | | 60 ppm Chlorine | | |

The effect of these treatments on microbial load reduction of produce are shown in Table 37 below and FIG. 16.

TABLE 37

Average log reduction (LR) of *E. coli* 0157:H7, *S. Typhimurium*, and *L. monocytogenes* following treatment.

| Treatment | LR *S. Typhimurium* | Error | LR *E. coli.* O157:H7 | Error | LR *L. monocytogenes* | Error |
|---|---|---|---|---|---|---|
| pH 10 NaOH & 15 ppm NaClO @25° C. 20 sec + FAC 60 ppm NaClO @25° C. 90 sec + FAC 60 ppm NaClO @25° C. 30 sec | 2.56 | 0.21 | 2.12 | 0.19 | 2.13 | 0.18 |
| pH 10 Catholyte & 15 ppm Anolyte @25° C. 20 sec + FAC 60 ppm Anolyte @25° C. 90 sec + FAC 60 ppm Anolyte @25° C. 30 sec | 3.97 | 0.17 | 3.56 | 0.17 | 3.66 | 0.18 |
| Triple Chlorine (FAC 60 ppm, pH 6.5) @25° C. 20 sec + 90 sec + 30 sec | 2.03 | 0.27 | 1.64 | 0.31 | 1.74 | 0.28 |

Figure 16:
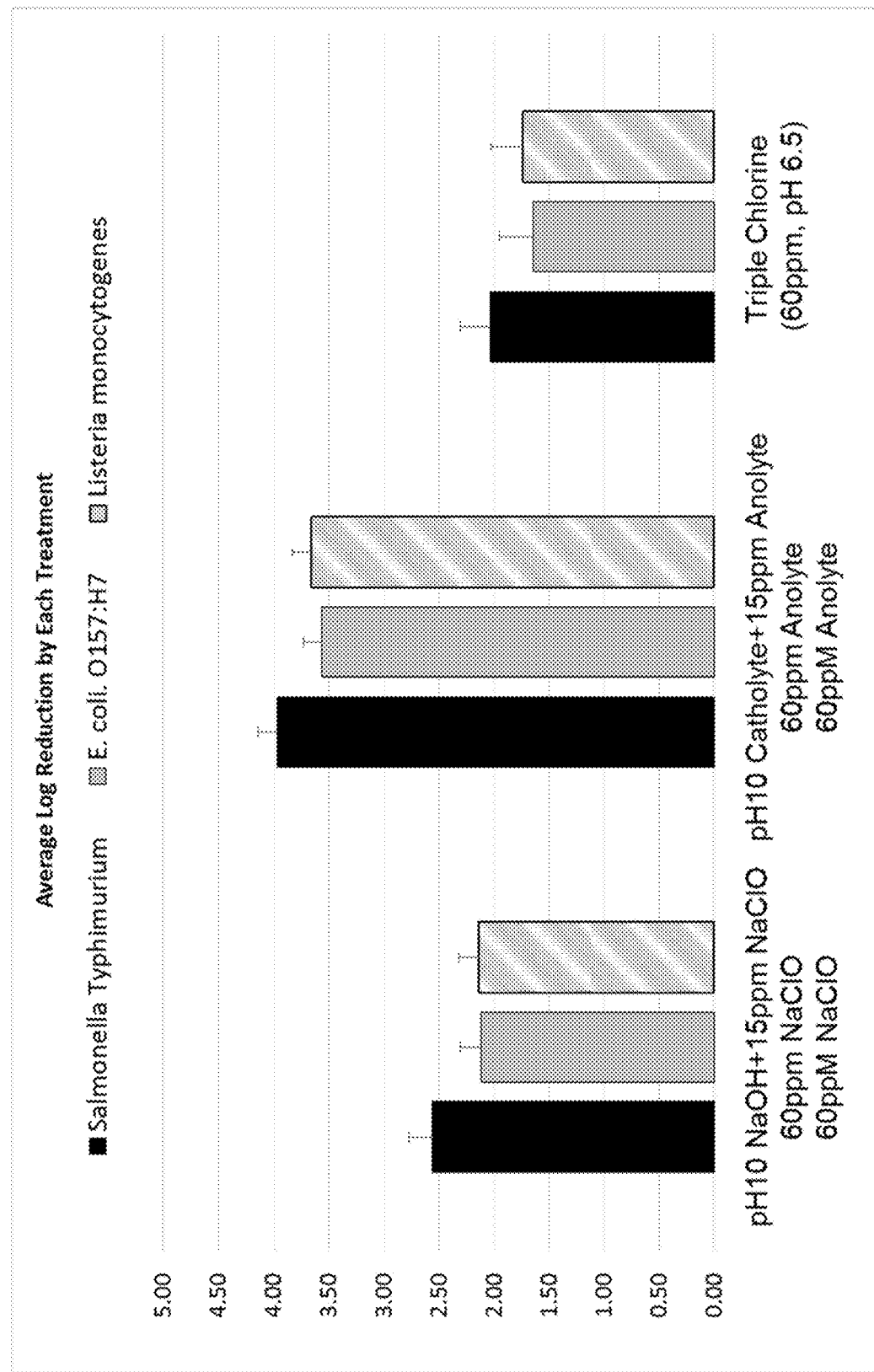
FIG. 16 is a graph depicting the effect of different triple wash treatments on reducing bacterial loads on commodity Romaine lettuce contaminated with *E. coli* O157:H7 (gray bars), sv. *Typhimurium* (black bars), or *Listeria monocytogenes* (hatched bars). Conditions for each treatment are as described in Tables 36 and 37.

The triple wash treatment using a combination of sodium hydroxide and sodium hypochlorite yielded a higher microbial reduction on the product (2.2 to 2.6 approximate micro reduction) as compared to a triple wash chlorine treatment (1.6 to 2.0 approximate micro reduction) alone (Table 37 and FIG. 16). However, the catholyte and anolyte triple wash treatment provided a greater effectiveness in microbial reduction than a chemically similar solution of sodium hydroxide (also pH 10) to replace catholyte, and a chemically similar solution of FAC 60 ppm chlorine level using sodium hypochlorite to replace anolyte.

These results are consistent with the previous Examples. That is to say, a higher microbial reduction on the produce was achieved using catholyte and anolyte solutions (3.5 to 4 logs approximate micro reduction), as compared to the microbial reduction achieved using a triple chlorine wash solution (1.6 to 2.0 approximate micro reduction).

Figure 17:
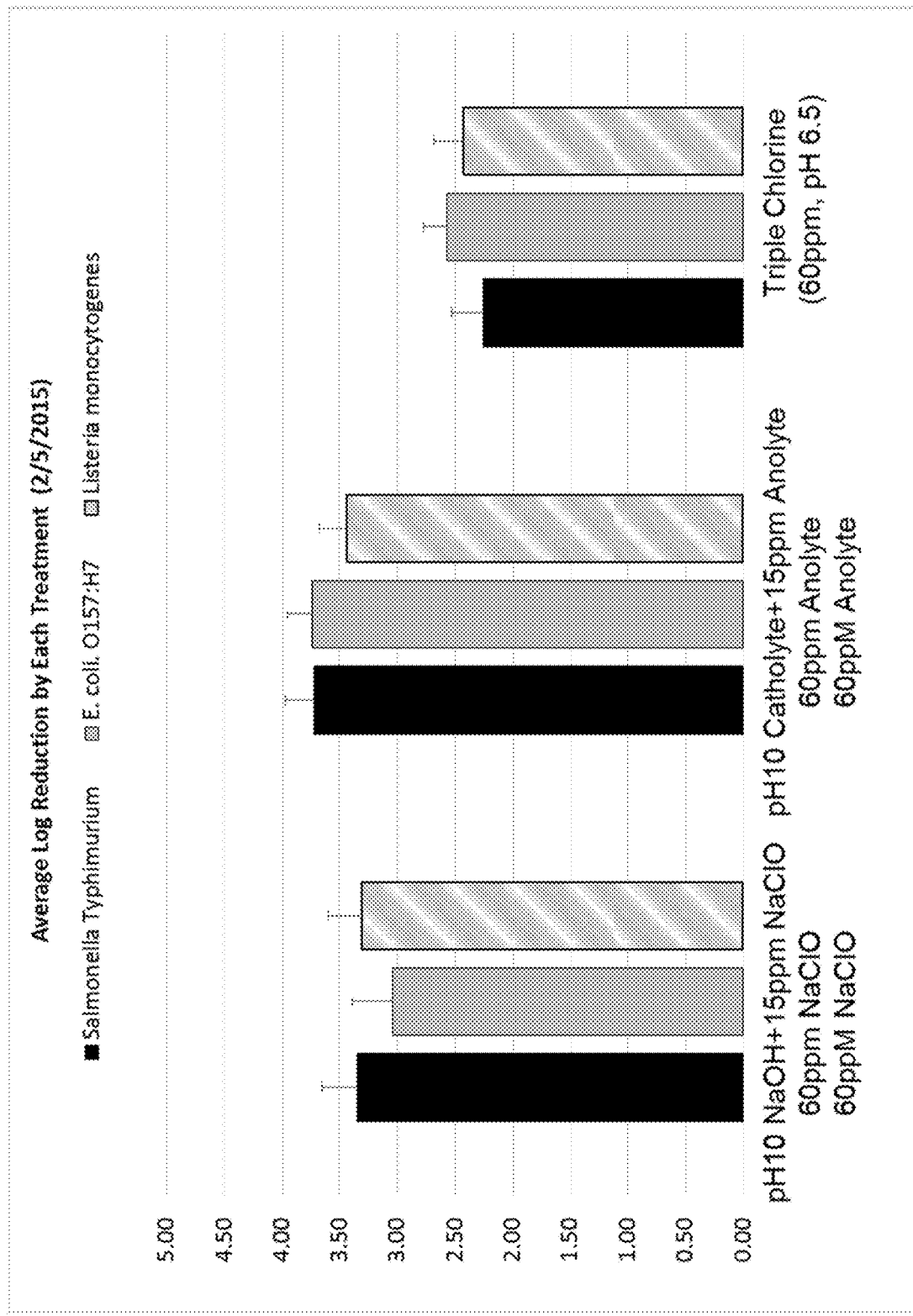
FIG. 17 is a graph depicting the effect of different triple wash treatments on reducing bacterial loads on commodity Romaine lettuce contaminated with *E. coli* O157:H7 (gray bars), sv. *Typhimurium* (black bars), or *Listeria monocytogenes* (hatched bars). Conditions for each treatment are as described in Tables 36 and 38.

To further demonstrate the efficacy of catholyte/anolyte triple wash treatments, these experiments were repeated. The results are shown in Table 38 below and FIG. 17.

TABLE 38

Average log reduction (LR) of *E. coli* 0157:H7, *S. Typhimurium*, and *L. monocytogenes* following treatment.

| Treatment | ALR *S. Typhimurium* | Error | ALR *E. coli.* O157:H7 | Error | ALR *L. monocytogenes* | Error |
|---|---|---|---|---|---|---|
| pH 10 NaOH & 15 ppm NaClO + FAC 60 ppm NaClO + FAC 60 ppm NaClO | 3.35 | 0.31 | 3.04 | 0.35 | 3.30 | 0.30 |
| pH 10 Catholyte & 15 ppm Anolyte + FAC 60 ppm Anolyte + FAC 60 ppm Anolyte | 3.72 | 0.25 | 3.74 | 0.21 | 3.43 | 0.24 |
| Triple Chlorine (FAC 60 ppm, pH 6.5) | 2.25 | 0.27 | 2.57 | 0.20 | 2.42 | 0.26 |

These results, like the results shown in Table 37 and FIG. 16, further illustrate that the catholyte and anolyte triple wash treatment yielded the highest microbial reduction, followed by the sodium hydroxide and sodium hypochlorite triple wash, which was more effective than triple chlorine treatment.

What is claimed is:

1. A method for sanitizing leafy greens, the method consisting of the steps of:
   a) treating the produce with a 10% catholyte solution for 20 seconds to de-soil the leafy greens;
   b) treating the leafy greens with a 60 ppm anolyte for 90 seconds to sanitize the leafy greens; and
   c) treating the leafy greens with a 80 ppm solution consisting of peroxyacetic acid for 30 seconds to further sanitize the leafy greens,
   wherein after treating the leafy greens from step (a), step (b), and step (c), the leafy greens yields at least a 4.5 log colony forming unit per gram reduction in microbial load, as measured by total aerobic plate counts using standard FDA BAM techniques, as compared to untreated leafy greens;
   wherein the 10% catholyte solution further consist of 0.15 to 3.0 ppm ozone; and
   wherein treating the leafy greens with the 10% catholyte solution, the 60 ppm anolyte solution, and the 80 ppm solution consisting of peroxyacetic acid yields an increase in shelf-life of the leafy greens, as compared to untreated leafy greens.

2. The method of claim 1, wherein treating the leafy greens with the 10% catholyte solution occurs prior to treating the leafy greens with the 60 ppm anolyte solution or occurs prior to treating the leafy greens with the 80 ppm solution consisting of peroxyacetic acid.

3. The method of claim 2, wherein treating the leafy greens with the 10% catholyte solution occurs prior to treating the leafy greens with the 60 ppm anolyte solution, and treating the leafy greens with the 60 ppm anolyte solution occurs prior to treating the leafy greens with the 80 ppm solution consisting of peroxyacetic acid.

4. The method of claim 2, wherein treating the leafy greens with the 10% catholyte solution occurs prior to treating the leafy greens with the 80 ppm solution consisting of peroxyacetic acid, and treating the leafy greens with the 80 ppm solution consisting of peroxyacetic acid occurs prior to treating the leafy greens with the 60 ppm anolyte solution.

5. The method of claim 1, wherein treating the leafy greens with the 60 ppm anolyte solution occurs prior to treating the leafy greens with the 80 ppm solution consisting of peroxyacetic acid.

6. The method of claim 5, wherein treating the leafy greens with the 80 ppm solution consisting of peroxyacetic acid occurs prior to treating the leafy greens with the 10% catholyte solution or occurs prior to treating the leafy greens with the 60 ppm anolyte solution.

7. The method of claim 1, wherein treating the leafy greens with the 80 ppm solution consisting of peroxyacetic acid occurs prior to treating the leafy greens with the 10% catholyte solution.

8. The method of claim 7, wherein treating the leafy greens with the 10% catholyte solution occurs prior to treating the leafy greens with the 60 ppm anolyte solution.

9. The method of claim 1, further consisting of treating the leafy greens with a second 60 ppm anolyte solution.

10. The method of claim 1, wherein after treating the leafy greens from step (a), step (b), and step (c), the leafy greens yields an additional log colony forming unit reduction per gram in microbial load that ranges from 4.5 to 6, as measured by total aerobic plate counts using standard FDA BAM techniques as compared to untreated leafy greens.

11. The method of claim 1, further consisting of sonicating the leafy greens or treating the leafy greens with a pulsed electric field before, concurrently, or after treating the leafy greens with the catholyte solution, the 60 ppm anolyte solution and/or the 80 ppm solution consisting of peroxyacetic acid.

12. The method of claim 1, further consisting of treating the leafy greens with an anolyte solution or with ozone before, concurrently, or after treating the leafy greens with the 10% catholyte solution, the 60 ppm anolyte solution and/or the 80 ppm solution consisting of peroxyacetic acid.

13. The method of claim 1, wherein the 10% catholyte solution further consists of: anolyte; or a sanitizer selected from the group consisting of: peroxyacetic acid, free available chlorine, chlorine dioxide, an alcohol, peroxide, and an ammonia-based sanitizer.

14. A method for sanitizing leafy greens, the method consisting of the steps of:
   a) treating the leafy greens with a 10% catholyte solution having pH 9 to 11 to yield a 10% catholyte treated leafy greens;
   b) treating the 10% catholyte treated leafy greens with a 60 ppm anolyte solution to yield an anolyte treated leafy greens; and
   c) treating the anolyte treated leafy greens with a 80 ppm solution consisting of peroxyacetic acid to yield sanitized leafy greens,
   wherein after treating the leafy greens from step (a), step (b), and step (c), the yields at least a 4.5 log colony forming unit per gram reduction in microbial load, as measured by total aerobic plate counts using standard FDA BAM techniques as compared to untreated leafy greens;
   wherein the 10% catholyte solution further consists of 0.15 to 3.0 ppm ozone; and
   wherein treating the leafy greens with the 10% catholyte solution, the 60 ppm anolyte solution, and the 80 ppm solution consisting of peroxyacetic acid yields an increase in shelf-life of the leafy greens, as compared to untreated leafy greens.

15. A method for sanitizing leafy greens, the method consisting of the steps of:
   a) treating the leafy greens with a 10% catholyte solution to yield a catholyte treated leafy greens;
   b) treating the 10% catholyte treated leafy greens with a 60 ppm anolyte solution to yield an anolyte treated leafy greens; and
   c) treating the anolyte treated leafy greens with a second 60 ppm anolyte solution to yield sanitized leafy greens,
   wherein after treating the leafy greens from step (a), step (b), and step (c), the leafy greens yields at least a 4.5 log colony forming unit per gram reduction in microbial load, as measured by total aerobic plate counts using standard FDA BAM techniques as compared to untreated leafy greens;
   wherein the 10% catholyte solution further consists of 0.15 to 3.0 ppm ozone; and
   wherein treating the leafy greens with the 10% catholyte solution, the 60 ppm anolyte solution, and the 80 ppm solution consisting of peroxyacetic acid yields an increase in shelf-life of the leafy greens, as compared to untreated leafy greens.

16. The method of claim 15, wherein the solution consisting of free available chlorine is an anolyte solution; the second solution consists of free available chlorine is an anolyte solution; or both the solution further consisting of free available chlorine and the second solution consists of free available chlorine are anolyte solutions.

\* \* \* \* \*